US012762910B2

(12) United States Patent
O'Mahony et al.

(10) Patent No.: US 12,762,910 B2
(45) Date of Patent: Oct. 13, 2026

(54) METHODS AND SYSTEMS FOR SELECTIVE COMMUNICATION WITH ELECTRONIC CONTROL UNITS OF A VEHICLE

(71) Applicant: Snap-on Incorporated, Kenosha, WI (US)

(72) Inventors: Patrick B. O'Mahony, San Jose, CA (US); Patrick S. Merg, Hollister, CA (US); Spencer H. Tanaka, San Jose, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 18/732,371

(22) Filed: Jun. 3, 2024

(65) Prior Publication Data

US 2025/0371919 A1 Dec. 4, 2025

(51) Int. Cl.
*G07C 5/08* (2006.01)

(52) U.S. Cl.
CPC ....... *G07C 5/0816* (2013.01); *G07C 2205/02* (2013.01)

(58) Field of Classification Search
CPC .......................... G07C 5/0816; G07C 2205/02
See application file for complete search history.

(56) References Cited

U.S. PATENT DOCUMENTS 8,818,668 B2 8/2014 Ikeda et al.
8,996,232 B2 3/2015 Dwan et al.
10,140,783 B2 11/2018 Thornburg et al.
10,599,537 B2 3/2020 Chae et al.
2002/0173887 A1 11/2002 Flick
2019/0079842 A1 3/2019 Chae
2020/0242859 A1 7/2020 Merg
2021/0165644 A1 * 6/2021 Harata ...................... G06F 8/61
2021/0264383 A1 8/2021 Kleinhans
(Continued)

FOREIGN PATENT DOCUMENTS

DE 102022131563 A1 5/2024
JP 2022182015 A * 12/2022

OTHER PUBLICATIONS

JP 2022182015 A—machine translation (Year: 2022).*
(Continued)

*Primary Examiner* — Dino Kujundzic
(74) *Attorney, Agent, or Firm* — McDonnell Boehnen Hulbert & Berghoff LLP

(57) ABSTRACT

Examples relate to methods and systems for selective communication with electronic control units (ECUs) of a vehicle. A vehicle scan tool can provide user-selectable controls that correspond to predetermined group of ECUs representing subsets of all of the ECUs located in a vehicle. In response to receiving a selection of a particular user-selectable control, the scan tool transmits one or more first vehicle data messages with a diagnostic trouble code request to the predetermined group of ECUs associated with the selected option. The diagnostic trouble code request can include a request to clear one or more diagnostic trouble codes in the predetermined group of ECUs or a request to respond with a status of one or more diagnostic trouble codes being set in the predetermined group of ECUs. The scan tool can communicate with multiple subsets of ECUs when the user selects multiple user-selectable controls.

24 Claims, 22 Drawing Sheets

(56) References Cited

U.S. PATENT DOCUMENTS

| | | | | |
|---|---|---|---|---|
| 2022/0012043 | A1* | 1/2022 | Sakurai | H04L 9/3239 |
| 2024/0330170 | A1* | 10/2024 | Mesde | G06F 11/3698 |
| 2024/0385952 | A1* | 11/2024 | Lindow | H04L 63/0272 |
| 2025/0060737 | A1* | 2/2025 | Zheng | G05B 23/0213 |
| 2025/0196786 | A1* | 6/2025 | Choi | B60W 10/20 |

OTHER PUBLICATIONS

S32G2 Vehicle Networking Reference Design, www.xnp.com, retrieved Jun. 3, 2024.
Bosch Automotive Service Solutions Inc.S, Mitchell Diagnostics, "MD-350 User Manual" (2018).
Specification of Diagnostic Communication (Diagnostics on CAN—Application & Session Layer), retrieved Jun. 3, 2024.
NXP, "Automotive Zone Controller", Jul. 5, 2023.
Auto Electrician Hays, "Mercedes ECUs List", retrieved Jun. 9, 2024.
Bosch Diagnostics, "ADS 325 User Manual", boshcdiagnositcs.com/pro, retrieved Jun. 3, 2024.
ZEUS User Manual, retrieved Jun. 3, 2024.

* cited by examiner 702 704 706 708

| | |
|---|---|
| PID1: 1 – FUEL SYSTEM STATUS | ON/OFF |
| PID2: 2 – CALCULATED ENGINE LOAD | % |
| PID3: 3 – ENGINE COOLANT TEMPERATURE | TEMP C. |
| PID4: 4 – SHORT TERM FUEL TRIM – BANK 1 | COUNTS |
| PID5: 5 – LONG TERM FUEL TRIM – BANK 1 | COUNTS |
| PID6: 6 – FUEL PRESSURE | KPA |
| PID7: 7 – INTAKE MANIFOLD ABSOLUTE PRESS. | KPA |
| PID8: 8 – ENGINE RPM | RPM |
| PID9: 9 – VEHICLE SPEED | KPH |
| PID10: 10 – TIMING ADVANCE | DEGREES |
| PID11: 11 – INTAKE AIR TEMPERATURE | TEMP C. |
| PID12: 12 – MAF AIR FLOW RATE | GRAMS/S |
| PID13: 13 – COMMANDED EGR | % |
| PID14: 14 – EGR ERROR | % |
| PID15: 15 – FUEL TANK LEVEL INPUT | % |
| PID16: 16 – RELATIVE THROTTLE POSITION | % |
| PID17: 17 – FUEL TYPE | NONE |
| PID18: 18 – EVAPORATOR SYSTEM VAPOR PRESS. | KPA |
| PID19: 19 – MASS AIR FLOW SENSOR | GRAMS/S |
| PID20: 20 – INTAKE AIR TEMPERATURE SENSOR | TEMP C. |
| PID21: 21 – FUEL INJECTION TIMING | % |
| PID22: 22 – ENGINE OIL TEMPERATURE | TEMP C. |
| PID23: 23 – BOOST PRESSURE CONTROL | KPA |
| PID24: 24 – EXHAUST GAS RECIRCULATION TEMP. | TEMP C. |
| PID25: 25 – TURBOCHARGER RPM | RPM |
| PID26: 26 – WASTEGATE CONTROL | ON/OFF |
| PID27: 27 – ENGINE RUN TIME | SEC. |
| PID28: 28 - FUEL PRESSURE CONTROL SYSTEM | KPA |
| PID29: 29 – ENGINE PERCENT TORQUE DATA | % |
| PID30: 30 – INJECTION PRESS. CONTROL SYSTEM | KPA |
| PID31: 31 – RESERVED | NONE |
| PID32: 32 – RESERVED | NONE |

VEHICLE ID: YMM-3 ← 710

ECU ID: $10 ← 712

VDMP: VDMP-2 ← 714

700

FIG. 7

METHODS AND SYSTEMS FOR SELECTIVE COMMUNICATION WITH ELECTRONIC CONTROL UNITS OF A VEHICLE

BACKGROUND

Vehicle servicing helps maintain the optimal performance and longevity of vehicles throughout their useful lives. The servicing process often includes checking a variety of mechanical and electronic components, which require regular inspection, maintenance, and repair or replacement when necessary. Professional technicians frequently provide assistance with the maintenance of vehicles by utilizing specialized tools and technologies to diagnose issues and perform necessary repairs. Technicians commonly service vehicles in established facilities equipped with advanced tools and equipment. There are some scenarios, however, where servicing occurs in unconventional locations, such as on the side of a city street or highway. In these instances, technicians and other individuals may employ a diverse set of tools, both computerized and non-computerized, to address a wide range of mechanical and electronic components within a vehicle.

One essential tool used by technicians is a vehicle scan tool (VST), which can be used to read Parameter Identifier (PID) parameters from the vehicle under service. In general, PID parameters include real-time data on various aspects of a vehicle's operation, such as engine performance, sensor readings, and system status. To access PID data from a vehicle, technicians use a VST to connect and communicate with a vehicle's electronic control unit (ECU). The VST can extract and display PID parameters, which can provide data showing insights into the vehicle's condition and aiding in the diagnosis of potential malfunctions. The process of reading PIDs can include navigating through an interface of VST, which may feature a menu with multiple layers. In some cases, technicians may need to input specific details like the vehicle's year, make, model, engine identifier, and the desired system to retrieve the relevant PID parameters that provide technicians with access to precise information tailored to the unique characteristics of the vehicle they are servicing.

SUMMARY

Example embodiments relate to systems and techniques for the customized acquisition of PID data and other information from a vehicle when servicing the vehicle. Rather than limiting communication options to a single ECU or all of the ECUs on the vehicle, disclosed techniques enable a VST or another type of computing system to communicate with specific ECUs operating within a vehicle. By having the ability to communicate with specific ECUs, the VST is able to present selectable controls that customizes and enhances the user's experience while also reducing the amount of time required to communicate with the particular ECUs to obtain the information requested based on the option selected by the user. For instance, the VST can enable the user to select options that enable the user to efficiently obtain PID and/or other data from specific subsets of ECUs arranged according to vehicle systems, functionalities, and/or location within the vehicle, among other criteria. Additionally or alternatively, at least some embodiments include dynamically configuring the VST or another type of computing system to transmit vehicle data messages to request a specific set of PID parameters based on an option selected by the user.

In one aspect, a method is described. The method includes providing, on a user interface via a computing system, a first user-selectable control that corresponds to a first predetermined group of electronic control units. The first predetermined group of electronic control units includes a first subset of electronic control units located in a vehicle and the first subset of electronic control units includes multiple electronic control units. The method also includes receiving, at the computing system, a selection of the first user-selectable control and transmitting, by the computing system and to the vehicle in response to the selection of the first user-selectable control, one or more first vehicle data messages with a diagnostic trouble code request to the first predetermined group of electronic control units. The diagnostic trouble code request includes a request to clear one or more diagnostic trouble codes in the first predetermined group of electronic control units or a request to respond with a status of one or more diagnostic trouble codes being set in the first predetermined group of electronic control units.

In another aspect, a vehicle scan tool is described. The vehicle scan tool includes a user interface and a processor. The processor is configured to provide, on the user interface, a first user-selectable control that corresponds to a first predetermined group of electronic control units. The first predetermined group of electronic control units includes a first subset of electronic control units located in a vehicle and the first subset of electronic control units includes multiple electronic control units. The processor is further configured to receive a selection of the first user-selectable control and transmit, to the vehicle in response to the selection of the first user-selectable control, one or more first vehicle data messages with a diagnostic trouble code request to the first predetermined group of electronic control units. The diagnostic trouble code request includes a request to clear one or more diagnostic trouble codes in the first predetermined group of electronic control units or a request to respond with a status of one or more diagnostic trouble codes being set in the first predetermined group of electronic control units.

In yet another aspect, a non-transitory computer-readable memory is described. The non-transitory computer-readable memory is configured to store instructions, that when executed by a computing system comprising one or more processors, causes the computing system to perform operations. The operations include providing, on a user interface, a first user-selectable control that corresponds to a first predetermined group of electronic control units. The first predetermined group of electronic control units includes a first subset of electronic control units located in a vehicle and the first subset of electronic control units includes multiple electronic control units. The operations also include receiving a selection of the first user-selectable control and transmitting, to the vehicle in response to the selection of the first user-selectable control, one or more first vehicle data messages with a diagnostic trouble code request to the first predetermined group of electronic control units. The diagnostic trouble code request includes a request to clear one or more diagnostic trouble codes in the first predetermined group of electronic control units or a request to respond with a status of one or more diagnostic trouble codes being set in the first predetermined group of electronic control units.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings. All the figures are schematic and not necessarily to scale.

FIG. 7 shows a PID index, according to one or more example embodiments.

DETAILED DESCRIPTION

I. Introduction

Figure 1:
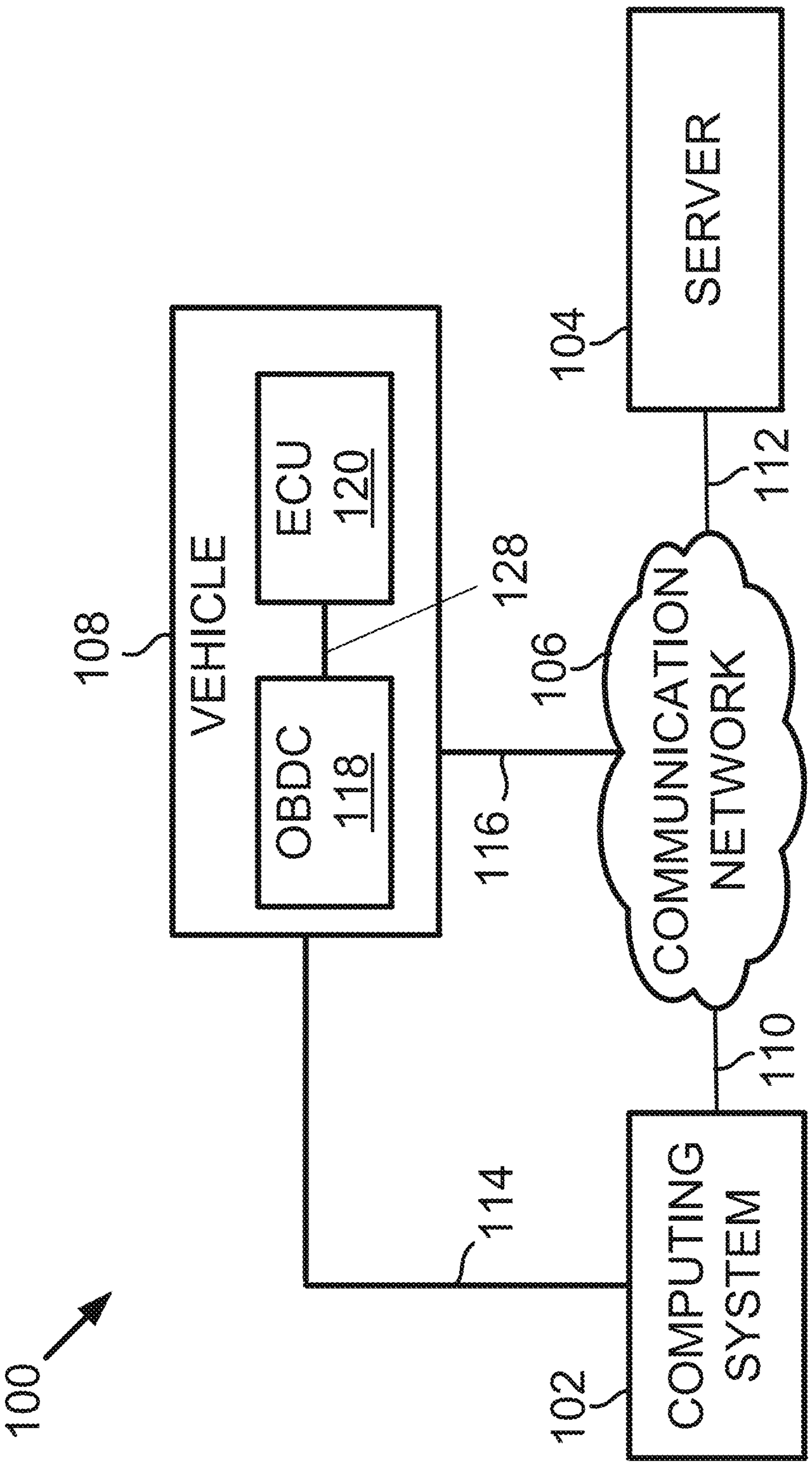
FIG. 1 is a diagram showing an operating environment in which the example embodiments can operate, according to one or more example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Using a VST or another type of computing system to obtain PID data typically includes connecting the VST to the onboard diagnostics system of a vehicle, accessing the relevant menu options on the VST, and interpreting the displayed information. For instance, a technician can connect the VST to the vehicle's on-board diagnostic II (OBD-II) port to enable the VST to automatically establish communication with one or more electronic control units (ECUs) on the vehicle. The VST can present a menu for the technician to use to select specific systems or modules for analysis, such as the transmission control module (TCM) or the engine control module (ECM). Based on the technician's input, the VST can communicate with the ECUs to obtain PIDs associated with the technician's selection. For example, PIDs can include data related to engine RPM, coolant temperature, and other sensor readings. The VST can then display the real-time data, including numerical values, graphs, or charts, to enable the technician to review and diagnose issues, identify faulty components, or assess overall vehicle health.

The onboard diagnostics system accessed by the VST can be contained within one or more ECUs on the vehicle. In at least some vehicles in which the onboard diagnostics system is contained within multiple ECUs, the onboard diagnostics system is distributed about the multiple ECUs. For example, if the multiple ECUs include the TCM and ECM referenced above, then the TCM and VST can communicate diagnostics requests and responses regarding a transmission system controlled by the TCM, and the ECM and VST can communicate diagnostics requests and responses regarding an engine system controlled by the ECM.

The VST can connect to the onboard diagnostics system (e.g., one or more ECUs) of a vehicle using a wired and/or wireless connection. As an example, the technician can removably attach a dongle to the vehicle's OBD-II port and the dongle can communicate with the VST using wireless communications.

Scan tools and other computing systems used to obtain and display PID data typically limit the options presented in the menu displayed to the technician for selection. For instance, the menu might only enable the technician to obtain PID data from a single ECU or all of the ECUs on the vehicle. In addition, even when the VST enables the technician to select a particular system to review, the VST might still be programmed to communicate with all of the ECUs located within the vehicle despite a user selection selecting for PID data from a particular system or ECU. Although the VST enables the technician to obtain the PID data for diagnosing and servicing the vehicle, the limited options presented by the VST for selection by the technician as well as the VST's inability to direct and limit communication to a specific subset of the ECUs based on a user selection can lead to inefficient use of the VST that requires more time and processing resources to obtain the information necessary to evaluate the condition of vehicle systems. Those limited options can also lead to inefficiencies on the vehicle data bus to which the ECUs, the VST, and/or a dongle is attached for at least the reasons that some ECUs are transmitting diagnostic messages not needed by the VST. Furthermore, the lack of customized, selectable controls that correspond to different subsets of ECUs within the vehicle might inhibit the optimal use of the VST when diagnosing and servicing vehicles.

Example techniques and systems presented herein enable scan tools and other types of computing systems to customize and accelerate the acquisition of PID data and other information from different subsets of ECUs located within a vehicle. Rather than limit a VST's communication options to a single ECU or all of the ECUs on the vehicle, disclosed techniques enable VSTs and other computing systems to present options to a technician or another user, which when selected, trigger the VST to communicate with specific subsets of ECUs within the vehicle that are determined based on the selected option or options. As an example, VSTs can be used to obtain PID data and/or other information from particular ECUs with less latency and computing resources and the particular ECUs can be determined by the VST based on the user's selection or other criteria input by the user.

A VST can perform disclosed techniques to enable a user to choose to receive PID data from ECUs based on various criteria. For instance, the VST can present options that arrange the vehicle's ECUs into different subsets based on different zones of the vehicle, vehicle systems, and/or functionalities. As an example, a technician may select an option presented by the user interface of the VST to obtain PID data and/or other information about the powertrain and related systems of the vehicle. In response to the selection, the VST can communicate directly with ECUs associated with an engine control module (ECM), a transmission control module (TCM), and a powertrain control module (PCM) without communicating with ECUs of the vehicle that are not associated with the ECM. The technician may also select a different option presented by the user interface, which corresponds to a body control group. When this option is selected, the VST can communicate directly with a subset of ECUs that are associated with a body control module (BCM), a lighting control module, a power window control module, and/or a door lock control module. By limiting communication to specific ECUs associated with a selection or multiple selections by the technician, the VST can obtain PID data and other information specific to the user's request and avoid wasting time and resources communicating with other ECUs that do not correspond to the selection(s) by the user.

In addition, example techniques can further enable a technician or another user to create custom groupings of ECUs by selecting ECUs for each group and save these groups for subsequent use. As an example, the VST can present a user interface that allows a user to select one or multiple vehicle subsystems to arrange into a selectable group. When the selectable group is selected thereafter, the VST communicates with the specific ECU or ECUs that are associated with the vehicle subsystem(s) entered as part of the selectable group. In addition, techniques can also limit selection of particular PIDs while making other PIDs available based on the user of the VST. For instance, the user may cause the VST to limit communication with a safety critical system using a password firewall or another technique to prevent codes from ECUs within the safety critical system from being cleared.

An example technique can include a VST providing, on a user interface, user-selectable controls (USCs) with each selectable control corresponding to a predetermined group of one or multiple ECUs. For instance, the VST can provide a first selectable control that, when selected by the user, causes the VST to specifically communicate with a first predetermined group of ECUs consisting of a first subset of ECUs located in a vehicle. The VST can also provide a second selectable control that, when selected by the user, causes the VST to communicate with a second predetermined group of ECUs consisting of a second subset of ECUs located in the vehicle. In some instances, one or more ECUs within the vehicle can be associated with multiple selectable controls. For example, the first subset of ECUs and the second subset of ECUs described in the above example can share one or multiple ECUs in common. When providing the different selectable controls, the VST can label each USC to inform the technician about the criteria used to associate one or more ECUs with the USC. For instance, the VST can use labels that describe options according to vehicle systems, different zones of the vehicle, and/or different functionalities performed by ECUs, among others.

In at least some cases, the first subset of ECUs includes multiple ECUs and the second subset of ECUs includes multiple ECUs. None, one, or more than one of the multiple ECUs in the first subset of ECUs can be included within the second subset of ECUs, and vice versa. In at least some other cases, the first subset of ECUs includes a single ECU and the second subset of ECUs includes multiple ECUs. In at least still some other cases, the first subset of ECUs includes multiple ECUs and the second subset of ECUs includes a single ECU. Moreover, in any of the aforementioned cases pertaining to the aforementioned technique, the USCs can include one or more additional selectable control corresponding to different respective group of one or multiple ECUs.

The USCs presented by the VST can include predefined options generated by the VST or another computing system. For instance, the VST can receive updates from a server that enables the VST to present new USCs generated by the server. In some cases, the VST can present USCs based on a user of the VST. For instance, the user can have a user profile that the VST uses to save settings, including previously defined selectable controls configured by the user using the VST. In addition, the USCs presented by the VST can also include user-created options. Each user-created selectable control can correspond to a subset of ECUs previously generated based on inputs from the user or obtained from another user.

In response to providing USCs, the VST can receive a selection of one or multiple USCs. The VST can then transmit one or more vehicle data messages to the vehicle based on the option(s) selected by the user. In particular, the VST can limit transmission of vehicle data messages to the predetermined group or groups of ECUs associated with the selected options. The vehicle data messages can include a diagnostic trouble code (DTC) request for the particular ECUs. This differs from existing VST techniques that typically communicate vehicle data messages to all of the ECUs within the vehicle or a single ECU to obtain the information desired by the user. As such, the DTC request in the vehicle data message(s) can include a request to clear one or more DTCs in the predetermined group(s) of ECUs or a request to respond with a status of one or more DTCs being set in the predetermined group(s) of ECUs.

In general, vehicle data messages used by the VST can include a message or set of messages containing information about various parameters and systems within a vehicle. Vehicles typically include numerous sensors and control modules that continuously monitor and manage various aspects, such as engine performance, emissions, safety systems, and other systems. The modules can communicate with each other and with external devices (e.g., VSTs) through a standardized set of messages on a network within the vehicle, such as protocols like Controller Area Network (CAN). As such, the VST can be used by technicians to communicate with the vehicle's onboard diagnostic system, including transmitting, reading, and interpreting vehicle data messages to provide information about the health and performance of the vehicle.

In this description, a USC is sometimes abbreviated as USC. A USC can be output on a display screen (or more simply, a display). In embodiments in which the display is configured as a touch screen display, the USC output on the display can be selectable to trigger a processor to perform a function corresponding to the USC. The processor can be configured to detect that a particular USC corresponds to a location of the touch screen display is contacted by a user. A USC output on a display can be part of a graphical user interface (GUI) output on the display. As an example, a USC within a GUI can be configured as a button, a drop-down menu, a checkbox, a text input field, a slider, a link or in some other configuration.

Under some circumstances, however, the USC output on the display may not be selectable. For example, the USC can be output on the display to notify a user that the device including the display has the capability to perform the function, but the USC is not currently enabled to trigger performance of the function. In other words, the USC may be disabled until the user enables the USC (e.g., by paying a subscription fee, obtaining a certification credential to perform the feature, or acknowledging a safety warning).

In at least some embodiments, a USC includes a hardware key or button remote from a display. Selection of such a USC can occur by selecting (e.g., pushing the hardware key or button). Selection of such a USC can cause a change in resistance of a resistor network and a corresponding change in a voltage detected by the processor or an analog-to-digital converter. A USC including a hardware key or button can be reconfigurable. For example, selection of the USC while a first GUI is displayed triggers performance of a first set of functions and selection of the USC while a second GUI is displayed triggers performance of a second set of functions. A USC can include a graphical icon and/or text. The graphical icon and/or text can be a representative description of a set of functions (i.e., one or more functions) that is performed in response to a selection of the USC including the graphical icon and/or text.

In some examples, a VST may present "smart" suggestions to a user by leveraging advanced diagnostic algorithms, historical data analysis, and/or user interaction patterns. For instance, the VST may use diagnostic algorithms that process vehicle data to identify potential issues and potential maintenance requirements. By analyzing real-time data from the vehicle sensors and comparing the data with historical data and known patterns of vehicle issues, the VST can accurately diagnose problems, which may allow the VST to make informed suggestions on possible fixes, maintenance schedules, and parts replacement. In some cases, the VST may monitor the interactions of a user or multiple users, such as the frequency of specific scans, common issues checked by the user, and any preferences indicated during user of the VST. The information gathered by monitoring the interactions may then be used by the VST to understand the priorities of each user and to tailor its suggestions accordingly. For example, if a user frequently checks tire pressure, the VST may prioritize tire-related issues and suggestions. In addition, the VST may adapt its output based on the user's behavior and the specific vehicle's history. For instance, the VST may use machine learning algorithms to refine its predictive capabilities so the VST's suggestions become more accurate over time. The VST may also use the vehicle's make, model, and year to provide more precise recommendations or communicate with specific ECUs within the vehicle.

In some examples, the VST may obtain information related to a particular symptom experienced by a vehicle and identified by a user. The VST may then communicate with specific modules or ECUs to gather information based on the particular symptom. For instance, the VST may gather the data from one or more modules or subsystems of the vehicle that may be associated with the particular symptom and generate a GUI that displays information based on the data. In some cases, the VST may limit communication to specific subsystems or ECUs within the vehicle based on the particular symptom.

In some examples, the VST may identify and communicate with particular ECUs based on a vehicle symptom identified or described by a user through a multi-step process that may involve user input, symptom analysis, ECU identification, and targeted communication. For instance, a user may initially input a description of the vehicle's symptoms into the VST via a user interface. This interface may include text input fields, drop-down menus, and/or voice recognition capabilities, among other options. The VST may then utilize a database of symptoms and their associated ECUs to analyze the input. In some aspects, the VST may employ natural language processing to interpret the user's description and match the description with known symptoms and their likely causes.

Once the symptom has been analyzed and a probable cause has been determined, the VST may identify which ECUs are related to the symptom. For instance, if the symptom is related to engine performance, the VST may focus on the engine control module (ECM). If the symptom involves stability control, the VST may target the electronic stability program (ESP) ECU. The VST may use a vehicle's specific data, such as make, model, and year, to accurately pinpoint the relevant ECUs, as the association between symptoms and ECUs can vary across different vehicles. After identifying the relevant ECUs, the VST may establish communication with those specific modules, which may involve using the appropriate communication protocol, such as CAN or LIN. The VST may send requests to retrieve diagnostic trouble codes (DTCs), live data, or perform actuator tests that are pertinent to the identified symptom. By focusing on specific ECUs, the VST can efficiently diagnose issues without the need to interrogate unrelated systems.

In some cases, the VST may provide an interactive diagnostic session, guiding the user through a series of steps to further isolate the issue. This may include real-time monitoring of ECU outputs while the user performs specific actions or observes changes in the vehicle's behavior. The VST may also suggest potential fixes or additional tests based on the responses from the ECUs and the evolution of the vehicle's symptoms during the diagnostic process.

In some examples, the VST may incorporate a user authentication system to tailor its functionality to the qualifications of the user. For instance, upon accessing the VST, users are prompted to provide their credentials, which may include a combination of username and password, professional license details, and/or digital certificates. The VST can verify credentials against a secure database, establishing the user's level of expertise and corresponding access rights. This initial verification step may ensure subsequent interactions with the VST are appropriate for the user's skill level and authorization. In some cases, the VST may use role-based access control (RBAC) to delineate the scope of functionalities available to each user. For instance, a general user may be limited to basic diagnostic tasks such as reading trouble codes, whereas a certified technician might have the capability to clear codes and engage in more complex diagnostic procedures. At the top tier, expert users like master technicians may be granted comprehensive access, including the ability to reprogram ECUs.

To enhance usability and prevent unauthorized operations, the VST may adapt its user interface to the authenticated user's credentials. For example, novice users may be presented with a streamlined interface that presents a curated selection of features, minimizing the risk of inadvertent system alterations. Conversely, advanced users may view options with a full suite of diagnostic tools and settings, enabling them to leverage the VST's capabilities fully. This dynamic customization of the interface helps ensure that users are not overwhelmed with options beyond their technical proficiency. In general, functionality restrictions enforced by the VST based on credentials can ensure that sensitive operations such as code clearing or system recalibration are performed by qualified individuals. When a user attempts to execute a function that exceeds their authorization, the VST may respond with a denial of access, potentially accompanied by an explanation or a prompt to seek higher-level authorization. This credential-based limitation of options may safeguard the vehicle's systems from improper handling.

In some examples, a VST may predict and suggest which DTCs to clear by using diagnostic algorithms that can analyze the relationships and patterns among the DTCs, considering factors such as frequency and severity. For instance, when the VST identifies a primary code that may be causing secondary codes to appear, the VST can recommend clearing the primary code first. This targeted approach may help users focus on the root cause of the vehicle's issues, potentially resolving multiple faults by addressing a single underlying problem. To enhance the accuracy of its predictions, the VST may use historical repair data. By comparing the current vehicle's DTCs and symptoms against a comprehensive database of past diagnostic cases, the VST may identify common resolutions and suggest which codes are typically cleared in similar scenarios. This comparison used by the VST may leverage data analytics to filter through past successes to provide evidence-based recommendations to the user.

In some cases, the VST may leverage artificial intelligence (AI) and machine learning to improve the VST's predictive capabilities over time. With each use, the VST and the system that the VST operates within can learn from the outcomes and refine code-clearing suggestions for future diagnostics. This continuous learning process can be increased by using machine learning models that are trained on extensive datasets, enabling the VST to recognize intricate fault patterns and adapt to new vehicle models and technologies. In addition, the VST may limit some users ability to clear codes, which can be restricted based on the user's credentials or level of expertise. For instance, a novice or unlicensed user may be able to view DTCs and receive suggestions, but might not have the authorization to clear codes, reprogram vehicle components, or work with high voltage components due to the potential risk of inappropriate actions that could lead to vehicle damage or safety issues or a loss of data desired by a more experienced technician. In such cases, the VST can provide guidance but reserve code-clearing or reprogramming capabilities and interaction with high voltage components for more experienced, certified technicians who possess the requisite knowledge to perform such tasks safely and effectively. The VST may also benefit from a user feedback loop, where technicians can validate the effectiveness of the suggested actions. This feedback is integral to the system's learning process, ensuring that the VST's predictive model becomes increasingly accurate. As users interact with the VST and report back on the success of the suggested code clearances, the VST can become more adept at providing reliable recommendations, resulting in a more efficient diagnostic process.

In some examples, the VST may feature pre-set scan profiles tailored to common service scenarios or specific vehicle models, which can automatically select relevant systems for scanning based on the diagnostic task, thereby bypassing unrelated systems. To further accelerate diagnostics, the VST may prioritize communication protocols that are known to be the fastest or the appropriate protocol for the targeted system. By optimizing the communication protocol, the VST ensures quicker data transfer rates and more efficient interactions with the system being diagnosed. Intelligent system identification can also be another feature that enhances the VST's efficiency by automatically detecting which systems are installed on the vehicle and require attention, avoiding unnecessary communication with non-existent or non-responsive systems. In some cases, the VST may use adaptive communication strategies that adjust in real-time based on the vehicle's response times. If slow responses are detected from a particular system, the VST can dynamically alter its communication approach, such as modifying the timing of requests or the sequence in which systems are queried. This adaptability not only improves communication efficiency but also minimizes the risk of errors, ensuring that the diagnostic tool remains responsive and effective even with varying vehicle conditions.

The following description and accompanying drawings will elucidate features of various example embodiments. The embodiments provided are by way of example, and are not intended to be limiting. As such, the dimensions of the drawings are not necessarily to scale

II. Example Systems

FIG. 1 shows an operating environment 100 in which the example embodiments can operate. The operating environment 100 includes a computing system 102, a server 104, a communication network 106, a vehicle 108, a communication link 110, 112, 114, 116, and a vehicle network link 128. A vehicle network can be referred to as a "data bus within a vehicle," a "vehicle data bus," a "vehicle data network," or by some other term. In other examples, the operating environment 100 can include more or fewer elements, such as additional servers, vehicles, networks, and/or computing systems.

The computing system 102 can take various forms, such as a specialty computing system specifically configured in whole or in part for the purpose of servicing vehicles (e.g., the vehicle 108). In some instances, a specialty computing system can include unique elements for facilitating servicing of vehicles or can otherwise be uniquely configured in such a way that distinguishes the specialty computing from another type of computing system. In some examples, a specialty computing system can be configured to perform various functions associated with servicing vehicles, can include communication interfaces with other systems/servers/networks associated with servicing vehicles, and can be configured to send and receive data over those interfaces in accordance with one or more protocols associated with servicing vehicles. Alternatively, in some examples, the computing system 102 can be a general purpose, non-specialty computing system, such as a general purpose smart phone, desktop computer, laptop computer, or the like. As a general matter, the computing system 102—specialty or general purpose—can take the form of a hand-held device, laptop computer, desktop computer, and/or another type of device.

In some examples, the computing system 102 is a VST designed to communicate with the onboard computing systems of a vehicle. The VST can operate as an OBD-II scanner and use an associated standard for the sensors and ECUs that monitor the systems of the vehicle. For instance, the computing system 102 can connect to an onboard diagnostic connector (OBDC) 118 in the vehicle 108 and establish a communication link with an ECU 120 to retrieve DTCs and real-time data, which offers valuable information about the status of various vehicle systems. Once connected, the computing system 102 is able to interpret and display the retrieved data on its screen or another display interface, aiding technicians and other users in understanding the condition of vehicle systems and identifying potential issues. In some cases, the computing system 102 establishes a wireless communication connection with the onboard computing systems of the vehicle. For example, the computing system 102 can communicate wirelessly with a dongle 18 (shown in FIG. 2) connected to the OBDC 118.

The ECU 120 can include and/or represent one or more ECUs. For example, the ECU 120 can include and/or represent an ECU 24, an ECU 25, an ECU 26, and an ECU 27 shown in FIG. 4. As another example, the ECU 120 can include and/or represent the multiple ECUs shown in FIG. 11 or the multiple ECUs shown in FIG. 12.

The computing system 102 can enable the clearing of DTCs, such as after repairs. In some cases, the computing system 102 includes other features, such as live data streaming, graphing capabilities, and/or the ability to perform specific tests, providing technicians and users with comprehensive diagnostic capabilities for in-depth analysis and troubleshooting.

The operating environment 100 further includes the server 104 connected to the computing system 102 via the communication network 106. As such, the server 104 can take various forms as well, such as a specialty server specifically/uniquely configured for the purpose of servicing vehicles, or a general-purpose server. In some examples, the server 104 can be scaled so as to be able to serve any number of devices, such as one computing system (as shown in FIG. 1), one hundred computing systems, one thousand computing systems, or some other number of computing systems. The server 104 can store settings and other information for the computing system 102. For instance, the server 104 can save settings associated with user profiles, enabling technicians to user different computing systems when servicing vehicles while still having access to their desired settings.

In addition, the server 104 can also provide updates to the computing system 102 and other computing systems, such as new user-selectable controls. For example, the server 104 can send the computing system 102 a communication including data the computing system 102 can use to configure its user interface with USCs corresponding to a vehicle identifier associated with the vehicle 108. The server 104 can transmit that communication in response to receiving from the computing system 102 a communication including the vehicle identifier. Even more, the server 104 can transmit to the computing system 102 a communication including component identifiers (e.g., ECU identifiers) of ECUs in the vehicle 108 or ECUs in a particular zone in the vehicle.

The communication network 106 can include the communication link 110, 112, 114, 116 as well as other communication links (not shown in FIG. 1). The communication network 106 and the communication links 110, 112, 114, 116 can include various network elements such as switches, modems, gateways, antennas, cables, transmitters, and receivers. The communication network 106 can comprise a wide area network (WAN) that can carry data using packet-switched and/or circuit-switched technologies. The WAN can include an air interface and/or wire to carry the data. The communication network 106 can comprise a network or at least a portion of a network that carries out communications using a Transmission Control Protocol (TCP) and the Internet Protocol (IP), such as the communication network commonly referred to as the Internet. Additionally or alternatively, the communication network can comprise a local area network (LAN), private or otherwise.

The operating environment 100 further includes the vehicle 108 shown in communication with the computing system 102 and the communication network 106. In some cases, the vehicle 108 can connect to the computing system 102 without a direct connection to the communication network 106. In some other cases, the vehicle 108 can connect indirectly to the computing system 102 via a direct connection of the vehicle 108 and communication network 106. The computing system 102 and the vehicle 108 are removably connectable to one another and can be removably connectable to the communication network 106. Examples details regarding the vehicle 108 are described in Section VI of this description.

The computing system 102 and the vehicle 108 can be located at the same proximate location or remote from one another at separate, distinct locations. For example, both the computing system 102 and the vehicle 108 can be located at a repair shop. As another example, both the computing system 102 and the vehicle 108 can be located out on the road. As yet another example, the computing system 102 can be located at a repair shop and the vehicle 108 can be located out on the road. In accordance with this latter example, the computing system 102 and the vehicle 108 can communicate with each other via the communication network 106.

The vehicle 108 can transmit various data to the computing system 102, such as OBD data (e.g., DTCs), real-time and/or non-real-time electrical measurements (e.g., sensor readings), and/or other types of data. For example, the vehicle 108 can transmit data directly to the computing system 102 over communication link 114. As another example, the vehicle 108 can transmit data indirectly to the computing system 102 by transmitting the data over communication link 116, communication network 106, and the communication link 110 to the server 104, after which the server 104 can transmit the data over communication link 112, communication network 106, and communication link 110 to the computing system 102. The vehicle 108 can perform such indirect transmission of data with or without specifying the computing system 102 as a destination for the data. For instance, the vehicle 108 (and perhaps other vehicles in communication with the server 104) can transmit data to the server 104, specifying only the server 104 as the destination for the data. Thereafter, the computing system 102 can transmit to the server 104 a request for the data, the server 104 can assemble the data and transmit the data to the computing system 102 in response to the request.

The computing system 102, the server 104, and/or the vehicle 108 can transmit data to (and/or receive data from) other devices on the communication network 106 as well, such as one or more databases (not shown) to which the computing system 102, the server 104, and/or the vehicle 108 have access. As an example, a database in the vehicle 108 can include memory within an ECU for storing historical diagnostic data accessible to the computing system 102 by transmitting a VDM with a PID corresponding to the historical data. As yet another example, a database in the computing system 102 can include memory to store data received from the vehicle 108.

For any given computer system discussed herein, such as the computing system 102, the server 104, and/or the vehicle 108, data received by that device can be stored within a computer-readable memory for use by that device. Further, for any given computer system discussed herein, such as the computing system 102, the server 104, and/or the vehicle 108, data received by that device can be stored locally in memory at that device and/or can be stored remotely at a storage location accessible by that device (e.g., a remote server or remote database).

In the example embodiment, the operating environment 100 allows for a scenario in which the computing system 102 transmits to the server 104 a request for a download of information (e.g., information associated with a vehicle component of the vehicle 108). Such a request can include, for example, a vehicle identifier corresponding to the vehicle 108 and a name of a particular vehicle component (i.e., a "vehicle component identifier" or a "component identifier"). As another example, the request can include a vehicle identifier corresponding to the vehicle 108 and a symptom identifier (e.g., a description or code) corresponding to and/or exhibited by a particular vehicle component. As yet another example, the request can include data received from the vehicle 108, and such data can include a vehicle identifier corresponding to the vehicle 108, a symptom identifier corresponding to a particular vehicle component of the vehicle, an image of a particular vehicle component, among other possibilities.

In this scenario, upon receipt of the request, the server 104 can assemble the download. For instance, upon receipt of the request, the server 104 can retrieve some or all of the computing system-requested information from memory at the server 104. Additionally or alternatively, upon receipt of the request, the server 104 can in turn transmit to one or more databases located remotely from the server 104 a request for some or all of the computing system-requested information and then receive some or all of the computing system-requested information from the one or more databases. Upon assembling the download including the computing system-requested information, the server 104 can transmit the download to the computing system 102.

Figure 2:
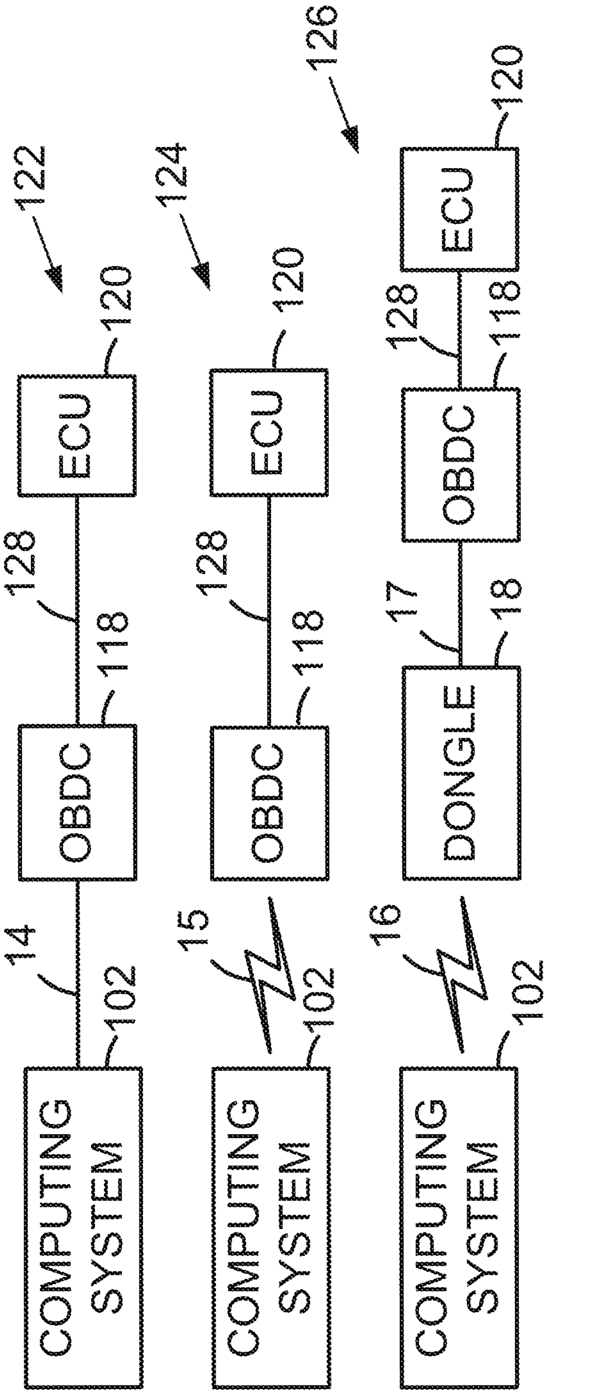
FIG. 2 shows connection arrangements, in accordance with the example embodiments.

Next, FIG. 2 shows an arrangement 122, 124, 126 for operatively connecting the computing system 102 to component(s) in the vehicle 108. In the arrangement 122, 124, 126, an OBDC 118 is operatively connected to the ECU 120 using a vehicle network link 128. The ECU 120 can include one or more ECUs in the vehicle, such as the ECU 24, 25, 26, 27 shown in FIG. 4, the ECU 120 shown in FIG. 5, or any other ECU described in this description.

In the arrangement 122, the computing system 102 is connected directly to the OBDC 118 using a wired communication link 14. As an example, the wired communication link 14 can be contained within a harness with multiple wires, at least one of which is configured to carry a VDM between the computing system 102 and the OBDC 118. The harness can include a connector removably attachable to the OBDC 118. The wired communication link 14 can include one or more wires.

In the arrangement 124, the computing system 102 is connected directly to the OBDC 118 using a wireless communication link 15. The wireless communication link 15 can include an air interface established to carry a VDM between the computing system 102 and the OBDC 118. The wireless communication link 15 and the air interface can be configured in accordance with a wireless communication standard or protocol, such as any wireless communication standard or protocol described in this description.

In the arrangement 126, the computing system 102 is connected indirectly to the OBDC 118 using a wireless communication link 16 and a dongle 18. The dongle 18 includes a connector 17 removably attachable to the OBDC 118 and a wireless transceiver and a wired transceiver. The wireless communication link 16 can include an air interface established to carry a VDM between the computing system 102 and the dongle 18. The wireless communication link 16 and the air interface can be configured in accordance with a wireless communication standard or protocol, such as any wireless communication standard or protocol described in this description. The wired transceiver of the dongle 18 can receive a VDM transmitted to the OBDC 118 over the vehicle network link 128 from an ECU and can transmit a VDM onto the vehicle network link 128 for transmission to an ECU connected to the OBDC 118.

In at least some embodiments, the computing system 102 and the vehicle 108 can connect to one another via a network established by those devices, such as a vehicle-to-client network, or the like. Such a network can comprise a personal area network (PAN). The PAN can be configured according to any of a variety of standards, protocols, and/or specifications. For example, the PAN can be configured according to a universal serial bus (USB) specification 2.0, 3.0, or 3.1 developed by the USB Implementers Forum. As another example, the PAN can be configured according to an Institute of Electrical and Electronics Engineers (IEEE) standard, such as an IEEE 802.11 standard (e.g., 802.11a, 802.11b, 802.11g, or 802.11n) or an IEEE 802.15 standard (e.g., 802.15.1, 802.15.3, 802.15.4, or 802.15.5) for wireless PAN.

Figure 3:
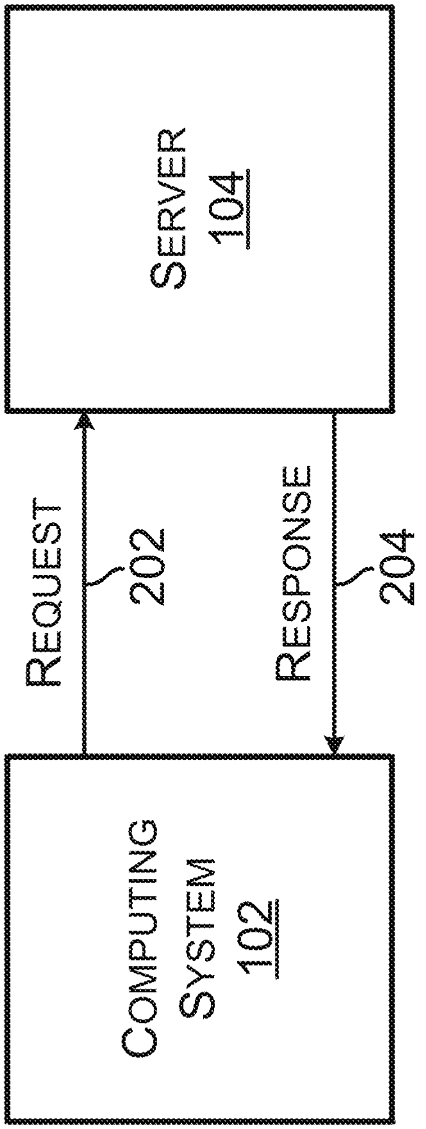
FIG. 3 is a communication flow diagram, according to one or more example embodiments.

Next, FIG. 3 illustrates a communication workflow between a computing system and a server. In the example embodiment, the computing system 102 can communicate with the server 104 to assist a user with the servicing of the vehicle 108. For instance, the computing system 102 can send a request 202 over a communication network (e.g., the communication network 106) to the server 104. The request 202 can include information describing the vehicle 108 (e.g., a vehicle identifier and related to operation of the vehicle 108 (e.g., symptoms). Upon receiving the request 202, the server 104 can transmit a response 204 to the request 202 back to the computing system 102. The response 204 can include various information that the computing system 102 can utilize.

As an example, the response 204 can include data that indicates component identifiers of ECUs (i.e., ECU identifiers) within the vehicle 108 and/or zone identifiers of ECU zones with the vehicle 108. The computing system 102 can use that data to populate a GUI with USCs selectable to cause the computing system 102 to transmit one or more VDM to the vehicle 108. In that regard, the one or more VDM can include, for example, an instruction for an ECU within the vehicle 108 to clear a DTC or output data (e.g., a DTC status or PID parameter value).

As another example, the response 204 can include USC identifiers. Similar to the example above, the computing system 102 can use the USC identifiers to populate a GUI with USCs selectable to cause the computing system 102 to transmit one or more VDM to the vehicle 108. The USC identifiers can correspond to a subset of ECUs in the vehicle 108, such as a set of ECUs in a particular zone within the vehicle 108.

As yet another example, the server 104 can transmit a threshold, multiple thresholds, or other information related to one or more PIDs that correspond to the vehicle 108. As such, the response 204 to the request 202 provided by the server 104 can allow the computing system 102 to display contextually relevant pieces of data or information about the vehicle 108, such as vehicle data parameter (VDP) graphs indicative of various PIDs, a list of PIDs, or a test to perform to service a vehicle with respect to a PID that breached a PID threshold. The list of PIDs can include an indexed list of PIDs applicable to the vehicle and operation of the vehicle described in the request 202. The VDP graphs provided in the response 204 can be based on PIDs that the computing system 102 provided to the server 104 before transmission of the request 202. The test within the response 204 can be a single test or a test within an indexed list of tests, such as an indexed list of component tests, an indexed list of functional tests, or an indexed list of reset procedures.

Figure 4:
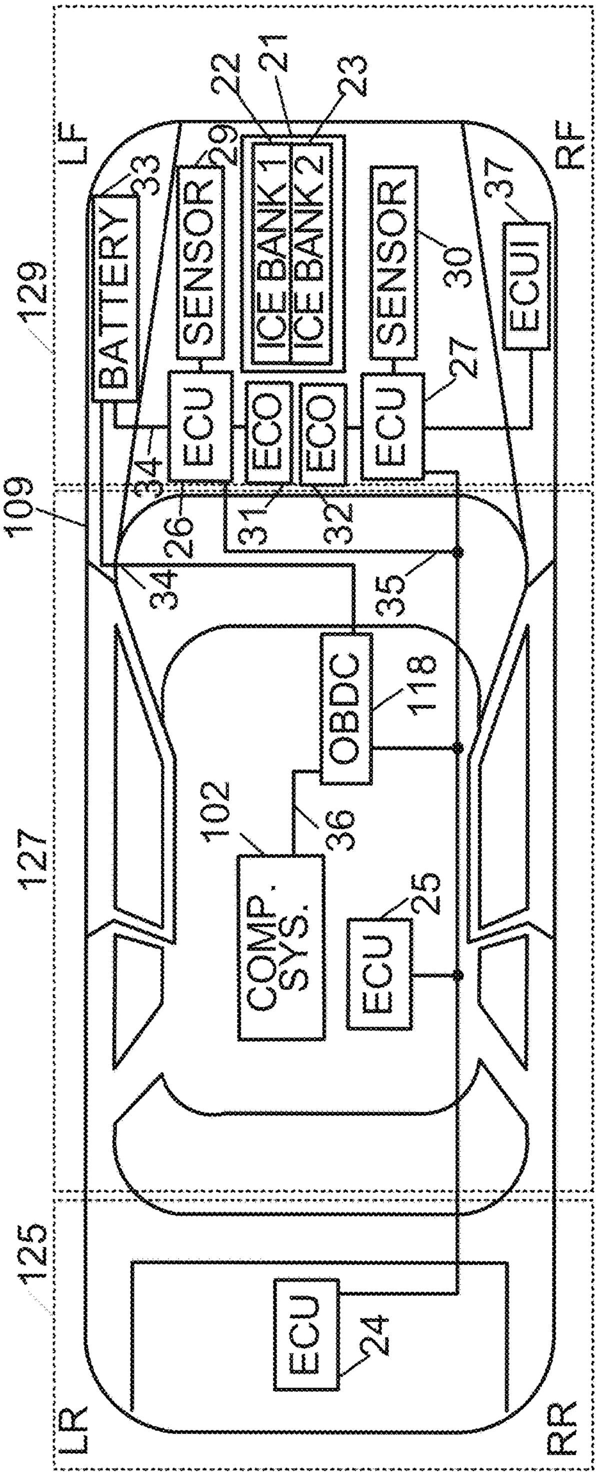
FIG. 4 and FIG. 5 is a diagram of a vehicle showing a placement of a computing system, according to one or more example embodiments.

Next, FIG. 4 shows a vehicle 109 and placement of the computing system 102 within the vehicle 109 in accordance with the example embodiments. In at least some embodiments, the vehicle 108 shown in FIG. 1 can be arranged like at least a portion of the vehicle 109. In at least some embodiments, the vehicle 109 can be included within the operating environment 100 in place of or in addition to the vehicle 108.

The vehicle 109 includes an internal combustion engine ICE 21 including a bank 22 and a bank 23. As an example, the bank 22 can be referred to as "bank 1", "left bank," and/or "front bank," and the bank 23 can be referred to as "bank 2," "right bank," and/or "rear bank." The vehicle 109 includes an ECU 24, 25, 26, 27, the OBDC 118, a sensor 29, 30, an ECU controlled output (ECO) 31, 32, a battery 33, and a battery-connected circuit 34. The ECU 24, 25, 26, 27 is operatively connected to the OBDC 118 via the vehicle network 35 to allow transmission of a VDM between the OBDC 118 and the ECU connected to the vehicle network 35. The vehicle network 35 can include a wired and/or wireless network and/or can include or be arranged like the vehicle network link 128 shown in FIG. 2. The vehicle 109 also includes an ECU input (ECUI) 37. An ECUI (e.g., the ECUI 37) can include a vehicle component (e.g., a sensor, a key cylinder) operatively connected to an input pin of an ECU.

In at least some embodiments, the OBDC 118 is located within a passenger compartment of the vehicle 109, within an engine compartment of the vehicle 109, or within a storage compartment within the vehicle 109 in front of or behind the passenger compartment. The computing system 102 can be removably attachable to the OBDC 118. The computing system 102 can connect to the OBDC 118 via a communication link 36. In at least some embodiments, the computing system 102 includes the communication link 36 (e.g., a harness). The computing system 102 is typically removed after the vehicle 109 has been serviced. In that way, the computing system 102 can be used to diagnose other vehicles. The OBDC 118 can be configured like and/or include the OBDC 118 shown in FIG. 2 and the communication link 36 can be configured like and/or include the wired communication link 14, the wireless communication link 15, and/or the wireless communication link 16 and the dongle 18 (all shown in FIG. 2).

The battery-connected circuit 34 can include one or more electrical circuits (e.g., one or more power circuits). FIG. 4 shows the battery-connected circuit 34 extending between the battery 33 and the ECU 26 and between the battery 33 and the OBDC 28. For clarity of FIG. 4, other examples of the battery-connected circuit 34 that extend between the battery 33 and some other vehicle component of the vehicle 109, such as the ECU 25, 26, 27, the sensor 29, 30, the ECO 31, 32 and the ECUI 37 are not shown in FIG. 4. The battery-connected circuit 34 between the battery 33 and the OBDC 28 can provide an electrical current to provide operational power for the computing system 102.

The sensor 29, 30 is a device that provides a signal to the ECU 26, 27, respectively. The signal represents some characteristic of a vehicle the ECU 26, 27 is configured to monitor. As an example, the sensor 29, 30 can include one from among: an accelerometer, a camshaft position sensor, a crankshaft position sensor, a current sensor, a fluid level sensor, a fluid pressure sensor, a fluid temperature sensor, a hall effect sensor, an infrared sensor, a knock sensor, a mass air flow sensor, an oil pressure sensor, an oxygen sensor, a photo transistor, a piezoelectric sensor, a position sensor, a pressure sensor, a rain sensor, a refrigerant sensor, a temperature sensor, a thermistor, a throttle position sensor, a tire pressure sensor, a vehicle speed sensor, a voltage sensor, a wheel speed sensor, a yaw rate sensor, or some other typo of sensor. The signal provided by the sensor 29, 30 can be a target signal that corresponds to a selected functional test. The ECU 26 can output a VDM that includes a data value representative of the signal on an electrical circuit connecting the ECU 26 and the sensor 29. Likewise, the ECU 27 can output a VDM that includes a data value representative of the signal on an electrical circuit connecting the ECU 27 and the sensor 30.

The ECO 31, 32 is a device controlled by the ECU 26, 27, respectively. The ECU 26, 27 can control the ECO 31, 32, respectively, using an output signal or an output condition. The output signal from an ECU can be a target signal that corresponds to a selected functional test. As an example, the ECO 31, 32 can include one from among: a fuel injector, a motor, a pump, a relay, solenoid, a transformer, or a valve. In accordance with at least some embodiments, an ECU is selectable to perform a functional test and/or provide a DTC in accordance with an industry standard, such as the SAE J1979_201202 and/or ISO 15031-5 standards for E/E diagnostic test modes. As an example, the output condition can include establishing a particular voltage level on an electrical circuit operatively connected or connectable to the ECO 31, 32. For instance, the particular voltage level can be a nominal 5-volt reference signal, a nominal 12-volt reference signal, or an electrical ground level signal (e.g., a nominal 0-volt reference level).

The output signal of the ECU 26, 27 (i.e., the ECU output signal) can be any of a variety of electrical or output signals. As an example, the ECU output signal can include an analog or digital electrical signal. As a more particular example, the ECU output signal can include a pulse-width modulated signal, a triangular waveform signal, a saw tooth waveform signal, a rectangular waveform signal, a square waveform signal, or a sinusoidal waveform signal, among others. As another example, the ECU output signal can include a video signal or an audio signal. As yet another example, the digital electrical signal can include a data transmission. As an example, a data transmission can be communicated using a serial peripheral interface (SPI) interface, an inter-integrated circuit (I2C) interface, or a universal asynchronous receiver transmitter (UART) interface, among others. In response to receiving a functional test command, a processor in the ECU can execute program instructions or logic to cause the ECU output condition or output signal to appear at and/or on the ECO 31, 32.

An ECU, such as the ECU 27 can receive from the computing system 102 a VDM including an identifier of a reset procedure and responsively send an output signal to the ECO 32 or the ECUI 37 to reset the ECO 32 or the ECUI 37, respectively.

FIG. 4 includes a rectangle 125, 127, 129. A portion of the vehicle 109 represented in the rectangle 125 can be referred to as a rear zone of the vehicle 109. A portion of the vehicle 109 represented in the rectangle 127 can be referred to as a central zone or a passenger zone of the vehicle 109. A portion of the vehicle 109 represented in the rectangle 129 can be referred to as a front zone or under hood zone of the vehicle 109. Other examples of define zones within a vehicle are also possible.

Figure 5:
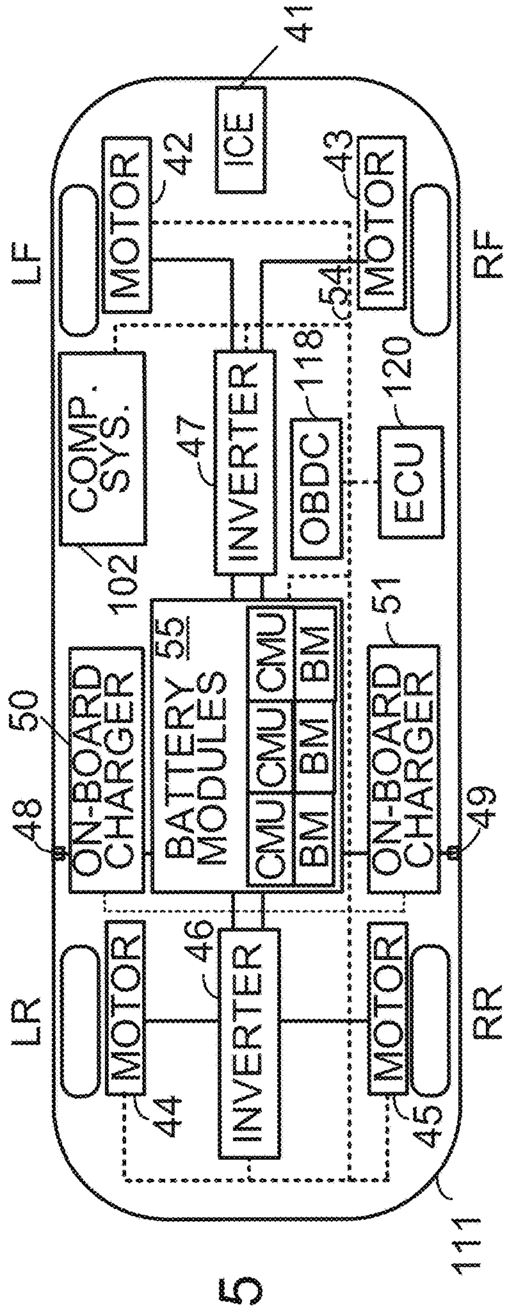

Next, FIG. 5 shows a vehicle 111 and placement of the computing system 102 within the vehicle 111 in accordance with the example embodiment. The vehicle 108 shown in FIG. 1 can be arranged like the vehicle 111. The vehicle 111 is an electric vehicle. In at least some embodiments, the vehicle 111 includes an internal combustion engine (ICE) 41 such that the vehicle 111 is a hybrid vehicle.

As shown in FIG. 5, the vehicle 111 includes a motor 42 at a left front location of the vehicle 40, a motor 43 at a right front location of the vehicle 40, a motor 44 at a left rear location of the vehicle 111, and a motor 45 at a right rear location of the vehicle 111. The vehicle 111 also includes an inverter 46, 47, a charge port 48, 49, an on-board charger 50, 51, an ECU 52, the OBDC 118, and a vehicle network 54. As an example, the charge port 48 can include an AC voltage charge port and the charge port 49 can include a DC voltage charge port. The vehicle 111 can further include battery modules 55 including multiple battery modules (BM) and multiple cell monitoring units (CMU). The CMU can determine parameters regarding the battery modules, such as a battery voltage, a battery temperature, or a battery internal resistance. One or more of the motor 42, 43, 44, 45, the inverter 46, 47, the charge port 48, 49, the battery modules 55, and/or one or more other components (e.g., a conductor or connector connected to the motor 42, 43, 44, 45, the inverter 46, 47, the charge port 48, 49, the battery modules 55) can include a high-voltage component.

Figure 6:
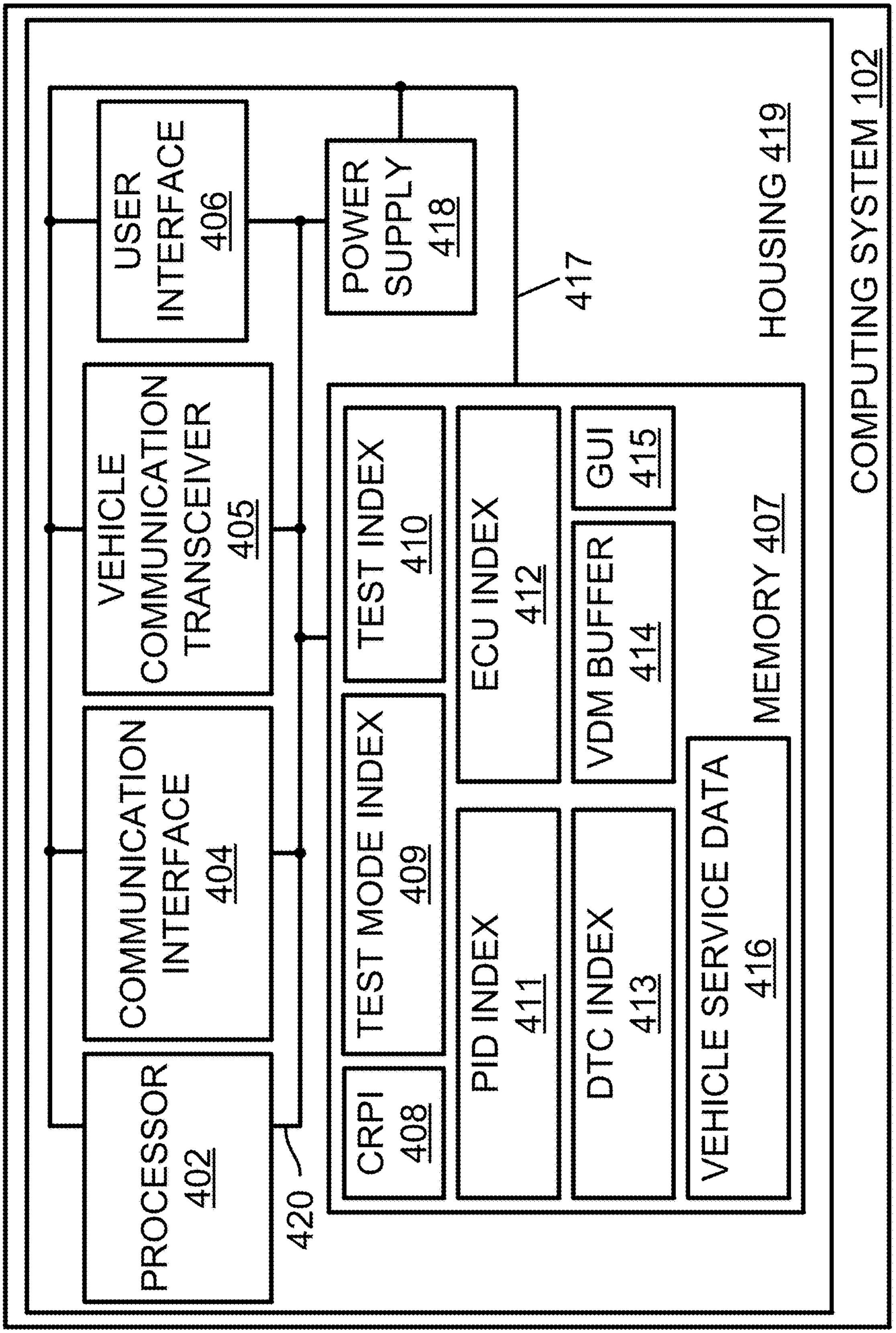
FIG. 6 is a block diagram of a computing system, according to one or more example embodiments.

FIG. 6 is a block diagram of the computing system 102. As indicated above, in some examples, the computing system 102 can operate as a VST (e.g., a vehicle diagnostic tool, scanner, or other type of VST). In those and/or in other examples, the computing system 102 can include and/or be arranged as a tablet computing system, a cellular phone (e.g., smartphone), a laptop or desktop computer, a head-mountable device (HMD), a wearable computing system, or a different type of fixed or mobile computing system.

As shown in FIG. 6, the computing system 102 includes a processor 402, a communication interface 404, a vehicle communication transceiver (VCT) 405, a user interface 406, a memory 407, an electrical circuit 417, a power supply 418, a housing 419, and/or a data bus 420. The data bus 420 can operatively connect two or more of the processor 402, the communication interface 404, the VCT 405, the user interface 406, the memory 407, or the power supply 418 to one another. In other words, the data bus 420 can provide an operative connection between two or more of the processor 402, the communication interface 404, the VCT 405, the user interface 406, the memory 407, or the power supply 418. An operative connection allows for the operatively connected devices to communicate with one another (e.g., electrically or optically). The computing system 102 can include more or fewer components within other examples.

A. Processor

A processor, such as the processor 402, a processor 602 shown in FIG. 8, and/or any other processor discussed in this description, can include one or more processors, such as one or more of the processors discussed below. In some implementations, the processor can include a general purpose processor, such as an INTEL® single core microprocessor or an INTEL® multicore microprocessor. A general purpose processor can be configured for operating within and/or can be disposed within a general purpose computer, such as a personal computer (PC).

In some implementations, the processor 402, 602 can include a special purpose processor, such as a neural network processor, a graphics processor, or an embedded processor. A special purpose processor can, but need not necessarily, be configured as an application specific integrated circuit (ASIC) processor.

An embedded processor refers to a processor with a dedicated function or functions within a larger electronic, mechanical, pneumatic, and/or hydraulic device, and is contrasted with a general purpose computer. In some implementations, the embedded processor can execute an operating system, such as a real-time operating system (RTOS). As an example, the RTOS can include the SMX® RTOS developed by Micro Digital, Inc., such that the processor 402, 602 can, but need not necessarily, include (a) an advanced RISC (reduced instruction set computer) machine (ARM) processor (e.g., an AT91SAM4E ARM processor provided by the Atmel Corporation, San Jose, California), or (b) a COLDFIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

In at least some embodiments, the processor 402 is configured to execute computer-readable program instructions (CRPI) 408 stored in the memory 407.

In at least some embodiments, the processor 402 includes one or more analog or digital inputs connectable to a sensor, such as a measurement probe, an oscilloscope probe, a multimeter lead, a transducer, or some other type of sensor. As an example, the sensor can output an analog voltage signal between zero volts and five volts or between some other voltage ranges. As another example, a sensor can output a pulse-width modulated signal between zero volts and twelve volts. Other examples of sensor outputs and sensor output voltage ranges are possible. The processor 402 can read the analog or digital inputs when performing a component test on the vehicle 108.

Figure 8:
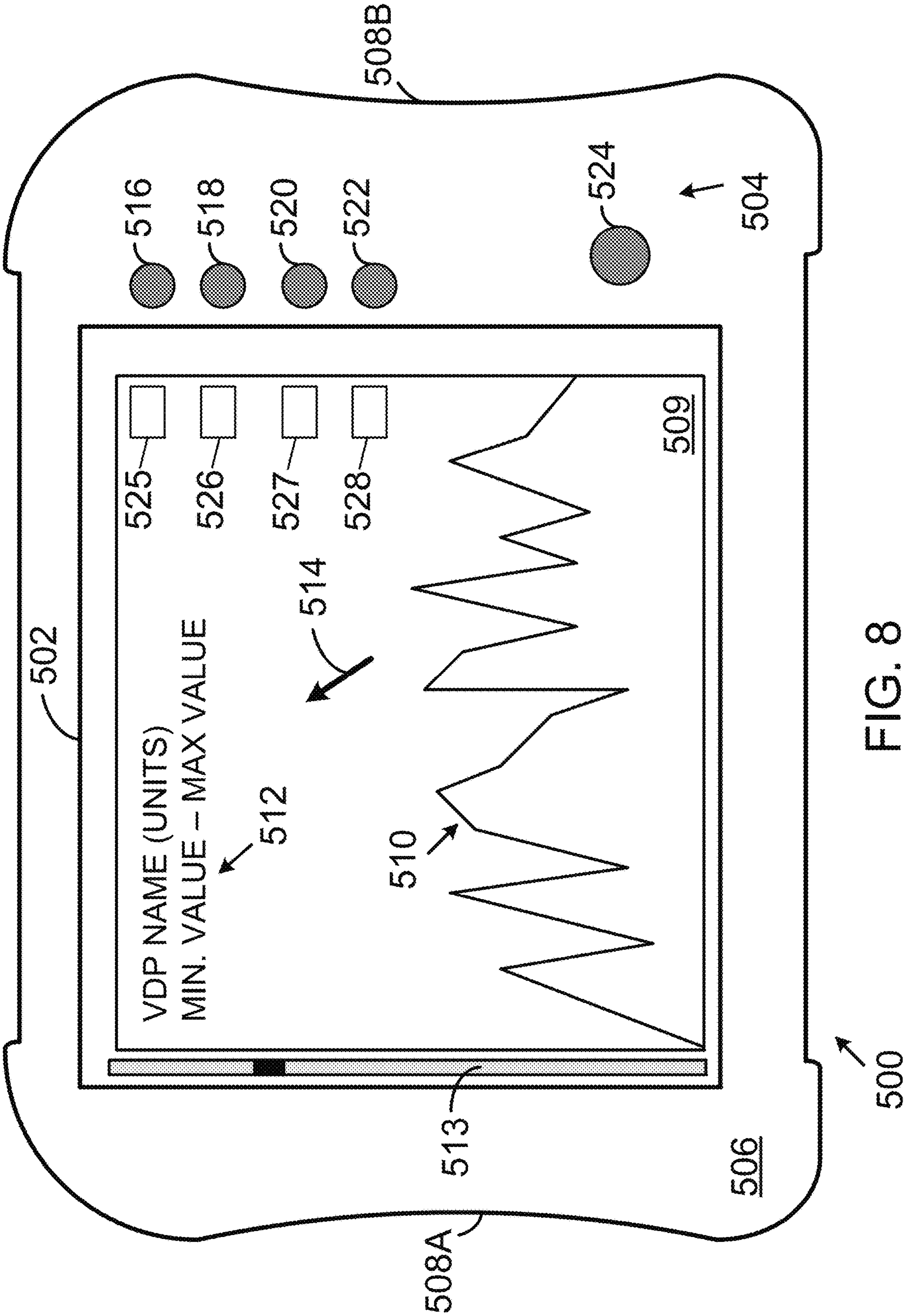
FIG. 8 is a diagram of a computing system with a display, according to one or more example embodiments.

Additionally or alternatively, the processor 402 includes one or more analog or digital inputs connected to a user interface component, such an input key of a user input section 504 shown in FIG. 8, or a touch screen display. The processor 402 can execute program instructions to periodically or continuously sample the analog or digital inputs to determine whether the user interface component or the touch screen display connected thereto has been used to select a USC.

B. Communication Interface

Figure 9:
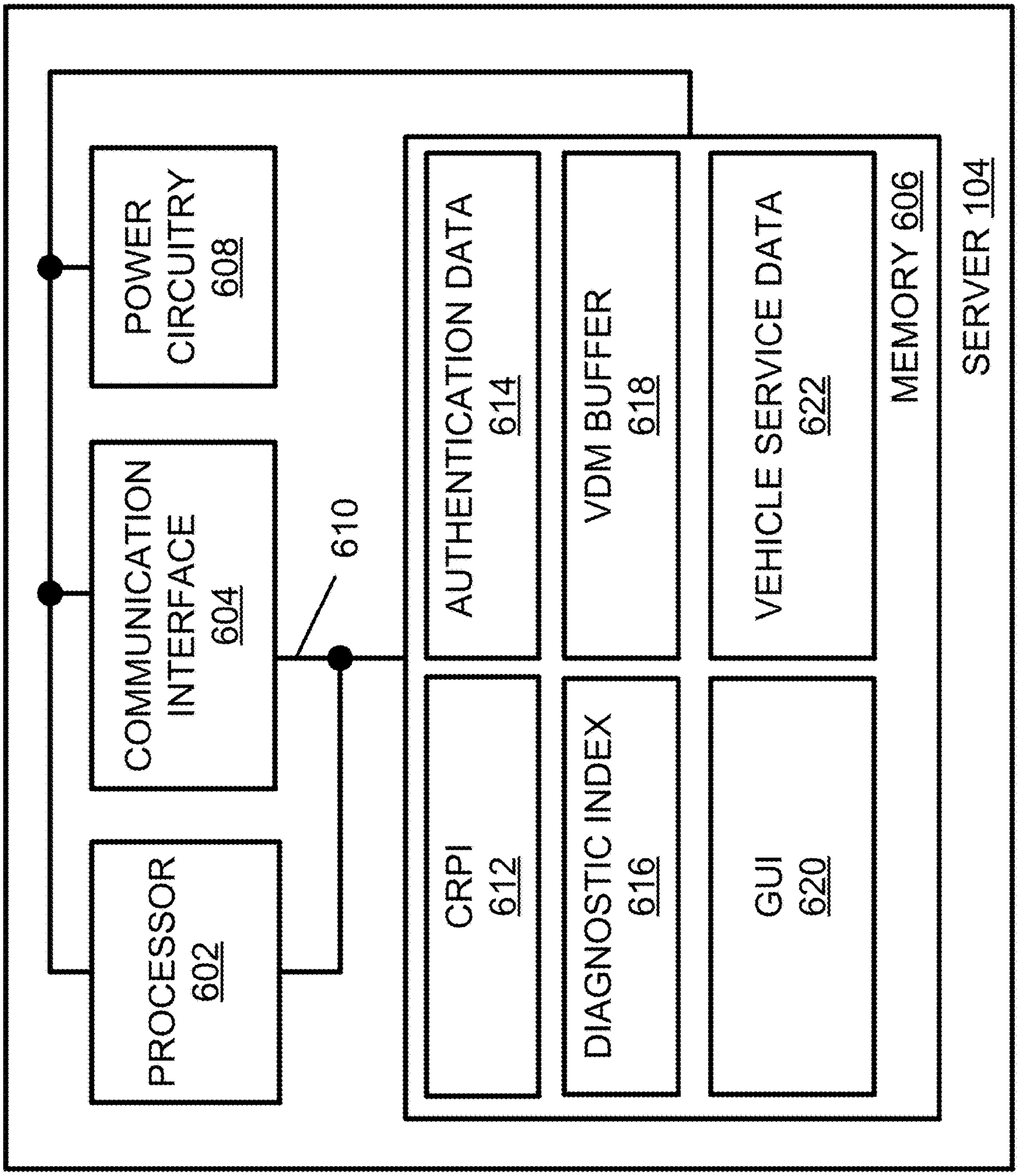
FIG. 9 is a block diagram of a server, according to one or more example embodiments.

A communication interface, such as the communication interface 404, a communication interface 604 shown in FIG. 9, and/or any other communication interface discussed in this description can include one or more communication interfaces. Each communication interface can include one or more transmitters configured to transmit data onto a network, such as the communication network 106. As such, the data transmitted by the communication interface 404 can comprise any data described herein as being transmitted, output, and/or provided by the computing system 102. Similarly, the data transmitted by the communication interface 604 can comprise any data described herein as being transmitted, output, and/or provided by the server 104. Additionally, each communication interface can include one or more receivers configured to receive data carried over a network, such as the communication network 106. The data received by the communication interface 404 can comprise any data described herein as being received by the computing system 102. Likewise, the data received by the communication interface 604 can comprise any data described herein as being received by the server 104. A transmitter and receiver of the communication interface 404 can be arranged as a transceiver. Similarly, a transmitter and receiver of the communication interface 604 can be arranged as a transceiver.

As an example, the communication interface 404 can transmit to the server 104 and/or the communication interface 604 can receive from the computing system 102 one or more of the following data items: a vehicle identifier, a vehicle data message, content of a vehicle data message (e.g., a DTC, DTC status identifier, a PID, or PID parameter value), a computing system identifier, a user identifier, user authentication data (e.g., a password), a component identifier, a vehicle zone identifier, or a USC identifier. Other examples of those data items are also possible.

As another example, the communication interface 404 can received from the server 104 and/or the communication interface 604 can transmit to the computing system 102 one or more of the following data items: a GUI, an index, an index identifier, a markup-language file, an object notation file (e.g., a JavaScript object notation (JSON) file), or diagnostic repair data. Other examples of those data items are also possible.

A transmitter can transmit radio signals carrying data and a receiver can receive radio signals carrying data. A transceiver with that transmitter and receiver can include one or more antennas and can be referred to as a "radio transceiver," an "RF transceiver," or a "wireless transceiver." The transmission of any data by a wireless transceiver can include the antenna transmitting that data. The reception of any data by a wireless transceiver can include the antenna receiving that data.

A radio signal transmitted or received by a radio transceiver can be arranged in accordance with one or more wireless communication standards or protocols such as an IEEE® standard, such as (i) an IEEE® 802.11 standard for wireless local area networks (wireless LAN) (which is sometimes referred to as a WI-FI® standard) (e.g., 802.11a, 802.11b, 802.11g, or 802.11n), (ii) an IEEE® 802.15 standard (e.g., 802.15.1, 802.15.3, 802.15.4 (ZIGBEE®), or 802.15.5) for wireless personal area networks (PANs), (iii) a BLUETOOTH® version 4.1 or 4.2 standard developed by the Bluetooth Special Interest Group (SIG) of Kirkland, Washington, (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, (xviii) the LoRaWAN communication standard, or (xix) a 5G new radio (5G NR) communication standard by the 3rd Generation Partnership Project (3GPP) standards organization, such as the 5G NR, first phase or 5G NR, second phase communication standard. Other examples of the wireless communication standards or protocols are possible.

Additionally or alternatively, a transmitter, such as a transmitter within any transceiver described in this description, can be configured to transmit a signal (e.g., one or more signals or one or more electrical waves) carrying or representing data onto an electrical circuit (e.g., one or more electrical circuits). Similarly, a receiver, such as a receiver within any transceiver described in this description, can be configured to receive via an electrical circuit a signal carrying or representing data over the electrical circuit. The electrical circuit can be part of a non-vehicle network, a vehicle network, or a multi-purpose network. The signal carried over an electrical circuit can be arranged in accordance with a wired communication standard such as TCP/IP, an IEEE® 802.3 Ethernet communication standard for a LAN, a data over cable service interface specification (DOCSIS standard), such as DOCSIS 3.1, a universal serial bus (USB) specification, a VDM protocol, or some other wired communication standard or protocol. Examples of a VDM protocol are listed in Section X of this description. An electrical circuit can include a wire, a printed circuit on a circuit board, and/or a network cable (e.g., a single wire, a twisted pair of wires, a fiber optic cable, a coaxial cable, a wiring harness, a power line, a printed circuit, a CAT5 cable, and/or CAT6 cable). The wire can be referred to as a "conductor". Transmission of data over the conductor can occur electrically and/or optically.

The data transmitted by a communication interface can include a destination identifier or address of a network device to which the data is to be transmitted. The data transmitted by a communication interface can include a source identifier or address of the system component including the communication interface. The source identifier or address can be used to send a response to the network device that includes the communication interface that sent the data.

A communication interface that is configured to carry out communications over the communication network 106, such as the communication interface 404, 604, can include a modem, a network interface card, and/or a chip mountable on a circuit board. As an example the chip can comprise a CC3100 Wi-Fi® network processor available from Texas Instruments, Dallas, Texas, a CC256MODx Bluetooth® Host Controller Interface (HCI) module available from Texas instruments, and/or a different chip for communicating via Wi-Fi®, Bluetooth® or another communication protocol.

C. Vehicle Communication Transceiver

The VCT 405 can include a transmitter configured for transmitting a VDM to the vehicle 108, to the OBDC 118, and/or to one or more ECUs (e.g., the ECU 120) within the vehicle 108. The processor 402 can provide the VCT 405 with the VDM that is to be transmitted by the VCT 405 or data for the VCT 405 to generate and then transmit the VDM. The VCT 405 can include a receiver configured for receiving a VDM transmitted by the vehicle 108 and/or by an ECU (e.g., the ECU 120) within the vehicle 108. As an example, the transmitter and the receiver of the VCT 405 can be arranged as a transceiver. As another example, the transmitter and the receiver of the VCT 405 can be integrated into a single semiconductor chip. As yet another example, the transmitter and the receiver of the VCT 405 can be separate semiconductor chips.

In accordance with at least some embodiments, the VCT 405 is configured to communicate with the vehicle 108 using a wired connection. The computing system 102 can include a wiring harness removably connectable to the OBDC 118. The wiring harness can be configured to provide a wired connection between the computing system 102 and the vehicle 108. The OBDC 118 can connect to an ECU, such as the ECU 120, via a conductor (e.g., an electrical or optical circuit and/or the vehicle network 35, 54) within the vehicle 108. In at least some embodiments, the wiring harness of the computing system 102 can connect directly to the ECU. The computing system 102 can include and/or connect to a connector, such as a connector located at the end of the wiring harness. An electrical circuitry within the computing system 102 can connect the connector to the VCT 405.

In accordance with at least some embodiments, the VCT 405 is configured to communicate with the vehicle 108 wirelessly. As an example, the VCT 405 can communicate with the vehicle 108 wirelessly by way of the dongle 18 connected to the OBDC 118. As an example, the VCT 405 can transmit to the dongle 18 radio signals carrying data, such as a request for PID parameters. The dongle 18 can receive the radio signals, generate a VDM based on the data carried by the radio signals, and transmit the VDM onto a vehicle network, such as the vehicle network 35, 54. Additionally, the VCT 405 can receive radio signals transmitted by the dongle 18. The VCT 405 can recover data represented by the received radio signals to determine a VDM transmitted by an ECU within the vehicle 108. As an example, that VDM can include a VDM containing a PID and corresponding PID parameter.

In accordance with at least some embodiments, the VCT 405 is configured to communicate with the vehicle 108 via a wired connection or wirelessly. In that regard, a user may choose which communication arrangement she wants to user. As an example, if the user wishes to walk around the vehicle 108 while holding the computing system 102, the user may choose for the computing system 102 to communicate with the vehicle 108 wirelessly by way of the dongle 18. As another example, if a battery within the power supply 418 has a low state of charge and/or the user has misplaced the dongle 18, the user may choose for the computing system 102 to communicate with the vehicle 108 using a wired connection.

The VCT 405 can be configured to transmit a VDM according to a VDM protocol and to receive a VDM according to the VDM protocol. In one implementation, the VCT 405 can be configured to transmit VDMs according to multiple VDM protocols and to receive VDMs according to multiple VDM protocols. As an example of that implementation, the VCT 405 can include multiple semi-conductor chips, each semi-conductor chip dedicated for transmitting and receiving VDM according to at least one VDM protocol. As another example, the transmitter of the VCT 405 can include multiple transmitters where each transmitter is configured for transmitting a VDM according to a different VDM protocol. If equipped with multiple transmitters or otherwise, the VCT 405 can include multiple receivers, where each receiving is configured for receiving a VDM accord to a different VDM protocol.

D. User Interface

The user interface 406 includes one or more components (i.e., one or more user interface components). The user interface 406 can include one or more displays to visually present information, such as information to guide a user when servicing the vehicle 108. Example display technology discussed with respect to a display 502 shown in FIG. 8 is applicable to the one or more displays of the user interface 406.

The user interface 406 can include one or more display interfaces (e.g., graphical user interfaces) configured to display information to a user on a display. For instance, the user interface 406 can include a display interface that allows a user to interact with the computing system 102 through USCs, graphical icons, and/or visual indicators. As an example, a graphical indicator can include a non-textual indicator. As another example, a visual indicator can include a textual indicator.

In at least some embodiments, a USC includes a graphical icon and/or a visual indicator. In at least some other embodiments, a USC is separate from a graphical icon and/or a visual indicator. Example aspects output and/or outputtable on a display described elsewhere in this description are applicable to aspects that are output and/or outputtable via the user interface 406. Various example graphical user interfaces are described below with regards to FIG. 13 to FIG. 23.

The user interface 406 includes one or more USCs selectable by a user to input data and/or selections to the processor 402. In that regarding, the USCs can receive user inputs and other information. The USCs can include buttons, switches, joysticks, or other physical structures configurable to receive inputs from one or multiple users. For example, the user interface 406 can include a USC (e.g., a button) that a user can use to select one or multiple ECUs or systems within the vehicle 108. As another example, the user interface 406 can include a USC that a user can use to select a zone defined for the vehicle 108. The zone can include one or multiple ECUs.

As another example, the user interface 406 can include one or more microphones configured to detect and receive vocal input from users and/or other sounds. In some examples, the microphones can detect and receive any sound as the sound occurs (e.g., when the user provides a vocal input, the microphone captures it). Alternatively, the microphones can be configured to only detect audio in response to the user pushing a button, using an associated application, or some other form of activation technique.

E. Memory

A memory, such as the memory 407, the memory 606 shown in FIG. 9, and/or any other memory discussed in this description, can include one or more memories. A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable medium." Any of those alternative terms can be preceded by the prefix "transitory" if the memory is transitory or "non-transitory" if the memory is non-transitory. For instance, the memory 407 can comprise a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor. For example, the memory 407 can include one or more registers within the processor 402, and/or the memory 606 can include one or more registers within the processor 602.

F. Power Supply

A power supply, such as the power supply 418 and/or any other power supply discussed in this disclosure, can include a conductive connection to an external power source, and/or circuitry to provide an electrical current to electrically-operable component(s) connected to the power supply. As an example, the external power source can include a wall outlet at which a connection to an alternating current can be made. As another example, the external power source can include an energy storage device (e.g., a battery) or an electric generator. As yet another example, electrically-operable component(s) referenced above can include the processor 402, the communication interface 404, the VCT 405, the user interface 406, and/or the memory 407.

Additionally or alternatively, a power supply, such as the power supply 418 or any other power supply discussed in this disclosure, can include a connection to an internal power source, and/or power transfer circuitry to provide an electrical current to flow to electrically-operable component(s) connected to the internal power source. As an example, the internal power source can include an energy storage device, such as a battery.

Furthermore, a power supply, such as the power supply 418 or any other power supply discussed in this disclosure, can include and/or connect to a circuit protector and/or a signal conditioner.

G. Housing

The housing 419 can provides support for the processor 402, the communication interface 404, the VCT 405, the user interface 406, the memory 407, the data bus 420, and/or the power supply 418. The support provided by the housing 419 can be direct support in which another component of the computing system 102, such as a display of the user interface 406 directly contacts the housing 419. Additionally or alternatively, the support provided by the housing 419 can be indirect support in which another component of the computing system 102 is located upon or within another component of the computing system 102 that directly contacts the housing 419. For instance, the computing system 102 can include a circuit board or other substrate that directly contacts the housing 419 and upon which the processor 402, the communication interface 404, the VCT 405, the user interface 406, the memory, the electrical circuit 417, the data bus 420, and/or the power supply 418 is disposed.

H. Memory Content

The memory 407 stores computer-readable data. As shown in FIG. 6, the memory 407 can include the computer-readable program instructions (CRPI) 408, a test mode index 409, a test index 410, a PID index 411, an ECU index 412, a DTC index 413, a VDM buffer 414, a GUI 415, and/or vehicle service data 416. Other examples of data stored in the memory are also possible.

CRPI, such as the CRPI 408, the CRPI 612 shown in FIG. 9, or any other CRPI discussed in this description, can comprise a plurality of program instructions executable by a processor. The CRPI can also include data structures, objects, programs, routines, or other program modules that can be accessed by a processor and executed by the processor to perform a particular function or group of functions and are examples of program codes for implementing steps for methods described in this description. In general, the CRPI 408 can include program instructions to cause the computing system 102 to perform any function described herein as being performed by the computing system 102 or to cause any component of the computing system 102 to perform any function herein as being performed by that component of the computing system 102. For example, the CRPI 408 can include program instructions to perform one or more functions of a set 1200 of functions shown in FIG. 10 or any function described as being performed as part of a method including any one or more functions of the set 1200 of functions.

The program instructions within the CRPI 408 can include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a conventional procedural programming language, such as the "C" programming language. In at least some embodiments, the processor 402 is configured to execute hard-coded functionality in addition to or as an alternative to software-coded functionality (e.g., via the CRPI 408). The hard-code functionality can include any functionality described with respect the CRPI 408.

Next, the test mode index 409 can include one or more indices. For example, the test mode index 409 can include an index the processor 402 can use to determine data to provide the VCT 405 for transmitting one or more VDMs to the vehicle 108 and/or how to configure the user interface 406 with one or more USCs that are selectable to cause the VCT 405 to transmit one or more VDMs to the vehicle 108. Table A shows an example of data contained within the test mode index 409. The data in Table A includes a vehicle identifier corresponding to other data shown in Table A. The vehicle identifier in Table A is represented as a YMM (discussed in Section VI), but can be represented in some other arrangement. The data in Table A includes a VDM protocol identifier, such as VDMP-1. As an example, VDMP-1 can represent an OBD-I VDM protocol used on at least vehicles manufactured by the former General Motors Corporation.

The data in Table A include ranges of ECU identifiers form normal mode communications when a VST is not connected to the vehicle network or when the VST is connected to the vehicle network and monitoring normal mode communications. The data in Table A include ECU identifiers for VDM to be sent to an ECU of system associated with a corresponding system identifiers when the VST is communicating on the vehicle link. The data in Table A include a VDM protocol identifier to indicate which VDM protocol (examples of which are discussed in Section VI) is to be used to communicate with an ECU in the vehicle corresponding to the vehicle identifier. The data in Table A include system identifiers of different systems within a vehicle corresponding to the vehicle identifier YMM-1. The data in Table A include data (i.e., A, B, C, D, E, F) that indicates different groups of ECUs.

A person having ordinary skill in the art will understand that the test mode index 409 can include data including a vehicle identifier, ECU identifiers, test message identifiers, system identifiers, VDM protocol identifiers, and ECU group identifiers for more than one group of like vehicles. A person having ordinary skill in the art will also understand that more than one vehicle identifier may correspond to the ECU identifiers, the system identifiers, the test message identifiers, and the VDM protocol identifiers in Table A. The test mode index 409 can also include mode identifiers to include in VDM to command one or more ECUs to perform certain functions. As an example, the mode identifiers can include: $00 for return to normal mode, $01 for transmit PID data, $02 for perform memory dump, $03 for examining memory, $04 for device control functions, $05 for a RAM download request, $06 for a RAM download and execute, $07 for command messages, $08 for disable normal mode communications, $09 for enable normal mode communications, $0A for clearing DTCs, $0B for normal communication control, and $0C to modify a block of memory. Other examples of the mode identifiers are also possible.

The CRPI 408 can include instructions executable by the processor 402 to generate and/or output a user interface (e.g., a GUI) based on data within the test mode index 409 For example, the processor 402 can generate and/or output a user interface 1550 (shown in FIG. 15) based on data contained within Table A.

TABLE A

| Vehicle ID | ECU ID Normal Mode | TEST MESSAGE ID | System ID | VDM Protocol ID | ECU Group |
|---|---|---|---|---|---|
| YMM-1 | $10-$17 | $F1 | Body/central control | VDMP-1 | A |
| YMM-1 | $20-$2F | $F2 | Primary display device | VDMP-1 | B |
| YMM-1 | $30-$3F | $F3 | Secondary display device | VDMP-1 | B |
| YMM-1 | $40-$47 | $F4 | Engine control | VDMP-1 | C |
| YMM-1 | $50-$57 | $F5 | Transmission control | VDMP-1 | C |
| YMM-1 | $60-$67 | $F6 | Compass | VDMP-1 | D |
| YMM-1 | $68-$6F | $E6 | Engine oil life monitor | VDMP-1 | C |
| YMM-1 | $70-$77 | $F7 | Ride control | VDMP-1 | E |
| YMM-1 | $80-$87 | $F8 | Steering control | VDMP-1 | E |
| YMM-1 | $90-$97 | $F9 | Brake/traction control | VDMP-1 | E |
| YMM-1 | $A0-$A7 | $FA | Supplemental inflatable restraint | VDMP-1 | F |
| YMM-1 | $A8-$AF | $EA | HVAC control | VDMP-1 | A |
| YMM-1 | $B0-$B7 | $FB | Audio warning | VDMP-1 | D |
| YMM-1 | $B8-$BF | $EB | Remote accessory control | VDMP-1 | A |
| YMM-1 | $C0-$C7 | $FC | Throttle control | VDMP-1 | C |
| YMM-1 | $C8-$CF | $EC | Calculator | VDMP-1 | B |
| YMM-1 | $D0-$D7 | $FD | Cellular phone | VDMP-1 | D |
| YMM-1 | $D8-$DF | $ED | Memory seat/mirror | VDMP-1 | A |

Table B, shown below, includes example data of another test mode index of the test mode index 409. The data in Table B includes a vehicle identifier corresponding to other data shown in Table B. The vehicle identifier in Table B is represented as a YMM (discussed in Section VI), but can be represented in some other arrangement. The data in Table B includes a VDM protocol identifier, such as VDMP-2. As an example, VDMP-2 can represent an OBD-II VDM protocol according to an SAE J1979 standard used on vehicles manufactured by many OEMs.

TABLE B

| Vehicle ID | TEST MODE ID | TEST MODE | VDM Protocol ID |
|---|---|---|---|
| YMM-2 | $01 | Show current PID data | VDMP-2 |
| YMM-2 | $02 | Show freeze frame PID data | VDMP-2 |
| YMM-2 | $03 | Show DTC | VDMP-2 |
| YMM-2 | $04 | Clear DTC | VDMP-2 |
| YMM-2 | $05 | Test results - oxygen sensors | VDMP-2 |
| YMM-2 | $06 | Test results - non-continuous monitored | VDMP-2 |
| YMM-2 | $07 | Show pending DTC | VDMP-2 |
| YMM-2 | $08 | Control mode | VDMP-2 |
| YMM-2 | $09 | Request vehicle ID | VDMP-2 |
| YMM-2 | $0A | Request DTC with permanent status | VDMP-2 |

Next, the test index 410 can include an index or multiple indexes (i.e., indices). As an example, the test index 410 can include a test index for each group of vehicles corresponding to one or more vehicle identifiers. As another example, the test index 410 can include multiple indexes (such as multiple indexes that correspond to a respective, different vehicle identifier). As yet another example, an index can include data corresponding to a single type of tests, such as functional tests, component tests, or reset procedures. In accordance with at least some embodiments, a test index can include an identifier corresponding to one or more tests and data the processor 402 can use to configure the computing system 102 for performing a test and/or for transmitting an instruction and/or VDM to cause an ECU within a vehicle to perform the test or to cause a test device (e.g., an oscilloscope or multimeter) to perform the test.

The PID index 411 can include an index or multiple indexes (i.e., indices). As an example, the PID index 411 can include a PID index for each group of vehicles corresponding to one or more vehicle identifiers. As another example, the PID index 411 can include multiple indexes (such as multiple indexes that correspond to a respective, different vehicle identifier). A PID index can include a list of PIDs (i.e., parameter identifier) corresponding to an ECU within the vehicle 108. The list of PIDs can include a hexadecimal representation of each PID, a textual representation of each PID, a unit's indicator for each PID, a formula corresponding to parameter values associated with each PID, and/or one or more thresholds or baseline values associated with each PID. A PID index can include data that indicates a VDM protocol used by an ECU to report requested PID parameter values. The PID index 411 can include a PID index like the PID index shown in FIG. 7.

FIG. 7 shows a PID index 700 in accordance with the example embodiments. The PID index 700 includes an ordered list of PIDs. As an example, the list of PIDs can be ordered sequentially based on a numerical version of the PID from least to greatest PID. The PID index includes three example representations of PIDs (i.e., PID numbers 702, index values 704, PID names 706 (e.g., at least one word describing a PID), and unit identifiers 708). A different PID index (for use with the example embodiments) can represent PIDs using only one of those three example representations, a combination of any two of those three example representations, or with a different example PID representation.

The index values 704 can, for example, comprise decimal, hexadecimal, or numbers of some other base to represent the PIDs within the PID index 700. Other example PID indexes can comprise multiple PID indices, such as a separate PID index for each of multiple different set of particular identifying information (e.g., a separate PID index for each Y/M/M or Y/M/M/E). As such, the separate PID index can be arranged like the PID index 700 or in another manner. The PID index 700 can comprise or be associated with particular vehicle identifying information. The server 104 can provide a PID index to the computing system 102 for identifying suggested PIDs to request from the vehicle 108 to diagnose the vehicle 108.

The unit identifiers 708 indicates a type of units corresponding to a PID. Some of the PIDs may not be associated with any unit identifier, such as the PIDs corresponding to the unit identifier shows as "None."

A PID index, such as the PID index 700, can include one or more thresholds corresponding to a PID within the PID index. As an example, the one or more thresholds corresponding to a PID can comprise a maximum threshold value and/or a minimum threshold value.

In at least some embodiments, the maximum threshold value represents a maximum data value for a parameter value corresponding to the PID, a maximum data value of the parameter value corresponding to the PID before an ECU that generates the PID will determine a malfunction within the vehicle, or a maximum baseline value for the parameter value corresponding to the PID before the computing system 102 determines a degraded operating condition or an expected malfunction within the vehicle.

In at least some embodiments, the minimum threshold value represents a minimum data value for a parameter value corresponding to the PID, a minimum data value of the parameter value corresponding to the PID before an ECU that generates the PID will determine a malfunction within the vehicle, or a minimum baseline value for the parameter value corresponding to the PID before the computing system 102 determines a degraded operating condition or an expected malfunction within the vehicle.

The PID index 411 can include one or more thresholds for each of one or more PIDs represented in the PID index 411. Moreover, PID index 411 can comprise one or more thresholds for PIDs from each set of vehicles identifiable by some particular vehicle identifying information. In this way, the server 104 can provide the computing system 102 with applicable thresholds with respect to a particular vehicle connected to the computing system 102.

In at least some embodiments, the PID index 411 can comprise thresholds defined by a vehicle manufacturer. For a particular PID associated with a DTC, the vehicle manufacturer can define the maximum threshold value as the greatest data value for the particular PID an ECU would output while the associated DTC is set to inactive, and the vehicle manufacturer can define the minimum threshold value as the lowest data value for the particular PID the ECU would output while the associated DTC is set to inactive.

In at least some other embodiments, the PID index 411 can comprise thresholds determined by the server 104 from PID data values received within communications that include PID data values. The server 104 can store the received PID data values within the VDM buffer 618 and determine the maximum and minimum threshold values for each PID for each set of vehicles identifiable by particular vehicle identifying information.

Returning to FIG. 6, the ECU index 412 can include one or more sets of data. As an example, a set of data within the ECU index 412 can include a vehicle identifier and one or more ECU identifiers corresponding to ECUs contained or possibly contained within a vehicle corresponding to the vehicle identifier. An ECU identifier of an ECU can be classified as possibly contained within a vehicle if that ECU is optional on some of the vehicles having the vehicle identifier corresponding to set of data within the ECU index 412. In at least some embodiments, a vehicle identifier within the ECU index 412 is arranged like any vehicle identifier described in this description. As an example, an ECU identifier can be specified as a two digit hexadecimal number similar to the ECU identifiers shown in Table A above. In at least some embodiments, the computing system 102 requests the ECU index from the server 104 after determining a vehicle identifier based on a selection made using the user interface 406 and/or based on a vehicle identification number retrieved from the vehicle 108. In at least some embodiments, the ECU index 412 includes a respective set of data for multiple, different types of vehicles. The ECU index 412 can include a VDM protocol identifier corresponding to each ECU within the index.

The processor 402 can read the ECU index 412 to determine ECU identifiers for ECUs within the vehicle 108 and VDM protocols for attempting to communicate with the ECUs within the vehicle 108. The processor 402 can execute the CRPI 408 to generate one or more VDMs directed to one or more ECUs represented in the ECU index 412 using a VDM protocol identified within the ECU index.

Table C shows an example of the types of data that can be contained within the ECU index 412. Table shows data corresponding to vehicles having a vehicle identifier represented as YMM-3. The left-most column in Table C includes textual names of ECUs that can be contained with vehicles identifiable using the vehicle identifier YMM-3. Moving rightward, the next column in Table C includes a hexadecimal representation of an ECU identifier. Again moving rightward, the next three columns include ECU group identifiers (i.e., integers from 1 to 14) of different predetermined groups of ECUs. The right-most column in Table C includes VDM protocol identifiers corresponding to VDM protocols usable to communicate with an ECU within the vehicle.

The processor 402 can execute the CRPI 408 to populate a GUI that includes a USC that corresponds to a group of ECUs represented by an ECU group identifier within Table C. For example, the USC can correspond to a group of ECUs for the ECU group identifier "5" for a group of ECUs including an ECU for a headlamp range adjustment system, a xenon headlamp system, and a tail lamp system. The GUI can include a USC can additionally correspond to a particular function the group of ECUs can perform, such as clear one or more DTCs or respond with a status of one or more trouble codes being sent by the group of ECUs. Upon selection of the USC the processor 402 can transmit and/or cause a VDM to be transmitted to each ECU in the group of ECUs according to the specified VDM protocol (e.g., VDMP-2).

In accordance with embodiments in which one or more ECUs besides the ECUs in the group of ECUs are connected to a vehicle network along with the ECUs in the group of ECUs, the VDMs transmitted by the processor 402 can include physical VDMs directed specifically to each ECU in the group of ECUs. In accordance with embodiments in which the ECUs of the group of ECUs are the only ECUs connected on a particular vehicle network, the processor 402 can transmit, onto the particular vehicle network, a single functional VDM that each ECU within the group of ECUs can receive and act upon. In accordance with at least some other embodiments, the processor 402 can transmit one or more VDMs to a gateway that separates a first vehicle network to which the computing system 102 is connected and a second vehicle network to which the ECUs of the group of ECUs are connected.

TABLE C

| ECU FOR YMM-3 | ECU ID | ECU GRP. | ECU GRP. | ECU GRP. | VDM Protocol ID |
|---|---|---|---|---|---|
| Door Control Module Front Driver Side | $01 | 1 | 9 | — | VDMP-2 |
| Door Control Module Front Passenger Side | $02 | 1 | 9 | 13 | VDMP-2 |
| Door Control Module Rear Driver Side | $03 | 1 | 9 | — | VDMP-2 |
| Door Control Module Rear Passenger Side | $04 | 1 | 9 | 14 | VDMP-2 |
| Rear-end Door Closing Control | $05 | 1 | — | — | VDMP-2 |
| Trunk Lid Control | $06 | 1 | — | — | VDMP-2 |
| Rollover Bar Soft Top Control | $07 | 1 | 10 | — | VDMP-2 |
| Electrohydraulic Soft Top | $08 | 1 | 10 | — | VDMP-2 |
| Adaptive Brake | $09 | 2 | — | — | VDMP-2 |
| Anti-lock Braking System | $0A | 2 | — | — | VDMP-2 |
| Brake Assist | $0B | 2 | — | — | VDMP-2 |
| Sensotronic Brake Control | $0C | 2 | — | — | VDMP-2 |
| Vacuum Pump Brake Booster | $0D | 2 | — | — | VDMP-2 |
| Seat Heater | $0E | 3 | — | — | VDMP-2 |
| Heated Steering Wheel | $0F | 3 | — | — | VDMP-2 |
| A/C Operating Unit | $10 | 3 | — | — | VDMP-2 |
| Stationary Heater with Remote Control | $11 | 3 | — | — | VDMP-2 |
| Automatic Temperature Control | $12 | 3 | — | — | VDMP-2 |
| Rear Control Panel | $13 | 4 | 11 | — | VDMP-2 |
| Lower Control Panel | $14 | 4 | — | — | VDMP-2 |
| Upper Control Panel | $15 | 4 | — | — | VDMP-2 |
| Front Control Panel | $16 | 4 | 12 | — | VDMP-2 |
| Headlamp Range Adjustment | $17 | 5 | — | — | VDMP-2 |
| Xenon Headlamp | $18 | 5 | — | — | VDMP-2 |
| Tail Lamps | $19 | 5 | — | — | VDMP-2 |
| Engine Control | $1A | 6 | — | — | VDMP-2 |
| Common Rail Diesel Injector | $1B | 6 | — | — | VDMP-2 |
| Electronic In-line Injection System | $1C | 6 | — | — | VDMP-2 |
| Fuel Pump | $1D | 6 | — | — | VDMP-2 |
| Motor Electronics | $1E | 6 | — | — | VDMP-2 |
| Transmission Control | $1F | 6 | — | — | VDMP-2 |
| Drive Authorization System | $20 | 6 | — | — | VDMP-2 |
| Cameras - Front | $21 | 7 | 12 | — | VDMP-3 |
| Cameras - Driver Side | $22 | 7 | — | 13 | VDMP-3 |
| Cameras - Passenger Side | $23 | 7 | — | 14 | VDMP-3 |
| Cameras - Rear | $24 | 7 | 11 | — | VDMP-3 |
| Radars - Front | $25 | 8 | 12 | — | VDMP-3 |
| Radars - Driver Side | $26 | 8 | — | 13 | VDMP-3 |
| Radars - Passenger Side | $27 | 8 | — | 14 | VDMP-3 |
| Radars - Rear | $28 | 8 | 11 | — | VDMP-3 |

Table D shows, in row 1, an example VDM including a physical address to request DTCs from a specific ECU in a vehicle, and in rows 2 and 3, example VDMs received in response to the VDM in row 1. The time stamps and VDMs shown in Table D are shown as hexadecimal numbers. A request within a VDM including a physical address (e.g., a particular destination or target address) can be referred to as a destination specific request or command. Any ECU that receives such VDM must determine whether the physical address in the VDM matches the physical address corresponding to the ECU. If the address match one another, then the ECU must process the content of the VDM.

TABLE D

| Time stamps | Vehicle data messages | Row |
|---|---|---|
| 00000B27 | 02 FD 80 01 00 00 00 07 0C 80 18 01 19 02 20 | 1 |
| 0000585E | 02 FD 80 02 00 00 00 05 18 01 0E 80 00 | 2 |
| 0000566B | 02 FD 80 01 00 00 00 07 18 01 0E 80 59 02 FF | 3 |

The DTC index 413 can include an index or multiple indexes (i.e., indices). As an example, the DTC index 413 can include a DTC index for each group of vehicles corresponding to one or more vehicle identifiers. As another example, the DTC index 413 can include multiple indexes (such as multiple indexes that correspond to a respective, different vehicle identifier). A DTC index can include a list of DTC s corresponding to an ECU within the vehicle 108. The list of DTCs can include a numerical representation of each DTC, and a textual representation of each DTC. The numerical representation of a DTC can include a prefix such as "P" for powertrain, "B" for body, "C" for chassis, and "U" for network. A DTC index can include data that indicates a VDM protocol used by an ECU to report requested DTCs. Table E shows an example of data within the DTC index 413. That data includes vehicle identifiers, ECU identifier, VDM protocol identifiers, DTC identifiers, and DTC textual identifier. In response to a request, a vehicle can response with a list of DTC identifiers. The computing system 102 can refer to the DTC index 413 to determine DTC textual identifiers corresponding to the reported DTCs for outputting via the user interface 406.

TABLE E

| Vehicle ID | ECU ID | VDM Protocol ID | DTC ID | DTC Textual ID |
|---|---|---|---|---|
| YMM-1 | $10 | VDMP-1 | P0128 | Coolant temperature below thermostat regulating temperature |
| YMM-1 | $10 | VDMP-1 | P0171 | System too lean (bank 1) |
| YMM-1 | $10 | VDMP-1 | P0172 | System too rich (bank 1) |
| YMM-1 | $10 | VDMP-1 | P0219 | Engine over speed condition |
| YMM-1 | $10 | VDMP-1 | P0313 | Misfire detected with low fuel |

TABLE E-continued

| Vehicle ID | ECU ID | VDM Protocol ID | DTC ID | DTC Textual ID |
|---|---|---|---|---|
| YMM-1 | $40 | VDMP-2 | B1300 | Power door lock circuit failure |
| YMM-1 | $40 | VDMP-2 | B1301 | Power door lock circuit open |
| YMM-1 | $40 | VDMP-2 | B1310 | Power door unlock circuit failure |
| YMM-1 | $40 | VDMP-2 | B1311 | Power door unlock circuit open |
| YMM-1 | $90 | VDMP-2 | C0110 | Pump motor circuit malfunction |
| YMM-1 | $90 | VDMP-2 | C0238 | Wheel speed mismatch |
| YMM-1 | $90 | VDMP-2 | C0288 | Brake warning lamp circuit shorted to B+ |
| YMM-1 | $90 | VDMP-2 | C3000 | Rear speed sensor malfunction |

Some or all of the DTCs reportable by a vehicle (e.g., the DTCs represented in Table E) can be reported along a with one or more status identifiers. As an example, the status identifiers can be contained within a data byte reported by the vehicle along with each DTC. Table F represents an example of status identifiers that can be reported by the vehicle.

TABLE F

| DTC status bit position | DTC status |
|---|---|
| 0 | Test failed |
| 1 | Test failed current key cycle |
| 2 | Pending |
| 3 | Confirmed |
| 4 | Test not completed since DTC cleared |
| 5 | Test failed since DTC cleared |
| 6 | Test not completed during current key cycle |
| 7 | Malfunction indicator lamp (MIL) requested |

The VDM buffer 414 can include data contained in one or more VDM received at the processor 402 and/or the VCT 405 and/or data to be contained in one or more VDM to be transmitted by the processor 402 and/or the VCT 405. As an example, the VDM buffer 414 can include data indicating one or more DTCs set in the vehicle 108 and/or a status (e.g., current or history) of each of the one or more DTCs. As another example, the VDM buffer 414 can include data populated within a GUI on a display of the user interface 406. For instance, the VDM buffer 414 can include any data shown in any GUI shows in the drawings. The processor 402 can overwrite data contained within the VDM buffer 414 when the computing system 102 is connected to a different vehicle or in response to a selection of a USC at the computing system 102.

The GUI 415 can include one or more GUIs for outputting on a display of the user interface 406. As an example, the GUI 415 can include a GUI the computing system 102 (e.g., the communication interface 404) receives from the server 104. As another example, the GUI 415 can include a GUI including one or more USCs discussed in this description and/or shown in any drawing. As yet another example, the GUI 415 can include any GUI shown in the drawings or a GUI including any aspect shown within a GUI shown in the drawings. In accordance with at least some embodiments, the GUI 415 can include a mark-up language file, such as a hypertext mark-up language (HTML) file.

The vehicle service data 416 can includes vehicle service data transmitted to the computing system 102 from the server 104. The computing system 102 can output the vehicle service data on the user interface 406 (e.g., on a display). The vehicle service data can guide a user in diagnosing and/or repairing a vehicle. The examples of vehicle service data discussed with respect to vehicle service data 622 are applicable to the vehicle service data 416 and vice versa.

As an example, the vehicle service data 416 can include commonly replaced parts data for sets of vehicles corresponding to sets of vehicle identifying information. For instance, the vehicle service data 416 can include a list of commonly replaced parts on vehicles corresponding to the example vehicle identifier YMM-1. As another example, the vehicle service data 416 can include real-fix tips based on prior repairs made on vehicles corresponding to the sets of vehicle identifying information. As yet another example, the vehicle service data 416 can include diagnostic flow charts for diagnosing DTCs determined using a method of the example embodiments.

Additionally or alternatively, the vehicle service data 416 can include vehicle service data written into the memory 407 during the manufacture of the computing system 102 or some of its components.

Next, FIG. 8 is an illustration of a vehicle service tool (VST) 500 in accordance with the example embodiments. The VST 500 can operate utilizing the computing system 102 shown in FIG. 6 or utilizing another computing system. In some examples, the VST 500 can represent a physical configuration of the computing system 102. As such, the VST 500 includes a display 502, a user input section 504, and a housing 506 with the display 502 and the user input section 504 making up a part of a user interface configured to receive input from a user and provide output to the user of the VST 500.

In some examples, the display 502 of the VST 500 can include a touchscreen interface/display, such as a color touchscreen used on the MODIS™ ultra integrated diagnostic system (reference number EEMS328) or the ZEUS® car diagnostic tool & information system (model EEMS342), both available from Snap-on Incorporated of Kenosha, Wisconsin or another type of touch-screen interface. In those or in other examples, the display 502 can include a backlit color liquid crystal display (LCD) having a capacitive, resistive, or infrared touchscreen interface or panel or a plasma display or a light emitting diode (LED) display. In further examples, the display 502 can include a display like those used as part of a tablet device (such as an IPAD® tablet device from Apple Inc., or a SAMSUNG GALAXY TAB tablet device from Samsung Electronics Co., Ltd.). As another example, the display 502 can include a display like displays used on a smartphone (such as an IPHONE® smartphone from Apple Inc. of Cupertino, California, or a GALAXY S® smartphone from Samsung Electronics Co., Ltd. Of Maetan-Dong, Yeongtong-Gu Suwon-Si, Gyeonggi-Do, Republic of Korea). Other examples of the display 502 on the VST 500 are also possible.

As shown in FIG. 8, the display 502 can have a rectangular-like shape, such as a rectangle with square corners or a generally rectangular shape with rounded corners, but the display 502 is not limited to such shapes. For instance, the display 502 can have a circular or triangular shape within other examples. Further, in other examples, the VST 500 can include multiple displays (e.g., a front display and a back display).

The VST 500 further includes the user input section 504, which can include various types of USCs configured for a user to communicate with the VST 500 (e.g., input selections and data into the VST 500). For instance, as shown in FIG. 8, the user input section 504 can include one or more USCs, such as an input key 516, 518, 520, 522, and 524. The user input keys can be arranged in any of a variety of configurations. For instance, the input key 516 can represent an up-direction selection, the input key 518 can represent a right-direction selection, the input key 520 can represent a down-direction selection, the input key 522 can represent a left-direction selection, and the input key 524 can represent an enter selection. Pressing one of the input keys can cause a display pointer 514 to move in a direction represented by the input key being pressed. Pressing the input key 524 can cause selection of a displayed data element to which the display pointer 514 is pointing. In other examples, the user input section 504 can include user-selectable-controls arranged in other configurations, such as joysticks, touch-pads, or other button layouts (e.g., a directional pad). In further examples, the VST 500 can include other components for receiving input from a user, such as a microphone to receive verbal commands or a camera for detecting motions of the user or a vehicle component.

The processor 402 can reconfigure one or more of the input key 516, 518, 520, 522, and 524 based on which GUI is output on the display 502 and/or based on content currently output on the display. Reconfiguring the input key 516, 518, 520, 522, and 524 can include associating different program instructions with the input key 516, 518, 520, 522, 524.

In accordance with at least some embodiments, an input key is associated with an icon and/or graphic output on the display 502. For instance, an icon 525, 526, 527, 528 is associated with the input key 516, 518, 520, and 522, respectively. Reconfiguring the input key 516, 518, 520, and 522 can include modifying icon 525, 526, 527, 528, respectively.

The processor 402 shown in the computing system 102 in FIG. 6 can execute program instructions of the CRPI 408 to cause the display 502 of the VST 500 to display one or more containers and/or USCs. A container can include data obtained from a vehicle. As an example, the data within a container can be displayed in a list mode (i.e., textually) or in a graph mode (i.e., graphically). As shown in FIG. 8, the display 502 is showing a container 509

In accordance with at least some embodiments, a container displaying PID data graphically can be referred to as a vehicle data parameter (VDP) graph window. A VDP graph window can represent data values corresponding to one or more PIDs obtained from the vehicle 108. For instance, the VDP graph window can include a VDP line graph that represents parameters relating to a particular PID. The display 502 can display one or more VDP graphs using different size windows that are adjustable by a user.

A container, such as the container 509, can include various elements, such as VDP line graph 510 representing parameter values corresponding to a PID. The container 509 can also include graph text 512, which can include information such as a name of the PID represented by the VDP line graph 510, a units identifier identifying the units of the VDP line graph 510 (e.g., volts, percent, or counts), and threshold ranges (e.g., minimum and maximum thresholds associated with a particular PID). In some instances, the minimum and maximum ranges can be restricted to the minimum and maximum values of the VDP line graph 510 currently displayed within the container 509. For instance, memory 407 can store minimum and maximum values corresponding to one or more PIDs and use those stored minimum and maximum values to populate the graph text 512 when a parameter associated with minimum and maximum values is displayed by the display 502 on the VST 500.

The processor 402 can execute program instructions of the CRPI 408 to cause the display 502 to display one or more scroll bars, such as the scroll bar 513. The scroll bar 513 can be used to scroll through multiple graphs of parameter values corresponding to various PIDs or other information displayable on the display 502. In further examples, the processor 402 can execute program instructions of the CRPI 408 to cause the display 502 to display a graph view slider that is configurable to modify a view of the graph of parameters corresponding to a given PID on the display 502.

The housing 506 can support and/or protect other components of the VST 500. The housing 506 can include hand grips 508A, 508B to enable and/or assist a user to hold the VST 500 more securely or more conveniently. The housing 506 can include a port opening (not shown) for connecting a communication link (e.g., the communication link 114, 116) to the VST 500.

Next, FIG. 9 is a block diagram of the server 104, in accordance with the example embodiments. As shown in FIG. 9, the server 104 includes a processor 602, a communication interface 604, and a memory 606. Two or more of those components can be communicatively coupled or linked together via a data bus 610. The data bus 610 can operatively connect two or more of the processor 602, the communication interface 604, or the memory 606 to one another. In other words, the data bus 610 can provide an operative connection between two or more of the processor 602, the communication interface 604, or the memory 606. An operative connection allows for the operatively connected devices to communicate with one another (e.g., electrically or optically). The server 104 can include more or fewer components within other examples.

The processor 602 can be configured to execute computer-readable program instructions (CRPI), such as CRPI 612 stored in the memory 606. The processor 602 can be configured to execute hard-coded functionality in addition to or as an alternative to software-coded functionality (e.g., via CRPI 612), and can be programmed to perform any function or combination of functions described herein as being performed by the server 104. Examples of the processor 602 are discussed above. The processor 602 (shown in FIG. 9) can be programmed to perform any one or more functions described herein as being performed by the server 104.

The memory 606 stores computer-readable data, such as the CRPI 612, authentication data 614, a diagnostic index 616, a VDM buffer 618, a GUI 620, and/or vehicle service data 622.

The authentication data 614 can include authentication data corresponding to a user, a repair shop, and/or a VST (e.g., a VST arranged like the computing system 102) registered to use services the server 104 is configured to provide. As an example, the authentication data can include a user identifier and a corresponding password, a repair shop identifier and a corresponding password, and a VST identifier and a corresponding password. That type of authentication data can be contained within the authentication data 614 for one or more users, repair shops, or VSTs. As an example, the authentication data 614 for one or more users, repair shops, or VSTs can include authentication data for multiple users, repair shops, or VSTs (e.g., hundreds, thousands, or millions of repair shops, or VSTs located in one or more countries.

The diagnostic index 616 can include one or more diagnostic indexes (i.e., indices). A diagnostic index can include any index described above with respect to the computing system 102. For instance, a diagnostic index can include a text mode index, a test index, a PID index, an ECU index, and/or a DTC index. Moreover, the diagnostic index 616 can include one or more diagnostic indexes for multiple different vehicle identifiers. For instance, the diagnostic index 616 can include a first DTC index for vehicles corresponding to a first vehicle identifier (e.g., YMM-1) and a second DTC index for vehicles corresponding to a second vehicle identifier (e.g., YMM-2). Typically, the first DTC index is different than the second DTC index, because if the first DTC index and the second DTC index are identical, then the first DTC index or the second DTC index could be used for vehicles corresponding to the first vehicle identifier and to vehicles corresponding to the second vehicle identifier.

In accordance with at least some embodiments, content of different described indexes (e.g., a text mode index, a test index, a PID index, an ECU index, or a DTC index) are distinct, individual indexes. In accordance with at least some other embodiments, content of different described indexes (e.g., a text mode index, a test index, a PID index, an ECU index, or a DTC index) are contained in a single index (e.g., a diagnostic index including content of two or more described indexes from among a text mode index, a test index, a PID index, an ECU index, or a DTC index). In accordance with at least some of latter embodiments, a first single index can correspond to vehicles associated with a first vehicle identifier and a second single index can correspond to vehicles associated with a second vehicle identifier. Moreover, the aforementioned first or second vehicle identifier can include a set of multiple vehicle identifiers for vehicles defined as being substantially similar (such as vehicles having the same make and model but different model years).

The diagnostic index 616 can include OBD data or other information from the vehicle or vehicles. For instance, the diagnostic index 616 can indicate particular PIDs, functional tests, component tests, and/or reset procedures to display for a given symptom or set of symptoms for the vehicle 108. In other examples, the diagnostic index 616 can indicate which PIDs, functional tests, component tests, and/or reset procedures to display for any symptom. For at least some embodiments, the symptom includes a DTC, or a DTC and a DTC status identifier.

The VDM buffer 618 can include VDMs and/or content of VDMs received by the computing system 102 from a vehicle. The VDM buffer 618 can include VDMs and/or content of VDMs the computing system 102 transmits to the vehicle.

In accordance with at least some embodiments, the computing system 102 can transmit a VDM to request DTCs from the vehicle using the vehicle communication transceiver 405. The computing system 102 can receive, in response to that request, one or more VDMs include DTC identifiers and DTC status identifiers. The computing system 102 can use the communication interface 404 to transmit data indicative of the VDM sent to request DTCs and content of the VDMs received in response to the request. The server 104 can receive that data transmission and write the content of that data transmission into the VDM buffer 618. In at least some embodiments, the server 104 can send data indicative of the DTCs and DTC status information for updating a GUI output on the user interface 406.

The VDM buffer 618 can comprise data the server 104 can use to determine an operating state of the computing system 102. The data the server 104 uses to determine an operating state of the computing system 102 can include vehicle identifying information, data indicating an elapsed time since the server 104 last received a communication from the computing system 102, data indicating the most recent type of diagnostic list requested by and/or transmitted to the computing system 102, and/or data indicating a repair has been made to the particular vehicle.

The VDM buffer 618 can comprise data indicative of the determined operating state of the computing system 102. Examples of the operating state include (i) the computing system 102 is connected to the server 104, (ii) the computing system 102 is not connected to the server 104 (i.e., disconnected from the server 104), (iii) the computing system 102 is connected to a particular vehicle (e.g., the vehicle 108), (iv) the computing system 102 is no longer connected to the particular vehicle (i.e., disconnected from the particular vehicle), (v) the computing system 102 is in a request and/or display diagnostic list mode for the particular vehicle, (vi) the computing system 102 has exited the request and/or display diagnostic list mode for the particular vehicle, and (vii) the computing system 102 has returned to the request and/or display diagnostic list mode for the particular vehicle.

The VDM buffer 618 can also comprise data indicating a diagnostic session at the computing system 102 is active or inactive. The server 104 can determine a new diagnostic session is active upon receiving vehicle identifying information for a particular vehicle while the VDM buffer 618 does not include data indicating a diagnostic session is active for the particular vehicle. The server 104 can determine an active diagnostic session for a particular vehicle has transitioned to inactive upon receiving vehicle identifying information for a different particular vehicle. The server 104 can determine an active diagnostic session for a particular vehicle has transitioned to an inactive session upon determining a threshold amount of time has elapsed since a particular activity of the active diagnostic session. As an example, the particular activity can comprise receiving a request from the computing system 102, or receiving a communication indicating the computing system 102 is connected to the communication network 106. Other examples of the particular activity are also possible.

The GUI 620 can include a GUI and/or content for populating within a GUI output on the user interface 406. The GUI can include and/or be arranged as a markup-language file, such as an HTTP file. As an example, the GUI and/or the content for populating within the GUI can include the DTCs and DTC status information discussed above. In at least some embodiments, the DTCs can include a DTC identifier, such as a DTC identifier discussed with respect to Table E. In at least those and/or in other embodiments, the DTCs can include a DTC textual identifier, such as a DTC textual identifier discussed with respect to Table E.

As yet another example, the GUI and/or the content for populating within the GUI can include any content described with respect to any GUI shown in the drawings. For instance, the GUI can include a USC discussed with respect to the drawings.

As still yet another example, the GUI and/or the content for populating within the GUI can include at least a portion of the vehicle service data 622.

The vehicle service data 622 includes data the server 104 provides to the computing system 102 in response to a communication from the computing system 102. In at least some embodiments, the server 104 provides the computing system 102 with a GUI populated with vehicle service data. In at least some other embodiments, the server 104 provides the computing system 102 with vehicle service data for outputting on the user interface 406 (e.g., within a GUI output on the user interface 406).

As an example, the vehicle service data 622 can include data for diagnosing a vehicle. For instance, the data for diagnosing a vehicle can include a schematic diagram (e.g., an electrical schematic diagram, a communication network schematic diagram, or a hydraulic system schematic diagram), a diagnostic flowchart, or a text index, test mode index, PID index, ECU index, or DTC index for a vehicle connected to the computing system. Other examples of data for diagnosing a vehicle are also possible.

As another example, the vehicle service data 622 can include data for repairing a vehicle. For instance, the data for repairing a vehicle can include a repair and replace procedure, a calibration procedure, or a component reset procedure. Other examples of data for repairing a vehicle are also possible.

The CRPI 612 can comprise a plurality of program instructions. In general, the CRPI 612 can include program instructions to cause the server 104 to perform any function described herein as being performed by the server 104 or to cause any component of the server 104 to perform any function described herein as being performed by that component of the server 104.

As an example, the CRPI 612 can include program instructions executable by the processor 602 to write data into the memory 606, such as writing a VDM or content of a VDM received from the computing system 102 into the VDM buffer 618.

As another example, the CRPI 612 can include program instructions executable by the processor 602 to read the memory 606 (e.g., search the memory 606) for content to provide to the computing system 102, such as a diagnostic index, a diagnostic index identifier, a GUI and/or vehicle service data.

As another example, the CRPI 612 can include program instructions executable by the processor 602 to authenticate a user of the computing system 102, and/or the computing system 102 to insure access to a service besides authenticating the user should be performed for the user and/or the computing system 102 by the server 104. An authenticated user can be a repair shop (i.e., a user at a registered repair shop).

As another example, the CRPI 612 can include program instructions executable by the processor 602 to register a user, repair shop, or VST to be eligible to use a service the server 104 is configured to perform.

III. Example Operation

Figure 10:
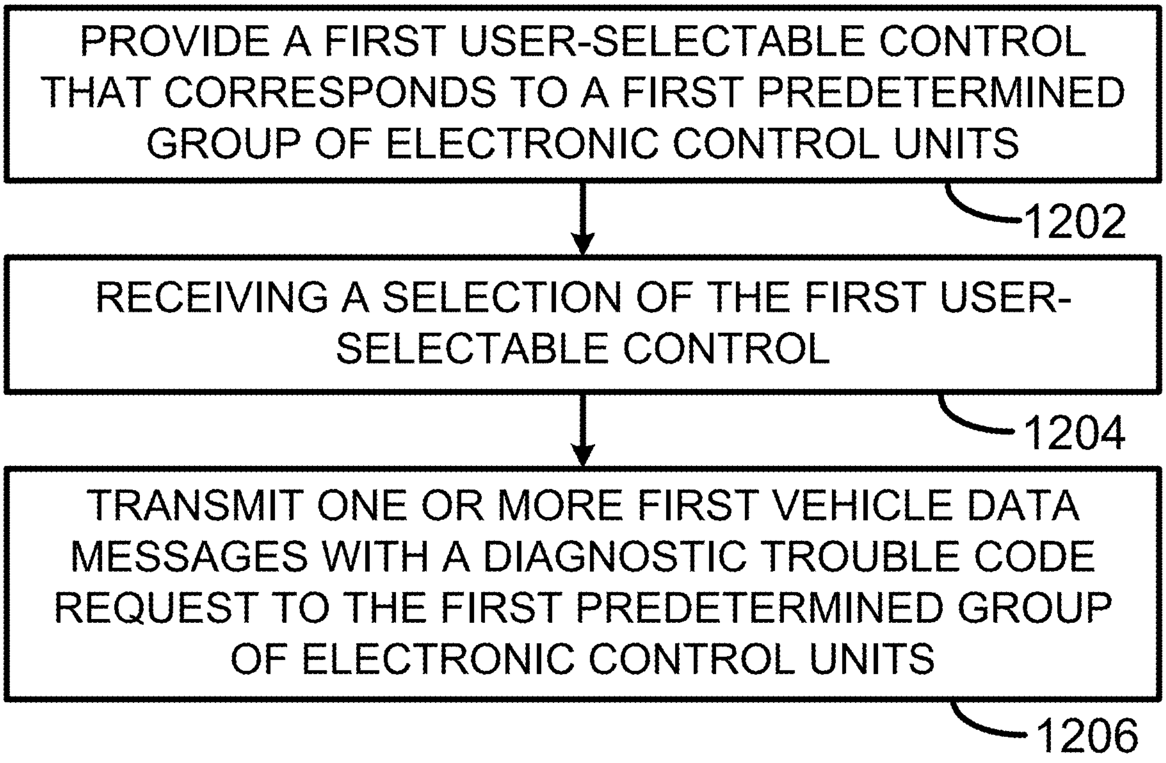
FIG. 10 is a flowchart depicting a set of functions that can be carried out in accordance with the example embodiments.

FIG. 10 shows a flowchart depicting a set 1200 of functions (or more simply "the set 1200") that can be carried out in accordance with the example embodiments. The set 1200 includes the functions shown in a block 1202, 1204, and 1206. The following description of the set 1200 includes references to elements shown in other figures described in this description, but the functions of the set 1200 are not limited to being carried out only by or with respect to the referenced elements. A variety of methods can be performed using all of the functions shown in the set 1200 or any proper subset of the functions shown in the set 1200. Any of those methods can be performed with other functions such as one or more of the other functions described in this description.

In some examples, a computing system (e.g., the computing system 102) can perform the set 1200 to selectively communicate with particular ECUs within a vehicle. By selectively communicating with particular ECUs corresponding to USCs identifiable based on various criteria and selected or input by a user, the computing system can efficiently communicate and obtain information that can be used to analyze aspects of the vehicle.

Block 1202 includes providing a first USC that corresponds to a first predetermined group of ECUs.

In at least some embodiments, the first USC is displayed on a display of the user interface 406 and/or the computing system 102. For example, the first USC can be displayed on a graphical user interface on a display of the user interface. The first predetermined group of ECUs includes a first subset of ECUs located in a vehicle and the first subset of ECUs can include multiple ECUs. In some cases, the computing system can display multiple USCs (one of which is the first USC) with each USC corresponding to a different subset of ECUs in the vehicle. Different USCs can correspond to subsets of ECUs that share one or more ECUs in common. For instance, an ECU associated with a particular vehicle system can be assigned to subsets for different USCs. In at least some embodiments, the different USCs correspond to subsets of ECUs where none of the subsets include an ECU contained within any other of the subsets.

The computing system can display different USCs for the user through a graphical user interface. For instance, the computing system can display an interface with a dropdown menu that allows a user to review the different user controls available for selection. In some example embodiments, the computing system can further display and use checkboxes that enables a user to make multiple selections from a list of options. The graphical user interface can also include other visual features, such as tabs, grids, tables, or diagrams that help convey the different USCs available to choose from. Selectable buttons and interactive diagrams can be used to enable the user to review available options.

In some examples, the computing system can display a main dashboard with a menu that organizes diagnostic functions into categories, which can display user-selectable controls for obtaining PID data and related information from specific systems or based on particular functions. Each category can represent a specific aspect of the vehicle's systems, such as engine, transmission, anti-lock brakes, airbags, and infotainment system, etc. When the user selects a particular category, the computing system can then display further sub-options and/or USCs corresponding to that specific system, including offering detailed diagnostic and testing capabilities.

The computing system can also display a configure option that enables the user to define a new USC and select multiple ECUs to form the predetermined group of ECUs associated with the new USC. Selection of the ECUs to form a new USC can include a user selecting particular systems to review or specific functionalities or zones of the vehicle to analyze. The computing system can use these selections by the user to identify which ECUs should be assigned to the new subset that corresponds to the newly defined USC created by the user. For example, the computing system can then receive respective selections of ECUs in the first subset of ECUs to form the first predetermined group of ECUs.

In accordance with at least some embodiments, providing the first USC includes displaying an icon and/or graphic corresponding to an input key of the user interface 406. For example, providing the first USC can include displaying the icon 525 corresponding to the input key 516 and the icon 525 can include text or graphical information indicative of the first predetermined group of ECUs. Providing the first USC can include designating particular program instructions to be executed in response to the first USC being selected. As an example, those instructions can include instructions to perform functions corresponding to block 1206. Providing the first USC can include associating the first predetermined group of ECUs with the first USC.

In accordance with at least some embodiments, providing the first USC that corresponds to the first predetermined group of ECUs comprises providing a plurality of USCs, each USC corresponding to a different group of ECUs in the vehicle. The plurality of USC includes the first USC. As an example, providing the plurality of USCs can include the computing system 102 outputting a user interface (e.g., the user interface 1450 shown in FIG. 14) that includes the USCs or icons in proximity to hardware keys of the user interface 406.

Next, block 1204 includes receiving, at the computing system, a selection of the first USC. The computing system is configured to receive user selections of one or multiple user-selectable controls through a user interface that incorporates one or more input means. For instance, the computing system can integrate physical buttons (e.g. input keys) or keypads (e.g., input keys) that enable users to navigate through menus, select different categories, and make choices by pressing the corresponding buttons or input keys. This tactile input method can be useful in scenarios where the user needs to focus on the vehicle itself rather than diverting attention to the computing system's display. As an example, a user choice input using the user interface can include selection of a predetermined ECU group and one or more types of VDMs for transmitting to ECUs within the predetermined group. As another example Additionally or alternatively, the computing system can feature touchscreen interfaces that can offer an intuitive and interactive experience. Users can directly interact with the display, tapping on icons, selecting menu options, and inputting data with the touch of a finger. Touchscreens can be used to enhance user engagement and provide a visually engaging way to navigate through the diagnostic functionalities, including selecting different selectable controls for obtaining DTC data, PID data and/or other information from specific ECUs within the vehicle. This input method can facilitate quick and efficient interaction, contributing to the computing system's usability during vehicle diagnostics.

In some examples, the selection or selections made by users on the computing system can include selections that choose specific diagnostic functions or tests related to various vehicle systems. For instance, a user might initiate diagnostics on the engine requesting DTCs, requesting PID data, or conducting tests, such as component activations. The selections enable the computing system 102 and/or server 104 to receive data from an ECU within the vehicle and to use the received data and/or vehicle service data based on the received data to precisely identify and address issues within different vehicle systems.

Figure 16:
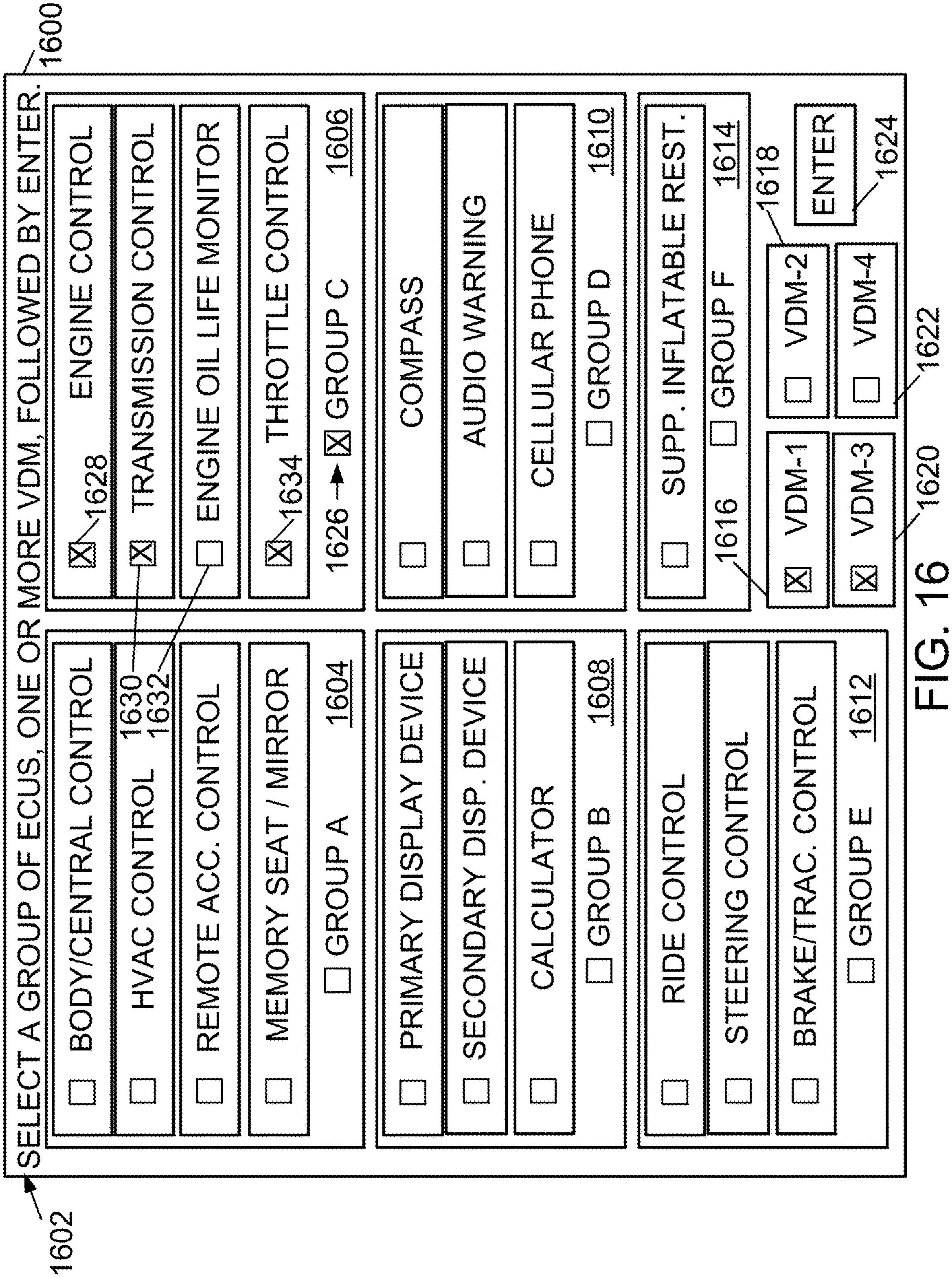

Receiving a selection of the first USC can include the processor 402 executing program instructions to determine whether a voltage on an analog or digital input to the processor 402 indicates the first USC has been selected. For example and with reference to FIG. 16, a first voltage level on an analog or digital input to the processor 402 can indicate the USC 1628 has been selected, a second voltage level on the analog or digital input to the processor 402 can indicate the USC 1630 has been selected, a third voltage level of voltage level on the analog or digital input to the processor 402 can indicate the USC 1634 has been selected, a fourth voltage level on the analog or digital input to the processor 402 can indicate the USC 1626 has been selected, a fifth voltage level on the analog or digital input to the processor 402 can indicate the USC 1616 has been selected, a sixth voltage level on the analog or digital input to the processor 402 can indicate the USC 1620 has been selected, and a seventh voltage level on the analog or digital input to the processor 402 can indicate the USC 1624 has been selected. In response to detecting the USC 1616, 1620, 1626, 1628, 1630, 1634 has been selected, the processor 402 can modify the user interface 1600 to indicate each of those USCs has been selected. FIG. 16 shows such indication by an "X." In response to detecting the USC 1626 and the USC 1624 have been selected, the processor 402 can determine the first USC corresponding to the first predetermined group of ECUs has been selected. In accordance with at least some other embodiments based at least in part on FIG. 16, the processor 402 determines the first USC corresponding to the first predetermined group of ECUs has been selected in response to determining the fourth voltage level (discussed above) exists on the analog or digital input to the processor 402.

Next, block 1206 includes transmitting one or more first vehicle data messages with a DTC request to the first predetermined group of ECUs. The computing system can transmit the vehicle data messages to the vehicle in response to the selection of the first USC. The DTC request includes a request to clear one or more DTCs in the first predetermined group of ECUs or a request to respond with a status of one or more DTCs being set in the first predetermined group of ECUs.

The DTC request can include the request to respond with a status of one or more DTCs being set in the first predetermined group of ECUs. As such, the computing system can receive, from the vehicle in response to transmitting the one or more first vehicle data messages, one or more second vehicle data messages including data indicating whether the first predetermined group of ECUs have set any DTC.

The computing system can send specific commands and requests to the different ECUs through the OBD-II port or another connection. The requests formulated based on the user's selection(s) can include asking for DTCs, live sensor data, vehicle information, and more. The targeted ECUs can then respond to the requests by sending data messages, which can contain information about various parameters as requested by the user. For instance, the messages can contain data about an engine RPM, vehicle speed, coolant temperature, oxygen sensor readings, and other diagnostic information. The computing system can interpret the received data messages and display the information in a human-readable format on a display interface. The technician or user of the computing system can use the displayed information to diagnose issues, monitor the performance of different systems, and perform various maintenance and repair tasks. In addition, the computing system can be used to clear DTCs and reset certain control modules after maintenance or repairs.

In at least some example embodiments, the computing system can transmit, to the vehicle, instructions to switch to a diagnostic mode (i.e., a test mode) to the first predetermined group of electronic units and then transmit the one or more first vehicle data messages subsequent to transmitting the instructions to switch to the diagnostic mode to the first predetermined group of electronic units. Examples of the test mode are shown in Table B. Other examples of the test mode are discussed with respect to the test mode index 409.

In at least some example embodiments, after establishing an initial connection via the OBD-II port, the computing system can perform an initialization and handshake process that includes sending a series of initialization commands to the vehicle's ECUs. In some examples, the computing system can identify and select a protocol to use for the transmission of vehicle data messages to the vehicle. For instance, the computing system can select and use CAN, ISO9141, KWP2000, and/or J1850 PWM/VPW. Selection of the protocol can depend on the vehicle computing systems, the type of VST, and/or other parameters. In at least some cases, the computing system can determine the protocol by referring to the test mode index 409.

In at least some example embodiments, the computing system can transmit a physical message to each address corresponding to an electronic control unit in the first predetermined group of ECUs. A physical message can be directed towards a specific ECU or a specific address on the vehicle's network. The computing system can transmit and use the physical message to request specific diagnostic information or command a particular ECU or groups of ECUs to perform a function. For example, the computing system can send a physical message or physical messages to a specific ECU or a subset of ECUs to retrieve DTCs, read live data, or perform tests on a particular system. In accordance with at least some embodiments, a physical message can include an ECU identifier or a test message identifier as shown in one or more tables shown above. The physical message can be arranged as a VDM according to a VDM protocol discussed in the description or some other VDM protocol.

In at least some example embodiments, the computing system can transmit one or more broadcast messages that are received by all ECUs associated with the option or options selected by the user. For instance, the computing system can transmit a broadcast message that is received by all the ECUs in the first predetermined group of ECUs. The broadcast message can be used by the computing system to share general information or commands with all the ECUs corresponding to a selection by the user. Broadcast messages can be used for tasks that includes multiple systems, such as resetting certain parameters or putting all ECUs into a specific mode. The broadcast message can be arranged as a VDM according to a VDM protocol discussed in the description or some other VDM protocol. In accordance with at least some embodiments, a broadcast message can be transmitted on a vehicle network that has one or more ECUs configured to respond to the broadcast message and/or one or more ECUs configured to ignore the broadcast message.

In at least some example embodiments, the computing system can employ a security key or another security technique as part of establishing a secure and authenticated communication channel with ECUs within a vehicle. Using a security measure can help safeguard sensitive vehicle data and prevent unauthorized access. For instance, the communication process between the computing system and one or more ECUs can include using cryptographic algorithms and shared security keys. Upon initiation of communication, the computing system can include the security key in its request to the ECU. The ECU, in turn, verifies the authenticity of the computing system by employing the same cryptographic algorithm and checking the provided security key.

Successful authentication during initial communication can allow the establishment of an encrypted communication channel between the computing system and one or multiple ECUs. This encryption ensures the confidentiality and integrity of data exchanged during the diagnostic process, protecting it from unauthorized access or tampering during transmission. Effective key management practices helps maintain the security of this process. Secure distribution, periodic key updates, and key revocation mechanisms can help contribute to a robust security framework. Additionally, the secure exchange of commands and responses between the computing system and the ECU, encrypted with the shared security key, ensures that only authorized diagnostic tools with the correct security keys can communicate with and receive responses from the ECUs. Using this security process can help fortify vehicle systems against potential threats and unauthorized interactions.

In at least some example embodiments, the computing system transmits, to the vehicle in response to the selection of the first USC, a security key to the first predetermined group of electronic units. The computing system then receives a response to the security key from the vehicle and can transmit the one or more first vehicle data messages in response to the response to the security key. In accordance with at least some of the embodiments, transmitting one or more first vehicle data messages with the DTC request to the first predetermined group of ECUs can include transmitting the one or more first vehicle data messages in response to the response to the security key.

In at least some example embodiments arranged as a method, such as a method described herein as including one or more functions of the set 1200, the method further includes providing, on the user interface via the computing system, a second USC that corresponds to a second predetermined group of ECUs. The second predetermined group of ECUs includes a second subset of ECUs located in the vehicle. Similarly, the computing system can also provide a third USC that corresponds to a third subset of ECUs located in the vehicle, a fourth USC that corresponds to a fourth subset of ECUs located in the vehicle, a fifth USC that corresponds to a fifth subset of ECUs located in the vehicle, and so forth. As such, ECUs can be part of one or multiple subsets of ECUs associated with selectable controls.

In at least some example embodiments, ECUs located within the vehicle can be connected to different data buses (i.e., different vehicle networks). For example, the first predetermined group of ECUs can be connected to a first data bus within the vehicle and the second predetermined group of ECUs are connected to a second data bus within the vehicle. Each data bus can use the same or different communication protocols when carrying vehicle data messages between the computing system and ECUs. For instance, the first data bus can be configured to carry vehicle data messages according to a first communication protocol and the second data bus can be configured to carry vehicle data messages according to a second communication protocol different than the first communication protocol.

In at least some example embodiments, ECUs within the vehicle are connected to different interfaces of communication gateways. For instance, the first predetermined group of ECUs can be connected to a first interface of a communication gateway in the vehicle and the second predetermined group of ECUs can be connected to a second interface of a communication gateway different than the first interface. As an example, the first interface and the second interface includes interfaces can be selected from among the following, but not limited to: a local interconnect network (LIN) interface, a controller area network (CAN) interface, a 100BASE-T1 interface, a 1000BASE-T/2.5GBase-T interface, a 100BASE-TX interface, a 1000BASE-T interface, a FlexRay interface, a universal serial bus (USB) interface, a peripheral component interconnect express (PCIe) interface, a joint test action group (JTAG) interface, a universal asynchronous receiver-transmitter (UART) interface, an aurora interface, or an M.2 interface.

In at least some example embodiments, subsets of ECUs are connected to different zonal controllers within the vehicle. A zonal controller in a vehicle is a component within the architecture of modern automotive systems. In the context of automotive electronics and electrical systems, vehicle architecture appears to be evolving towards a zonal approach. In traditional vehicle architectures, various ECUs are distributed throughout the vehicle with each ECU responsible for specific functions, such as engine control, transmission control, braking, and more. In contrast, a zonal architecture consolidates certain functions into centralized controllers known as zonal controllers. As such, each zonal controller can act as a central hub or gateway that manages and coordinates the communication and control of multiple functions within a specific zone of the vehicle. Using zonal controllers can help improve efficiency, reduce wiring complexity, and enhance overall system integration. Zonal controllers can help contribute to the development of more scalable, modular, and flexible vehicle architectures, especially in the context of the increasing complexity of automotive electronics and the integration of advanced driver assistance systems (ADAS) and other smart features.

An OEM can define zones for its vehicles using one or more different arrangements. For example, an OEM can define zones spatially, functionally, communicationally, and/or electrical power zones. The spatial zones can include spatial zones such as a (i) front zone and a rear zone, (ii) an engine compartment zone, a passenger compartment zone, and a trunk zone, (iii) a driver-side zone (e.g., right-side zone) and a passenger-side zone (e.g., a left-side zone). Other examples of spatial zones are possible. The functional zones can include functional zones such as ADAS functions, camera functions, light detection and ranging (LIDAR) functions, suspension functions, braking functions, steering functions, safety component functions, entertainment functions, body system functions, emission functions, engine functions, transmission functions, powertrain functions, lighting functions, or HVAC functions. Other examples of functional zones are possible. The communicational zones can include zones based on different vehicle networks contained in a vehicle. The electrical power zones can include zones based on nominal, maximum voltages supplied to vehicle components, such as a 12 volt zone, a 42 volt zone, or a high voltage zone (e.g., any nominal, maximum voltage above 42 volts).

An OEM can supply in its vehicles a zonal controller for any one or more of the zones defined for those vehicles. Additionally or alternatively, an OEM can separate zones within a vehicle using a vehicle network gateway. As an example, the gateway can include a first connection for a first vehicle data bus connected to the ECUs within a defined zone, and a second connection for a second vehicle data bus connected to another ECU, gateway, or zonal controller not contained within the defined zone.

In at least some example embodiments, the first predetermined group of ECUs are connected to a first zonal controller in the vehicle and the second predetermined group of ECUs are connected to a second zonal controller. As an example, the first zonal controller can correspond to a safety component zone comprising one or more safety components and the second zonal controller can correspond to a system zone. In other examples, the first predetermined group of ECUs correspond to a first system of the vehicle and the second predetermined group of electronic units correspond to a second system of the vehicle different than the first system.

In at least some example embodiments arranged as a method, such as a method described herein as including one or more functions of the set 1200, the method further includes receiving a selection of the second USC and transmitting, to the vehicle in response to the selection of the second USC, one or more third vehicle data messages with a second DTC request to the second predetermined group of ECUs. The second DTC request includes a second request to clear one or more DTCs in the second predetermined group of ECUs or a second request to respond with a status of one or more DTCs being set in the second predetermined group of ECUs. In some instances, the second subset of ECUs includes multiple ECUs.

In at least some example embodiments arranged as a method, such as a method described herein as including one or more functions of the set 1200, the method further includes receiving selections of both the first USC and the second USC and transmitting, to the vehicle in response to the selections of both the first USC and the second USC, multiple vehicle data messages. The multiple vehicle data messages can include at least the first DTC request for the first predetermined group of ECUs and a second DTC request for the second predetermined group of ECUs. In some cases, the vehicle data messages can include at least a first physical message to one or more ECUs in the first predetermined group of ECUs or the second predetermined group of ECUs and at least a first broadcast message to one or more ECUs in the first predetermined group of ECUs or the second predetermined group of ECUs.

In at least some example embodiments, the computing system can determine vehicle identifying information associated with a group of vehicles including the vehicle. For instance, the vehicle identifying information can include the YMM, the YMME, and/or the YMMEF. The computing system then determines the first predetermined group of ECUs based on the vehicle identifying information and can write data into a non-transitory computer-readable memory that indicates the first USC corresponds to the first predetermined group of ECUs. Writing the data into the memory can enable the computing system to save and subsequently provide the selectable control as a choice during future use of the computing system. In addition, the computing system can also provide the data representing the selectable control to a server or another computing system, which enables the selectable control to be provided as an option during an update downloaded and used by multiple VSTs and other computing systems.

In at least some example embodiments, the computing system can determine vehicle identifying information associated with a group of vehicles including the vehicle and determine a set of USCs based on the vehicle identifying information. The set of USCs include the first USC and providing the first USC occurs by displaying the set of USCs on the graphical user interface.

In at least some example embodiments arranged as a method, such as a method described herein as including one or more functions of the set 1200, the computing system can determine a location (e.g., a zone) with a vehicle. As an example, and with reference to FIG. 4, the computing system 102 can determine the front zone of the vehicle 109 represented in the rectangle 129 has been selected and refer to the ECU index 412 or other data stored within the memory 407 to determine that the ECU 26 and the ECU 27 are located within the front zone of the vehicle. The computing system 102 can determine the predetermined group of ECUs as the ECUs within the selected zone of the vehicle (e.g., the ECU 26 and the ECU 27 within the front zone of the vehicle 109). A person having ordinary skill in the art will understand that a zone of a vehicle can include one or multiple ECUs within each zone of the vehicle.

In at least some example embodiments, the computing system can determine vehicle identifying information associated with a group of vehicles including the vehicle and identify a list of commonly replaced parts based on the vehicle identifying information. The computing system can then determine the first predetermined group of ECUs based on the list of common replaced parts and write data into a non-transitory computer-readable memory that indicates the first USC corresponds to the first predetermined group of ECUs. Writing the data into the memory can enable the computing system to save and subsequently provide the first USC as a choice during future use of the computing system. In addition, the computing system can also provide the data representing the first USC to a server or another computing system, which enables the first USC to be provided as an option during an update downloaded and used by multiple VSTs and other computing systems.

In at least some example embodiments arranged as a method, such as a method described herein as including one or more functions of the set 1200, the method further includes displaying a configure option that enables selection of multiple ECUs to form the first predetermined group of ECUs, and receiving respective selections of ECUs in the first subset of ECUs to form the first predetermined group of ECUs. As an example, displaying the configure option can include displaying a user interface, such as the user interface 1550 shown in FIG. 15. In accordance with that embodiment, the first predetermined group of ECUs can include ECUs for an engine control system, a transmission control system, and throttle control system represented in FIG. 15 as having been selected.

In at least some example embodiments, a VST may use one or multiple communication protocols to facilitate with one or multiple ECUs. Protocols such as CAN, LIN, and FlexRay enable the VST to connect to the vehicle's network, allowing the VST to send and receive messages to ECUs that govern engine management, transmission, and other systems. The VST leverages OBD standards, like OBD-II, to decode diagnostic trouble codes (DTCs) and interpret real-time data, providing a detailed snapshot of the vehicle's operational status. To ensure seamless communication with various vehicle systems, the VST may adapt its interfacing approach to match the specific requirements of each module or ECU. This may include adjusting communication settings like baud rates and selecting the correct sub-protocols. Beyond reading data, the VST may also perform bidirectional interactions, issuing commands to ECUs for actuator tests, system resets, or reconfigurations, which enables a more interactive diagnostic process. The VST may also use machine learning to conduct predictive analyses by examining data patterns to forecast potential system issues before they escalate. This smart functionality can enable the VST to engage with ECUs for preemptive diagnostics, such as estimating the wear of brake pads or assessing battery condition, and alerting users to upcoming maintenance requirements. Such predictive insights can help with maintaining vehicle health and avoiding unexpected repairs. The user experience may also be further enhanced by the VST's intuitive interface, which simplifies the complexity of ECU data into user-friendly formats. In particular, the VST may provide graphical displays, real-time data feeds, and clear explanations of detected issues to make it easier for users to comprehend and address vehicle diagnostics. Additionally, the VST can refine its diagnostic algorithms based on user interactions, ensuring a continually improving tool that effectively communicates with the vehicle's intricate network of modules.

In at least some examples, the VST may adjust its GUI dynamically to enhance user interaction based on the custom communication that the VST establishes with the vehicle. This adaptive GUI can display features, options, and information that are specifically relevant to the vehicle being diagnosed and the particular systems being communicated with. For instance, when the VST initiates communication with a vehicle, the VST may identify the vehicle's make, model, year, and the systems installed. Based on this information, the VST can configure its GUI to present the user with a customized interface that highlights the features and functions available for that specific vehicle. For example, if the vehicle supports advanced telematics or has a hybrid powertrain, the GUI can display dedicated sections or controls for these features. The GUI can also adapt to show the user particular features based on the diagnostic process. If the user is performing a targeted scan of the transmission system, the GUI can prioritize and display transmission-related data, controls, and fault codes. This focused presentation may help the user to concentrate on the task at hand without being overwhelmed by irrelevant information.

Moreover, the VST can also incorporate user preferences and historical data to further personalize the GUI. If a technician frequently works on specific vehicle systems or prefers a particular set of tools within the VST, the GUI can adapt to present these preferred tools and systems more prominently. In some cases, this customization can be based on the user's login information, enable each technician to obtain a personalized interface that aligns with their workflow and expertise. In addition, the GUI can be designed to be context-sensitive, changing its layout and the information displayed as the user progresses through the diagnostic steps. For instance, once a fault code is identified, the GUI can automatically display potential causes, repair instructions, and related data, which can help streamline the troubleshooting process. If the VST's communication with the vehicle reveals the resolution of an issue, the GUI can update to reflect this, perhaps by clearing the fault code from the display or highlighting the successful repair. By using adaptive GUI features, the VST may provide a more intuitive and efficient user experience, tailored to the specific diagnostic context and the user's individual preferences. This level of customization ensures that technicians can access the information and tools they require quickly, potentially enabling faster and more accurate vehicle diagnostics.

IV. Vehicle Network Architecture

Figure 11:
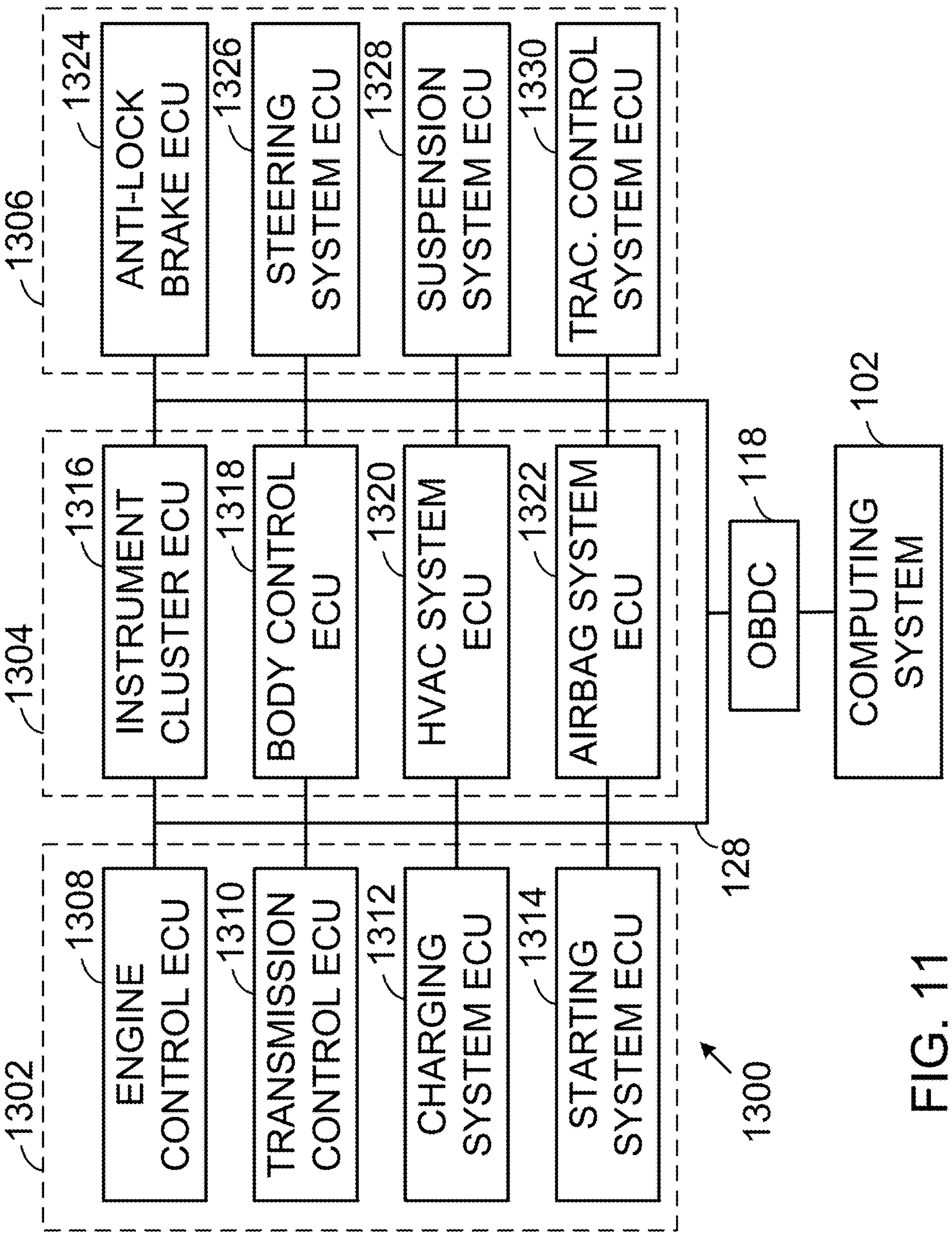
FIG. 11 is a block diagram depicting a vehicle network architecture for a vehicle, according to one or more example embodiments.

Next, FIG. 11 is a block diagram depicting a vehicle network architecture 1300 that can operate as part of a vehicle (e.g., the vehicle 108). The vehicle network architecture 1300 includes an engine control ECU 1308, a transmission control ECU 1310, a charging system ECU 1312, a starting system ECU 1314, an instrument cluster ECU 1316, a body control ECU 1318, a heating, ventilation and air conditioning (HVAC) system ECU 1320, an airbag system ECU 1322, an anti-lock brake ECU 1324, a steering system ECU 1326, a suspension system ECU 1328, and a traction control system ECU 1330. The vehicle network architecture 1300 can include the vehicle network link 128 and the OBDC 118.

In other example embodiments, the vehicle network architecture 1300 can include more or fewer ECUs. For example, the vehicle network architecture 1300 can include an ECU for each of one or more vehicle systems not represented in FIG. 11, such as a navigation system, an entertainment system, or an advanced driver assistance system. As another example, an ECU shown in FIG. 11 could be represented as multiple ECUs. For instance the body control ECU 1318 could be represented as a door lock ECU, a window motor ECU, and a power seat ECU. As another example, the functionality of multiple ECUs (such as the functionality of the engine control ECU 1308 and the transmission control ECU 1310) could be contained in a single ECU, such as a powertrain system ECU.

The vehicle network link 128 can be configured to connect two or more of the ECUs of the vehicle network architecture 1300 to one another. In FIG. 11, the vehicle network link 128 is shown connected to all of the ECUs of the vehicle network architecture 1300. In other example embodiments, the vehicle network link 128 can include multiple vehicle network links, some of which can transport VDMs using the same or different VDM protocols. The OBDC 118 is connected to the vehicle network link 128. Stated another way, the ECUs of the vehicle network architecture 1300 connect to the OBDC 118 via the vehicle network link 128. The arrangement 122, 124, 126 shown in FIG. 2 is applicable to connecting the computing system 102 to the OBDC 118 and, in turn, the ECUs of the vehicle network architecture 1300.

FIG. 11 shows the vehicle network architecture 1300 defined to have an ECU subset 1302, 1304, and 1306. Each of those ECU subsets includes four ECUs. As an example, the ECU subset 1302, 1304, and 1306 can be defined by an OEM of the vehicle 108, a manufacturer of the computing system 102, or a user of the computing system 102. The ECU subset 1302, 1304, 1306 can be referred to as a predetermined group of ECUs, or more simply, a group of ECUs.

The computing system 102 can be used to communicate with one, all, or one or more the subsets of ECUs (i.e., the ECU subset 1302, 1304, and 1306) within the vehicle network architecture 1300. In particular, the computing system 102 can perform disclosed techniques to enable a user to selectively communicate with one or multiple subsets of ECUs within the vehicle based on criteria selected or input by the user (e.g., criteria or input entered via a user interface 1450 shown in FIG. 14). The computing system 102 can effectively communicate directly with specific ECUs rather than all of the ECUs within the vehicle, which can save time and computing resources. In addition, the computing system 102 can also enable a user to temporarily limit communication to a subset of ECUs, which can prevent the DTCs or other data stored in other ECUs from being cleared. For instance, the computing system 102 can enable a user to limit access to ECUs within a safety critical system of the vehicle, such that the user does not access other ECUs within the vehicle.

The computing system 102 can display and use various user interfaces to facilitate the creation of custom ECUs groups and associated access rights. The user interfaces can be used by the computing system 102 to ensure a seamless and intuitive experience for users. For example, the computing system 102 can incorporate a drag-and-drop interface that allows users to effortlessly arrange ECUs (or vehicle systems or functionalities) into groups by dragging them across the screen. The computing system 102 can also present context menus that offer options for creating new USCs, renaming existing USCs, modifying ECU subsets, merging ECU subsets, or deleting ECU subsets. A user interface displayed by the computing system 102 can include a toolbar or sidebar that enables functions, such as creating new USCs and managing existing USCs. The computing system 102 can also display dropdown menus as part of the user interface, which can be employed to enable users to select ECUs and add them to existing ECU subsets or create new ECU subsets. In some examples, to enhance user efficiency, the user interface can also include a search bar or filters that can be integrated for quickly locating a specific function or vehicle system. The computing system 102 can also provide editable labels or tags for ECU subsets, which provide users with a customizable way to organize and identify their custom ECU subsets.

As an example, a user may use the computing system 102 to analyze the status and/or operations of one or more vehicle systems within a vehicle. The user might create one or multiple ECU subsets that can be subsequently selected to communicate with specific ECUs within the vehicle. For instance, the user interface displayed by the computing system 102 can enable the user to simply drag and drop ECUs from a list or block diagram (e.g., the vehicle network architecture 1300 shown in FIG. 11) into a designated area to create a custom ECU subset, which can be saved by the computing system 102 and subsequently used to trigger the computing system 102 to engage in communication with the ECUs assigned to the custom ECU subset.

In accordance with the example embodiments, the computing system 102 can include and/or display three or more USCs, which enables the technician or user to use the computing system 102 to communicate directly with predefined subsets of ECUs within the vehicle. For example, the computing system 102 can output a user interface 1450 shown in FIG. 14 to provide the three or more USCs. In particular, a first USC (e.g. a USC 1454 shown in FIG. 14) can correspond to ECU subset 1302, a second USC (e.g. a USC 1456 shown in FIG. 14) can correspond to ECU subset 1304, and a third USC (e.g. a USC 1458 shown in FIG. 14) can correspond to ECU subset 1306. When or after the first USC is selected, the computing system 102 can directly communicate with the engine control ECU 1308, the transmission control ECU 1310, the charging system ECU 1312, and the starting system ECU 1314 due to the correlation between the first USC and the ECU subset 1302. Similarly, when or after the second USC is selected by the user, the computing system 102 is configured to directly communicate with the instrument cluster ECU 1316, the body control ECU 1318, the HVAC system ECU 1320, and the airbag system ECU 1322 due to the correlation between the second USC and the ECU subset 1304. Likewise, when or after the third USC is selected by the user, the computing system 102 is configured to communicate with the anti-lock brake ECU 1324, the steering system ECU 1326, the suspension system ECU 1328, and the traction control system ECU 1330 due to the connection between the third USC and the ECU subset 1306.

The computing system 102 can include and/or display options for the user to modify the USCs, such as adding additional vehicle systems, subsystems, or functionalities to a USC. For example, the computing system 102 can output a user interface 1700 shown in FIG. 18 and FIG. 19. When the user adds a system or ECU to an ECU subset or removes a system or ECU from an ECU subset, the computing system 102 can then add or remove the appropriate ECU or ECUs associated with the user's input. After removing the ECUs from an ECU subset, the computing system 102 can be arranged so that the computing system does not transmit any VDMs directed to the ECUs removed from the ECU subset or does not transmit particular VDMs directed to the ECUs removed from the ECU subset.

Figure 18:
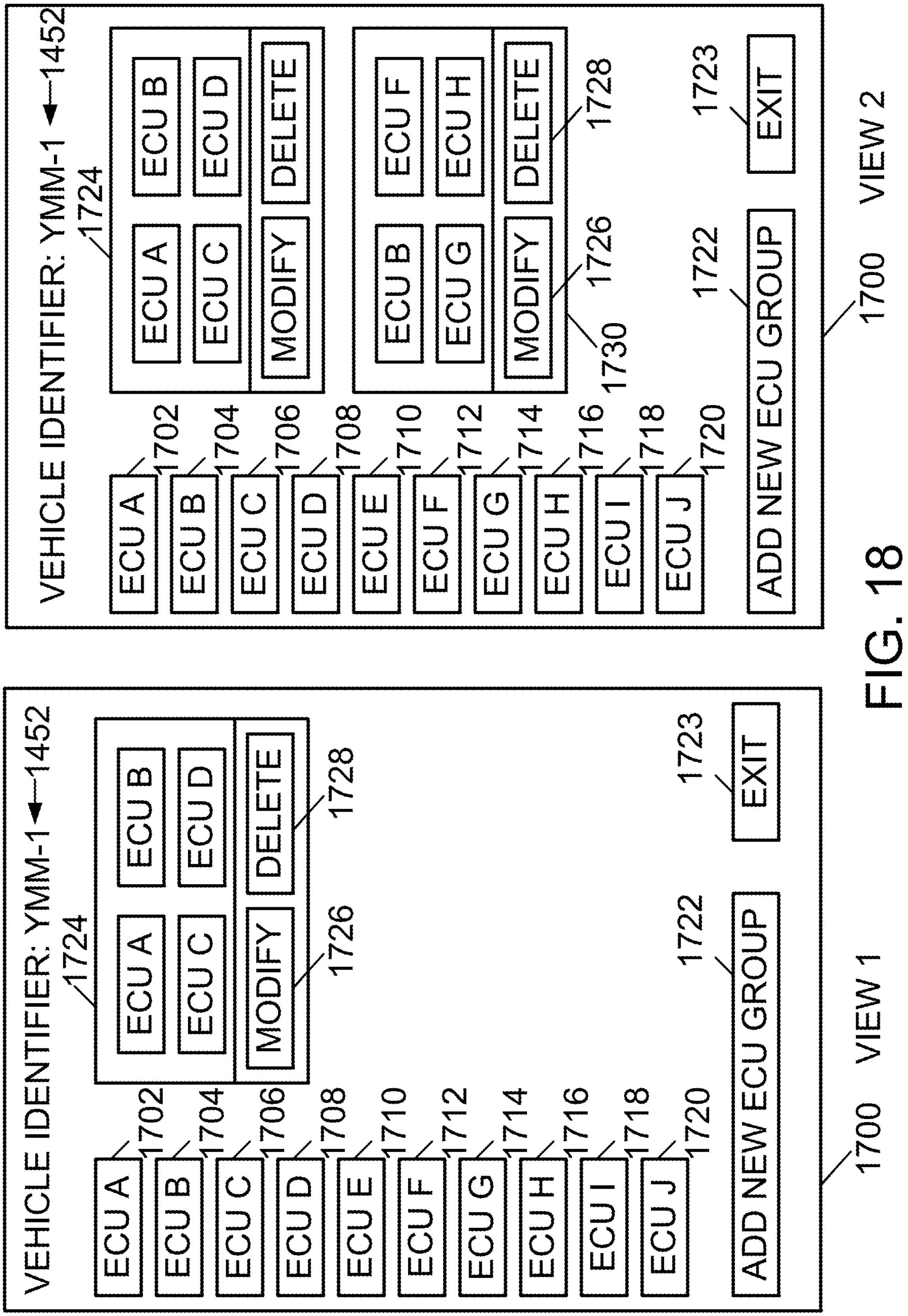
Figure 19:
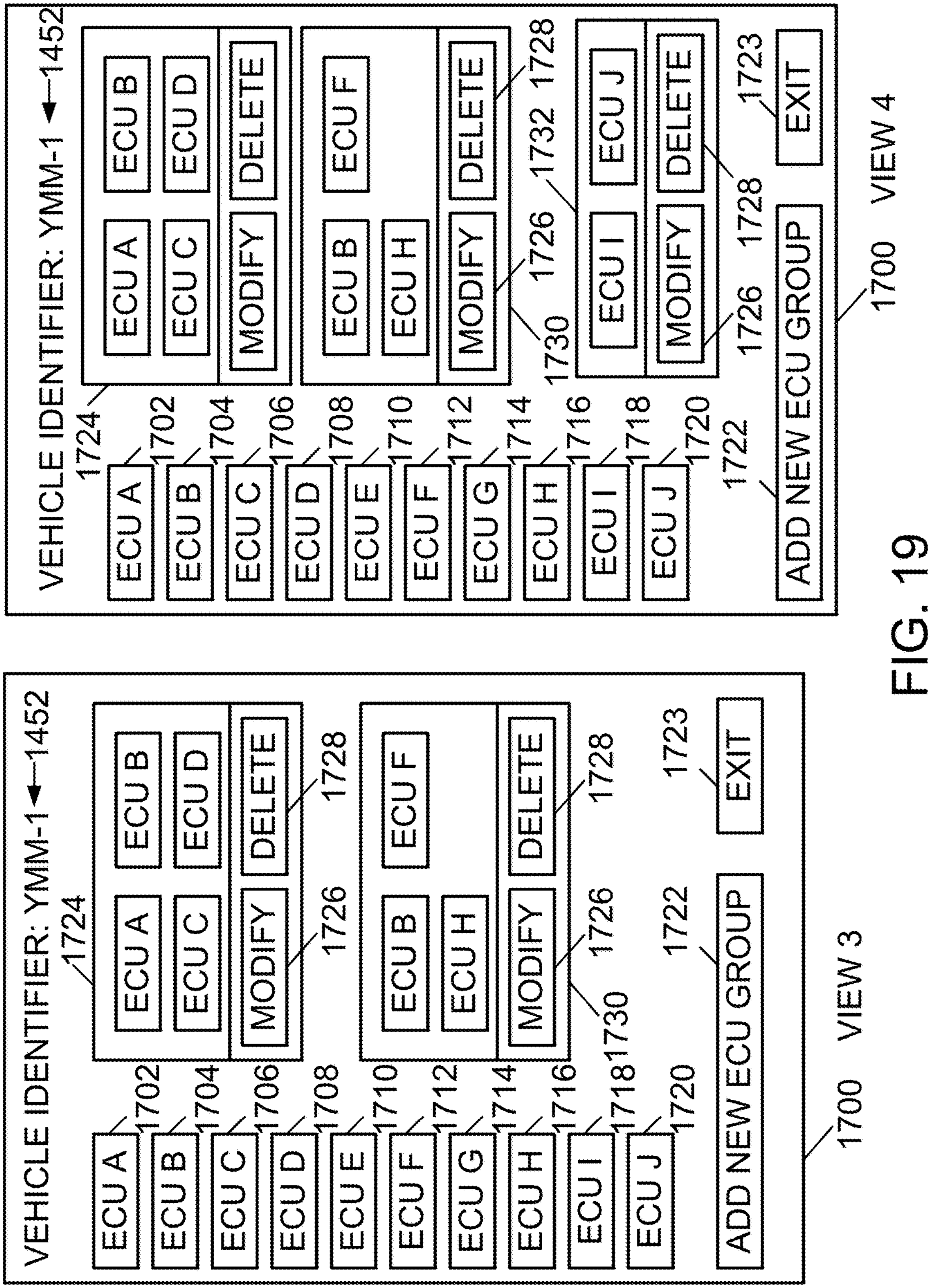

Additionally or alternatively, the computing system 102 can include a graphical user interface via which a user can make selections to modify data indicating how many USCs corresponding to an ECU group are to be displayed and which ECU(s) are contained within each ECU group. The user interface 1700 shown in FIG. 18 and FIG. 19 is an example of the aforementioned graphical user interface.

Figure 12:
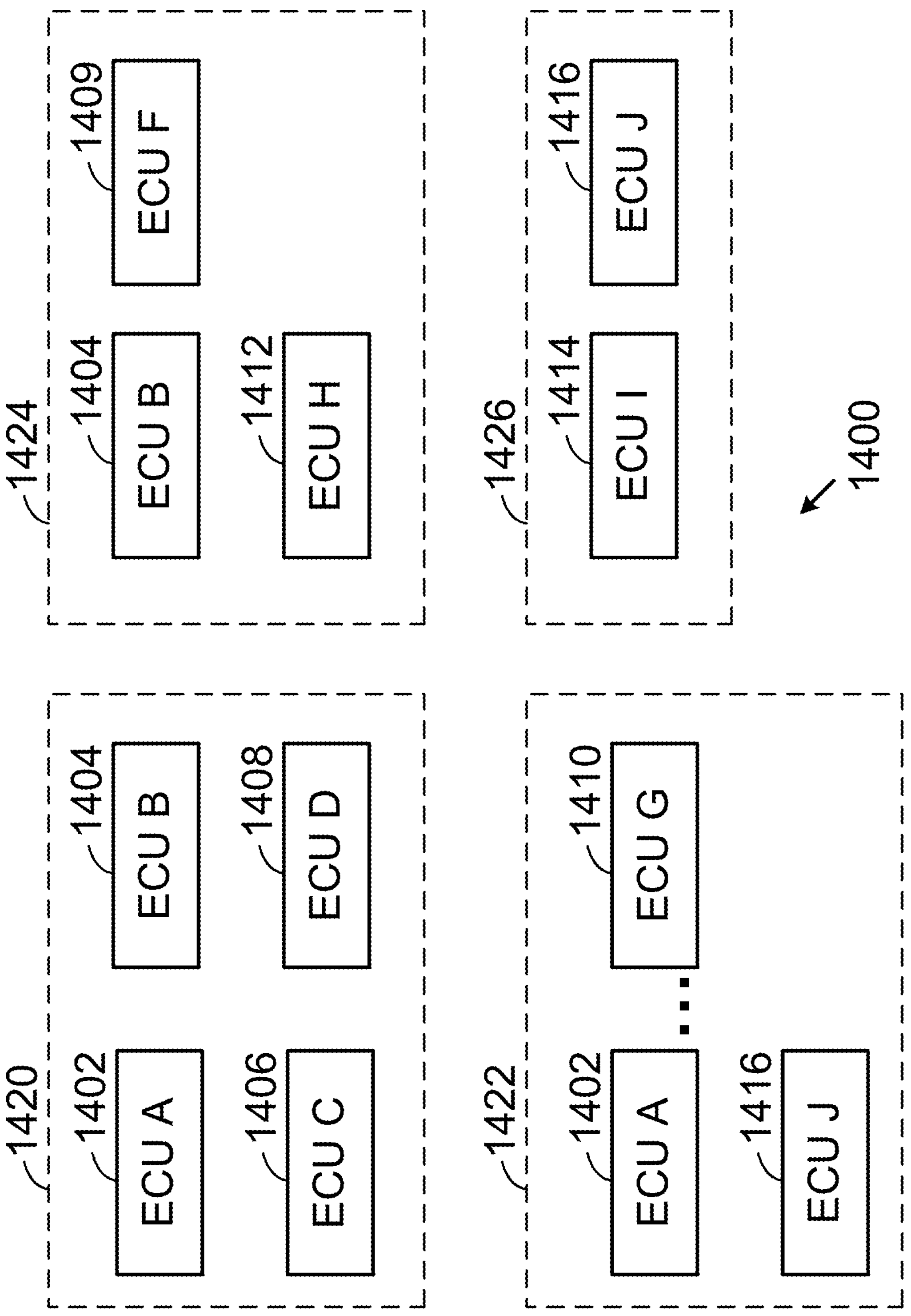
FIG. 12 is a block diagram depicting ECU groups, according to one or more example embodiments.

Next, FIG. 12 is a block diagram 1400 depicting example ECU groups (i.e., ECU subsets). As discussed above, the computing system 102 or other types of computing devices performing techniques presented herein can enable the customization of ECUs into different groups. The division of the ECUs into groups can be predefined by the computing system 102, stored and obtained from a server or another type of computing device.

As shown, example ECU groups can be created or predefined by the computing system 102 or another computing device. In addition, disclosed techniques can enable groups to be created by the computing system 102 without requiring the user to specifically identify which ECUs should be part of each group. For instance, the computing system 102 can present an interface that enables a user to select which systems to be analyzed and then identify the ECUs associated with each selected system. For example, the computing system 102 can present an interface that enables a user to select one or multiple systems to obtain DTCs, PID data, or other data from ECUs within a group of ECUs.

In the example embodiment, the block diagram 1400 shows an ECU subset 1420 that includes ECU A 1402, ECU B 1404, ECU C 1406, and ECU D 1408, and an ECU subset 1422 that consists of ECU A 1402 through ECU G 1410, inclusive, as well as ECU J 1416. In addition, the block diagram 1400 also shows an ECU subset 1424 that consists of ECU B 1404, ECU F 1409, and ECU H 1412, and an ECU subset 1426 that consists of ECU I 1414 and ECU J 1416. The computing system 102 can output a GUI that shows ECU groups defined for a vehicle and/or a user. An example of such a GUI is shown in FIG. 16.

In some examples, techniques can include using user profiles, which can be used to save settings and groupings for later access when using the same computing device or another computing device. For instance, upon creating an account or logging into a system, users can use disclosed devices (e.g., computing system 102) to establish a profile containing preferences and settings related to using the device to service a vehicle. As such, customizable settings, such as display preferences, language, and notification settings, are complemented by the ability to create groupings, which include organizing ECUs based on specific criteria (e.g., vehicle systems, vehicle zones). As users modify their settings or create groupings, these changes can be systematically saved to the user's profile, which can be stored on a server or cloud storage associated with the device (e.g., computing system 102). In some cases, settings can be stored as key-value pairs or in a structured format, while groupings include saving metadata that defines these categorized groups. This ensures that the user's personalized experience is consistent and accessible across different VSTs.

In addition, to facilitate access across various devices, each user profile can be associated with a unique identifier, such as a username, email address, or user ID. When a user logs into the application on a new VST or another type of device, the system verifies the user's credentials and retrieves the associated profile from the server or cloud storage. Synchronization mechanisms can be used to regularly check for updates to the user's profile, which ensures that any changes made on one device are applied to others. Security measures including encryption and secure authentication protocols, safeguard user profiles and sensitive information during both transmission and storage. In accordance with at least some embodiments, the user profile data can be stored within the authentication data 614 and/or within another portion of the memory 606.

V. Example Display Presentations

As noted, the computing system 102 includes a user interface 406. In accordance with at least some of the example embodiments, the user interface 406 can output a user interface (e.g., a graphical user interface) on a display of the user interface 406. FIG. 13 to FIG. 23 show examples of graphical user interfaces that can be output on a display of the user interface 406.

Figure 13:
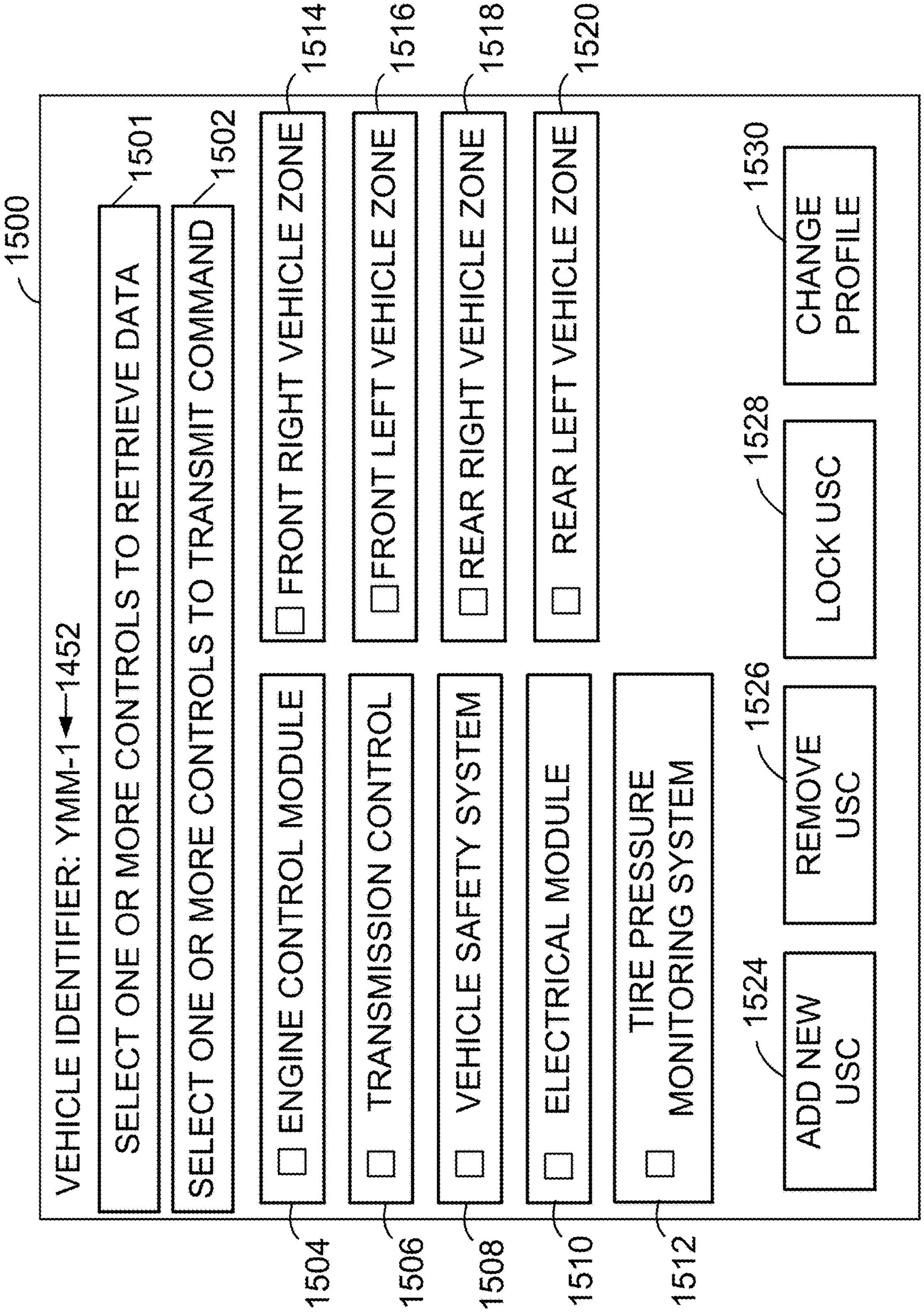
FIG. 13, FIG. 14, FIG. 15, FIG. 16, FIG. 17, FIG. 18, and FIG. 19 are user interfaces displayable by a computing system, according to one or more example embodiments.

FIG. 13 is a user interface 1500 displayable by a computing system. The user interface 1500 can be presented by the computing system 102 during servicing of a vehicle. VSTs and other types of computing devices can display the user interface 1500 or similar user interfaces to enable a user to selectively obtain data from different ECUs within the vehicle and/or to selectively send commands directed to different ECUs within the vehicle. Those different ECUs can be referred to as a predetermined group of ECUs. The user interface 1500 includes a vehicle identifier 1452.

The user interface 1500 includes various elements that enable a user to use the computing system to communicate with vehicle systems (e.g., ECUs). As shown, the user interface 1500 can communicate instructions for the user to understand how to use the computing system. In the example shown in FIG. 13, instructions 1501 recite "Select one or more controls to retrieve data", and instructions 1502 recite "Select one or more controls to transmit command", but can convey other instructions or information within other examples.

There are several different USCs presented as part of the user interface 1500. The quantity and arrangement of the USCs can vary within examples. In the example embodiment shown in FIG. 13, the USCs include an engine control module USC 1504, a transmission control USC 1506, a vehicle safety system USC 1508, electrical module USC 1510, a tire pressure monitoring system USC 1512, a front right vehicle zone USC 1514, a front left vehicle zone USC 1516, a rear right vehicle zone USC 1518, and a rear left vehicle zone USC 1520. A user may use the user interface 1500 to select one or multiple USCs, which causes the computing system 102 to then communicate directly with one or more subsets of ECUs within the vehicle that correspond to the selected USC.

As an example, the computing system 102 can detect a selection of the vehicle safety system USC 1508 and the engine control module USC 1504. In response to the selections by the user, the computing system 102 can then directly communicate with ECUs that correspond to the vehicle safety system USC 1508 and the engine control module USC 1504 to obtain PID data, DTCs, and/or other information, and/or to send commands to the aforementioned ECUs. The communication techniques used by the computing system 102 can differ for the different ECU subsets, which can include using different protocols, types of messages (e.g., broadcast or physical), security procedures, different CAN buses, and/or other parameters.

In addition, the user interface 1500 can also include other USCs, such as an add new USC 1524, a remove USC 1526, a lock USC 1528, and a change profile USC 1530. The add new USC 1524 can enable the user to create a new USC while the remove USC 1526 can enable the user to remove one or multiple USCs displayed by the user interface 1500.

The lock USC 1528 enables the user to temporarily lock one or more of the USCs from being used and/or to prevent the computing system 102 from transmitting particular VDMs to a vehicle corresponding to the vehicle identifier. As an example, a user may use the lock USC 1528 to require a password to be entered to select the vehicle safety system USC 1508 in order to temporarily prevent other users from clearing diagnostic codes associated with ECUs in the vehicle safety system of a vehicle represented by the vehicle identifier 1452. Use of the lock USC 1528 can be used to unlock a USC that is currently locked.

In at least some embodiments, a locked USC or locked VDMs can remain locked for a vehicle corresponding to the vehicle identifier even after the computing system 102 is used to service another vehicle corresponding to a different vehicle identifier entered into the computing system 102. In accordance with those implementations, upon re-entering the vehicle identifier corresponding to the vehicle and the locked USC or locked VDMs, the user interface 1500 can be displayed and the locked USC or locked VDMs can be unlocked using the USC 1528.

In at least some embodiments, use of the USC 1528 can lock one or more USCs and/or one or more VDMs for a predefined amount of time (e.g., thirty or 60 minutes). In accordance with at least some embodiments, use of the USC 1528 can prompt a user to select a custom amount of time. In accordance with at least some embodiments, the computing system 102 can output an alert that the predefined amount of time has expired or is about to expire and output a USC that permits the user to extend the amount of time that the one or more USCs and/or one or more VDMs remained locked for the vehicle corresponding to the vehicle identifier 1452.

The change profile USC 1530 enables a user to sign out and allow another user to sign into the computing system 102 to use the computing system 102. By using profiles, the computing system 102 can adjust settings for each user. The profiles can be stored on a remote computing system and accessed by various VSTs. This way, a user may access the same settings across multiple VSTs.

Figure 14:
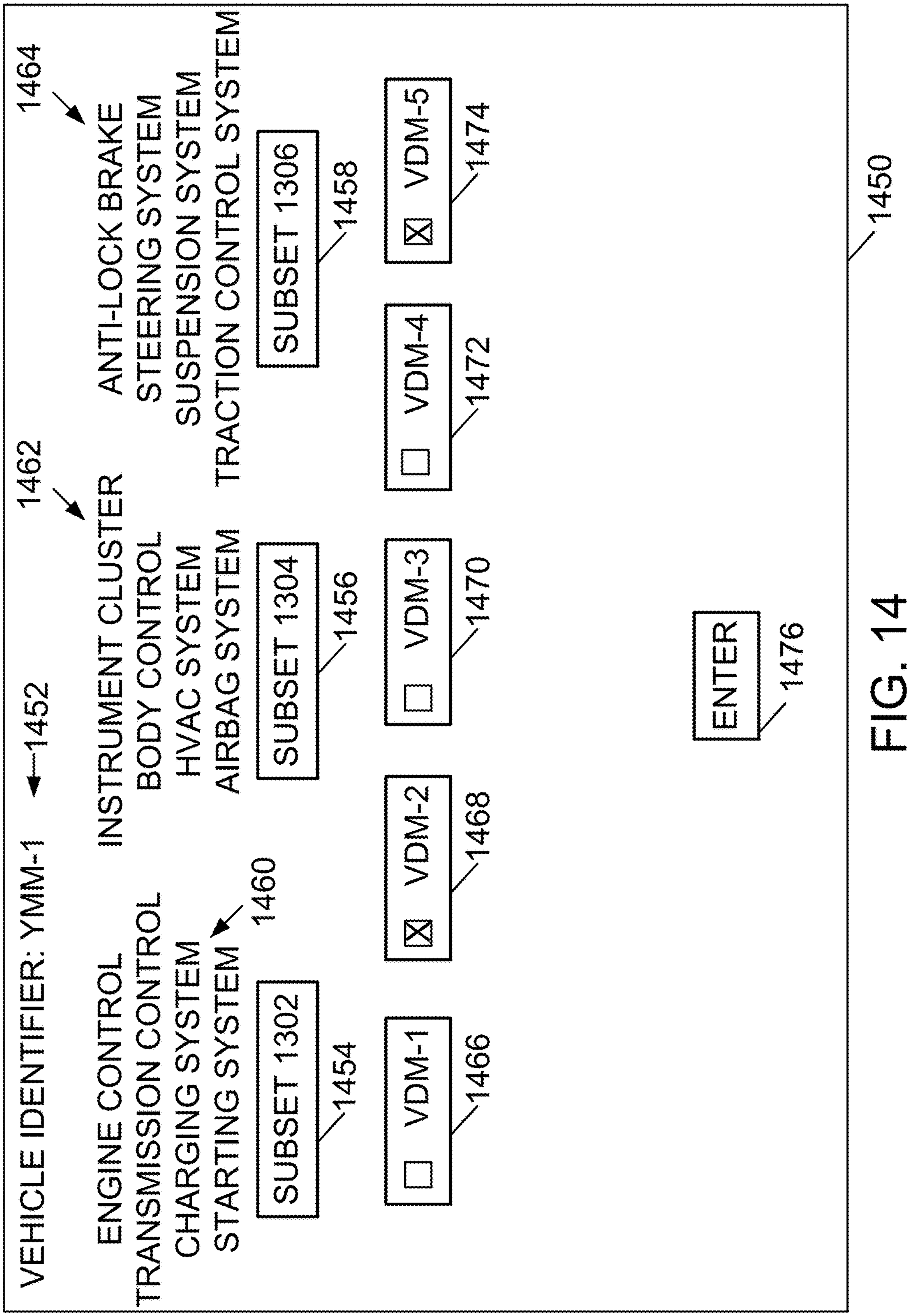

Next, FIG. 14 shows a user interface 1450 displayable by a computing system. The user interface 1450 includes a vehicle identifier 1452 corresponding to a vehicle connected to the computing system 102 and/or selected by a user or automatically after the computing system 102 is connected to the vehicle. Any other user interface shown in the drawings or otherwise described in this description can include a vehicle identifier like the vehicle identifier 1452.

The user interface 1450 includes a USC 1454, 1456, 1458 configured for selecting a subset of ECUs within vehicle connected to the computing system 102. In particular, the USC 1454 is configured for selecting the ECU subset 1302 shown in FIG. 11, the USC 1456 is configured for selecting the ECU subset 1304 shown in FIG. 11, and the USC 1458 is configured for selecting the ECU subset 1306 shown in FIG. 11. The user interface 1450 includes descriptor 1460 indicative of the ECUs within the ECU subset 1302 and/or the systems that contain the ECUs within the ECU subset 1302. The user interface 1450 includes descriptor 1462 indicative of the ECUs within the ECU subset 1304 and/or the systems that contain the ECUs within the ECU subset 1304. The user interface 1450 includes descriptor 1464 indicative of the ECUs within the ECU subset 1306 and/or the systems that contain the ECUs within the ECU subset 1306. The descriptor 1460 can be disposed adjacent and/or in proximity to the USC 1454. The descriptor 1462 can be disposed adjacent and/or in proximity to the USC 1456. The descriptor 1464 can be disposed adjacent and/or in proximity to the USC 1458. A person skilled in the art will understand that the user interface 1450 can include a different quantity of USCs for selecting ECU subsets defined for a vehicle.

The user interface 1450 includes a USC 1466, 1468, 1470, 1472, 1474 for selecting a VDM and/or an ECU command to send to the vehicle for ECUs within a selected subset of ECUs. As an example, the USC 1466 can be selectable to transmit mode $04 request(s) to the selected subset of ECUs according the SAE J1979 VDM protocol for clearing DTCs. As another example, the USC 1468 can be selectable to transmit mode $03 request(s) to the selected subset of ECUs according the SAE J1979 VDM protocol for determining DTCs set by those ECU(s). As yet another example, the USC 1470 can be selectable to transmit mode $09 request(s) to the selected subset of ECUs according the SAE J1979 VDM protocol for requesting vehicle information stored by those ECU(s). As still yet another example, the USC 1472 can be selectable to transmit mode $02 request(s) to the selected subset of ECUs according the SAE J1979 VDM protocol for determining freeze frame data stored by those ECU(s). As still yet another example, the USC 1474 can be selectable to transmit mode $01 request(s) to the selected subset of ECUs according the SAE J1979 VDM protocol for determining current data generated by those ECU(s).

In accordance with the example embodiments, one or more PIDs can be associated with the USC 1472 and/or the USC 1474 so that the processor 402 can request particular PID parameter values from the vehicle. A person having ordinary skill in the art will understand the user interface 1450 can include a different quantity of USCs for selecting a VDM and/or an ECU command to send to the vehicle, different SAE J1979 modes for one of the USC 1466, 1468, 1470, 1472, 1474, or USCs for selecting a VDM and/or an ECU command of a protocol other than the SAE J1979 VDM protocol.

The user interface 1450 includes a USC 1476 selectable to signal the processor 402 to proceed based on selections of one or more of the USC 1454, 1456, 1458, 1466, 1468, 1470, 1472, and 1474. The processor 402 can execute program instructions within the CRPI 408 in response to a selection of the USC 1474 to transmit particular VDM to the vehicle and to output a user interface that displays content of the VDMs received in response to the VDMs transmitted to the vehicle.

Table G shows additional examples of ECU groups and ECUs and/or systems including ECU(s) within the ECU subgroup. Other examples of ECU groups and ECUs within an ECU group are also possible.

TABLE G

| ECU Group | ECU/System |
|---|---|
| Audio/Video, Infotainment and Accessories | Amplifier (AMP), Audio, Audio Control Module, Digital Information System, Global Position System Module, Navigation Module, Radio, Chargers |
| Airbag | Airbag, Occupant Classification, Passenger Presence System, Weight Classification |

TABLE G-continued

| ECU Group | ECU/System |
|---|---|
| Driver Aids/ADAS | Active Brake Assist, Active Cruise Control, Blind Spot Detection, Collision Prevention Assist, Lane Departure Warning |
| Body Controls | Mirror Module, Wiper Module, Rain Light Sensor, Body Control Module, Central Gateway (BCM) |
| Steering/Chassis/Suspension | Active Control Mount, Air Suspension, Electronic Power Steering, Active Height Control Suspension |
| Drivetrain Systems | 4WD, Active Center Differential, All Wheel Drive, Rear Differential Clutch Control Module, Super Select 4WD, Transfer Case |
| Engine (Diesel) | Engine, Powertrain |
| Engine Related Systems and Controls (Diesel) | Selective Catalyst Reduction, Adblue, Diesel additive, Glow Plug Control, Fuel Injector Control, Engine Cooling Module, PTO |
| Engine (non-diesel) | Engine, Powertrain |
| Engine Related Systems and Controls (non-Diesel) | Starting Control, Fuel Pump Control Module, Stop - Start Control, Cruise Control, Engine Cooling Module, Idle Learning |
| Heating, Ventilation and Air Conditioning | Climate Control, Coolant Heater Control Module, Heater Booster, HVAC, Rear Auxiliary Climate Control |
| Hybrid/Electric Vehicle Systems | Battery Charger Control Module, DC/DC Converter, Hybrid Control, Starter Generator Control Module, Traction Battery Cell 1 |
| Instrument Cluster | Cluster Module, Dash Integration Module, Info Display, Instrument Panel, Message Center Module |
| Safety and Restraints - (non-ADAS) | Seat belt, Nightvision, Active hood, |
| Anti-Theft/Locks | Anti-Theft Warning, F.A.S.T./IMMO, Immobilizer, Key Registration, Keyless Entry, Smart Key Access, Theft Deterrent |
| Telematics and Communication | Cellular Phone Module, Onstar, Telematics, Vehicle Emergency Messaging System |
| Tire Pressure Monitor System | Low Tire Warning System, Tire Pressure Monitor |
| Transmission | Auxiliary Transmission Fluid Pump, Electronic Gear Selector, Transmission |
| Brakes | Antilock Brakes, Electric Parking Brake, Hydraulic Brake Booster, Traction Control |
| Seat Controls | Seat Module, Assist Power Seat Module, Climate Control Seat Module, Heated Seat Module, Memory Seat |
| Doors and Windows | Back Door Module, Door Module - Driver, Liftgate, Tailgate, Rear Gate, Power Sliding Door, Power Windows, Door Locks |
| Lighting and Controls | Adaptive Front Lighting, Lighting Control Module, Xenon Headlamps, Auto Headlamp Leveling Module |

Figure 15:
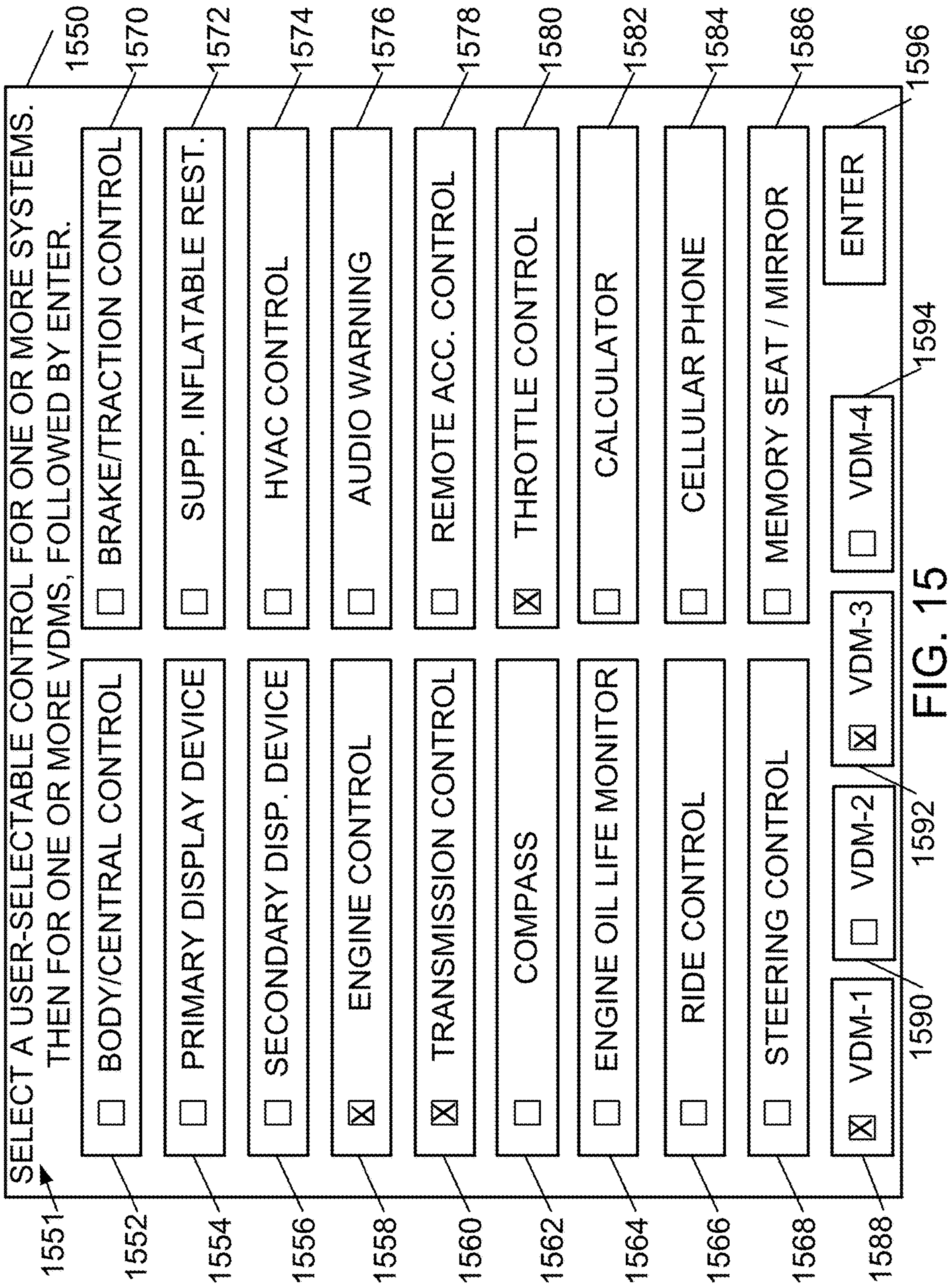

Next, FIG. 15 shows a user interface 1550 displayable by a computing system. The user interface 1550 can be presented by the computing system 102 during servicing of a vehicle. VSTs and other types of computing devices can display the user interface 1550 or similar user interfaces to enable a user to selectively obtain data from different ECUs within the vehicle and/or to selectively send commands directed to different ECUs within the vehicle. Those different ECUs can be referred to as a predetermined group of ECUs. In at least some respects, the user interface 1550 can be configured with a configure option that enables selection of multiple ECUs to form the first predetermined group of ECUs.

The user interface 1550 includes an instruction 1551 to guide a user in using the user interface 1550 to diagnose and/or service a vehicle.

The user interface 1550 includes a USC 1552, 1554, 1556, 1558, 1560, 1562, 1564, 1566, 1568, 1570, 1572, 1574, 1576, 1578, 1580, 1582, 1584, 1586, 1588, 1590, 1592, 1594, 1596.

The USC 1552, 1554, 1556, 1558, 1560, 1562, 1564, 1566, 1568, 1570, 1572, 1574, 1576, 1578, 1580, 1582, 1584, 1586 corresponds to a system identifier, such as a system identifier shown in Table A. As shown in Table A, each system identifier corresponds to a different test message identifier. A user can select one or more of the USC 1552, 1554, 1556, 1558, 1560, 1562, 1564, 1566, 1568, 1570, 1572, 1574, 1576, 1578, 1580, 1582, 1584, 1586. FIG. 15 represents a selected USC by an X. In that regard, the USC 1558, 1560, 1564, and 1580 are selected. As an example, a user may select the USC 1558, 1560, 1564, and 1580 when diagnosing complaints and/or system regarding an engine and/or transmission system within a vehicle. Based on this example, the computing system can transmit communications directed to the selected vehicle systems and/or components without transmitting communications directed to the unselected vehicle systems and/or components.

A user can select the USC 1588, 1590, 1592, 1594 for selecting a VDM and/or an ECU command. As an example, the VDM-1 can comprise a VDM with a mode identifier $04 to examine memory of an ECU (e.g., to examiner portions of the memory that contain DTC information), and the VDM-3 can comprise a VDM with a mode identifier $04 to examine memory of an ECU (e.g., to examiner portions of the memory that contain PID data). As another example, the VDM-2 can comprise a VDM with a mode identifier $08 to disable normal mode communications, and the VDM-4 can comprise a VDM with a mode identifier $0A to clear DTCs. Other examples of a VDM and/or ECU command corresponding to the USC 1588, 1590, 1592, 1594 are also possible. In alternative arrangements, the user interface 1550 can include fewer or more USCs for selecting a VDM and/or ECU command. Moreover, in other embodiments, the VDM and/or an ECU command corresponding to the USC 1588, 1590, 1592, 1594 can be different. Examples of other types of VDM and/or ECU commands are described elsewhere in this description and in at least with respect to FIG. 14 to FIG. 16.

A user can select the USC 1596 to trigger the computing system to send VDM(s) corresponding to the selected USCs among the USC 1588, 1590, 1592, 1594 (e.g., the USC 1588, 1592 as shown in the user interface 1550) to a predetermined group of ECUs (e.g., ECUs corresponding to a system represented by the USC 1558, 1560, 1564, and 1580).

In accordance with at least some embodiments, in response to selecting the USC 1596, the computing system can transmit the VDM-1 to an ECU for the engine control system, an ECU for the transmission control system, an ECU for an engine oil life monitor system, and an ECU for the throttle control system. A person skilled in the art will understand that some vehicles may include a single ECU that controls an engine, a transmission, an engine oil life monitor, and a throttle control.

Next, FIG. 16 shows a user interface 1600 displayable by a computing system. The user interface 1600 can be presented by the computing system 102 during servicing of a vehicle. VSTs and other types of computing devices can display the user interface 1600 or similar user interfaces to enable a user to selectively obtain data from different ECUs within the vehicle and/or to selectively send commands directed to different ECUs within the vehicle. Those different ECUs can be referred to as a predetermined group of ECUs.

The user interface 1600 includes an instruction 1602 to guide a user in using the user interface 1600 to diagnose and/or service a vehicle.

The user interface 1600 includes a container 1604, 1606, 1608, 1610, 1612, 1614 including a USC corresponding to a predetermined group of ECUs and a respective USC corresponding to each ECU within the predetermined group of ECUs. As an example, based on the example data shown in Table A, the processor 402 can populate the user interface 1600 with the container 1606 and a USC 1626 selectable to select all ECUs within the ECU group C, and a USC 1628, 1630, 1632, 1634 to select individual ECUs within the ECU group C. In this way, selecting the USC 1626 in a non-selected state can result in a selection of all ECUs within the ECU group C, and selecting the USC in a selected state can result in deselecting all of the ECUs within the ECU group C. Moreover, with all ECUs within the ECU group C selected, a user can select the USC 1628, 1630, 1632, 1634 to deselect an ECU corresponding to the USC 1628, 1630, 1632, 1634. FIG. 16 represents that the USC 1632 has been selected to deselect the ECU corresponding to the engine oil life monitor system.

The user interface 1600 includes a USC 1616, 1618, 1620, 1622, 1624. A user can select the USC 1616, 1618, 1620, 1622 for selecting a VDM and/or an ECU command. As an example, the VDM-1 can comprise a VDM with a mode identifier $04 to examine memory of an ECU (e.g., to examiner portions of the memory that contain DTC information), and the VDM-3 can comprise a VDM with a mode identifier $04 to examine memory of an ECU (e.g., to examiner portions of the memory that contain PID data). As another example, the VDM-2 can comprise a VDM with a mode identifier $08 to disable normal mode communications, and the VDM-4 can comprise a VDM with a mode identifier $0A to clear DTCs. Other examples of a VDM and/or ECU command corresponding to the USC 1616, 1618, 1620, 1622 are also possible. In alternative arrangements, the user interface 1600 can include fewer or more USCs for selecting a VDM and/or ECU command.

A user can select the USC 1624 to trigger the computing system to send VDM(s) corresponding to the selected USCs among the USC 1616, 1618, 1620, 1622 (e.g., the USC 1616, 1620 as shown in the user interface 1600) to a predetermined group of ECUs (e.g., ECUs within the ECU group C notwithstanding any deselected ECU such as an ECU corresponding to the engine oil life monitor system).

As an example, in response to a selection of the USC 1626 to select the ECU group C, then the USC 1632 to deselect the ECU for the engine oil life monitor system, then the USC 1616 and the USC 1620 to select VDM-1 and VDM-3, and then the USC 1624, the computing system can transmit the VDM-1 and the VDM-3 to an ECU for the engine control system, an ECU for the transmission control system, and an ECU for the throttle control system.

Figure 17:
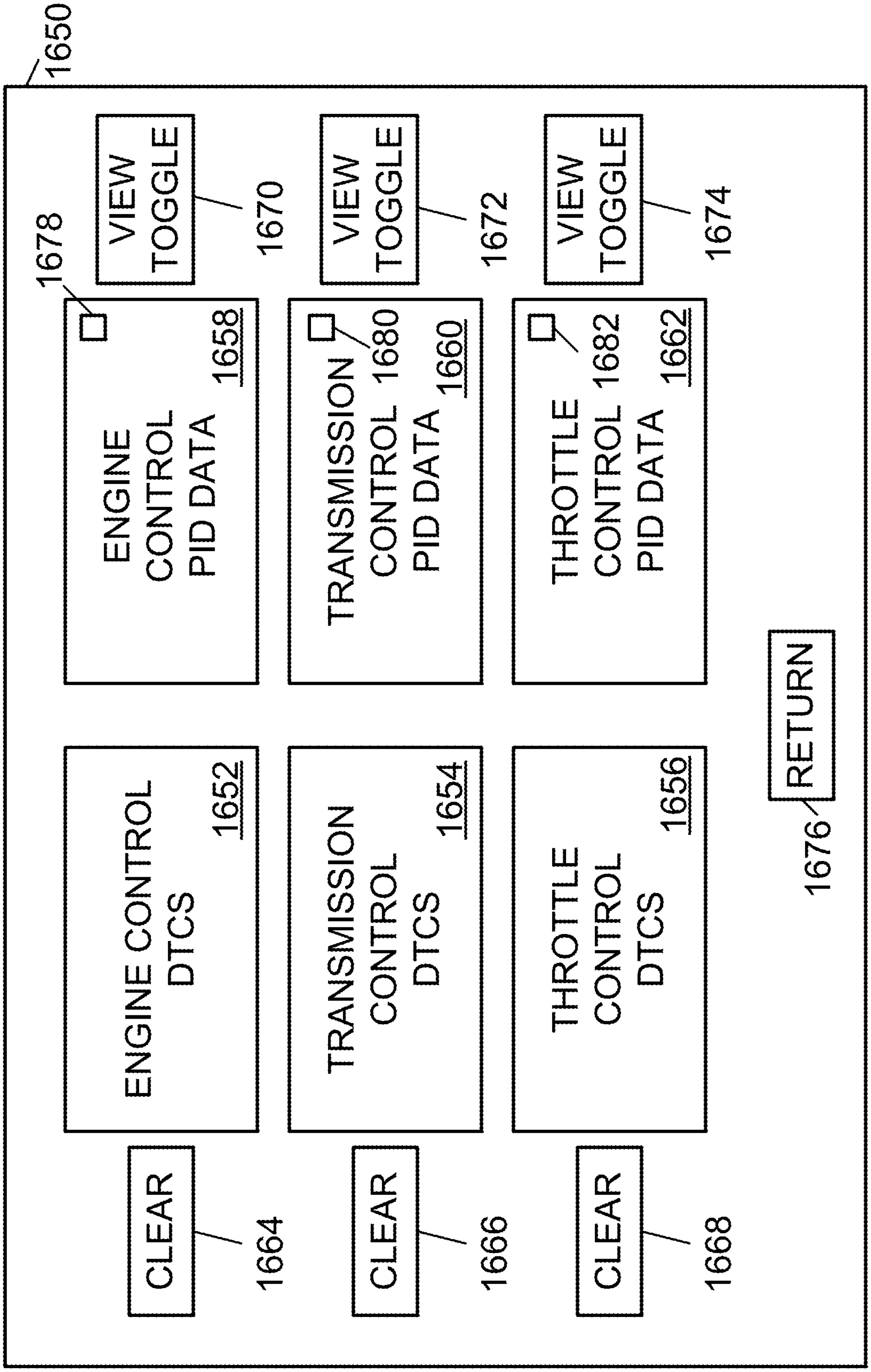

Next, FIG. 17 shows a user interface 1650 displayable by a computing system. The user interface 1650 can be presented by the computing system 102 during servicing of a vehicle. As an example, the computing system 102 can output the user interface 1650 on the user interface 406 in response to a selection of the USC 1596 shown in FIG. 15 or the USC 1624 shown in FIG. 16. VSTs and other types of computing devices can display the user interface 1650 or similar user interfaces to enable a user to selectively obtain data from different ECUs within the vehicle and/or to selectively send commands directed to different ECUs within the vehicle. Those different ECUs can be referred to as a predetermined group of ECUs.

The user interface 1650 includes a container 1652, 1654, 1656, 1658, 1660, 1662. The container 1652, 1654, 1656 includes data indicating DTCs set by the ECU within the engine control system, the ECU within the transmission control system and the ECU within the throttle control system of a vehicle. The container 1658, 1660, 1662 includes PID data corresponding to the ECU within the engine control system, the ECU within the transmission control system and the ECU within the throttle control system of a vehicle.

The user interface 1650 includes a USC 1664, 1666, 1668 selectable to clear DTCs set within the ECU within the engine control system, the ECU within the transmission control system and the ECU within the throttle control system of a vehicle, respectively.

In accordance with at least some embodiments, the container 1658, 1660, 1660 can display PID data in a list view mode (e.g., textually) or in a graph mode. The user interface 1650 includes a USC 1670, 1672, 1674 to toggle the view mode from the list view mode to the graph mode, or from the graph mode to the view mode. Examples of data shown in the list view mode are shown in FIG. 22. Examples of data shown in a graph mode are shown in FIG. 8, FIG. 20, FIG. 21, and FIG. 23.

The user interface 1650 includes a USC 1676 selectable to cause the computing system to return to a prior user interface (e.g., the user interface 1550 shown in FIG. 15 or the user interface 1600 shown in FIG. 16). Afterward returning to the prior user interface, the user can make different selections to cause the computing system to send VDMs to a different predetermined group of ECUs, and/or a different set of VDMs.

Next, FIG. 18 and FIG. 19 show four views of a user interface 1700 displayable by a computing system. The user interface 1700 includes the vehicle identifier 1452. The user interface 1700 includes a USC 1702, 1704, 1706, 1708, 1710, 1712, 1714, 1716, 1718, 1720 selectable to select ECU A, ECU B, ECU C, ECU D, ECU E, ECU F, ECU G, ECU H, ECU I, ECU J, respectively. The user interface 1700 also includes a USC 1722 selectable to add an ECU group based on selections of one or more of the USC 1702, 1704, 1706, 1708, 1710, 1712, 1714, 1716, 1718, 1720. The user interface 1700 further includes a USC 1723 selectable to close the user interface 1700. The computing system 102 can display a different user interface in response to a selection of the USC 1723.

Views 1, 2, 3, 4 include a container 1724. The container 1724 includes an indicator of ECU A, ECU B, ECU C, and ECU D, which are ECUs within an ECU subset corresponding to the container 1724. The container 1724 includes a USC 1726 selectable to modify the ECU subset represented within the container 1724. The container 1724 includes a USC 1728 selectable to delete the container 1724.

View 2 also includes a container 1730. The container 1730 includes an indicator of ECU B, ECU F, ECU G, and ECU H, which are ECUs within an ECU subset corresponding to the container 1730. The container 1730 includes the USC 1726 selectable to modify the ECU subset represented within the container 1730. The container 1730 includes a USC 1728 selectable to delete the container 1730.

View 3 also includes the container 1730, but unlike view 2 of the container 1730, the container 1730 includes an indicator of ECU B, ECU F, and ECU H, which are ECUs within the ECU subset corresponding to the container 1730 after modifying that ECU subset. As an example, modifying the ECU subset corresponding to the container 1730 can occur in response to selecting the USC 1726 within the container 1730 and selecting the indicator of ECU G or selecting the USC 1714. In at least some embodiments, the USC 1726 can be altered to indicate "Save" after the USC 1726 has been selected to modify an ECU subset. In that regards, the USC 1726 can be selected to save the ECU subset after modifying it.

View 4 also includes the container 1730 as shown in view 3 and a container 1732. The container 1732 includes an indicator of ECU I and ECU J, which are ECUs within an ECU subset corresponding to the container 1732. The container 1732 includes the USC 1726 selectable to modify the ECU subset represented within the container 1732. The container 1730 includes a USC 1728 selectable to delete the container 1732.

The quantity of ECUs corresponding to ECUs and a mix of ECUs within the containers within the user interface can vary based on the type of vehicle indicated by the vehicle identifier 1452. Providing a user interface (e.g., the user interface 1700) to modify which ECUs are contained within an ECU subset allows a user to select which ECUs the computing system 102 transmits certain VDMs, such as VDMs to read or clear DTCs. In this way, the user can control the computing system 102 to communicate with particular ECUs and to prevent the computing system 102 from communicating with other ECUs within the vehicle.

Figure 20:
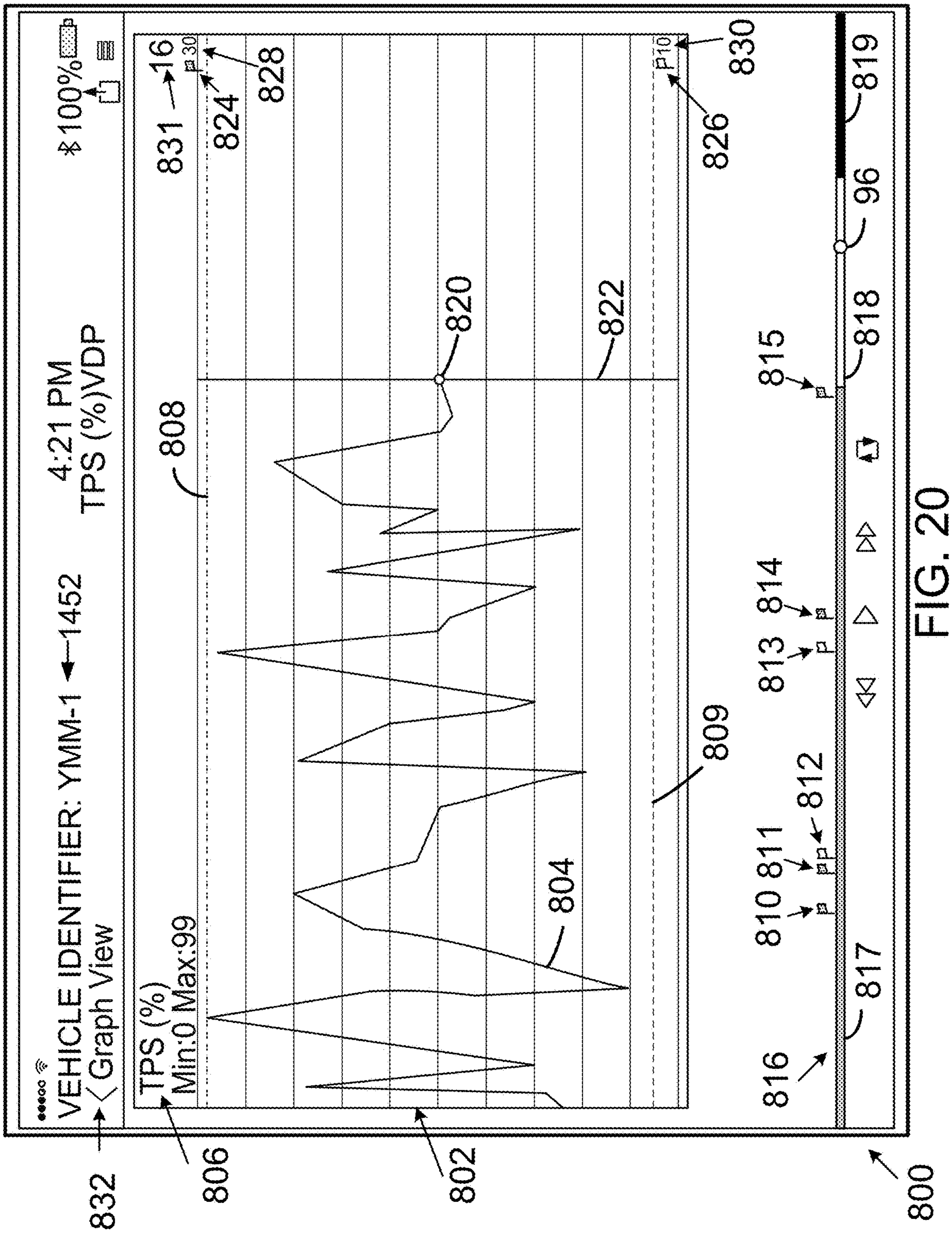
FIG. 20 is a diagram depicting a display presentation, according to one or more example embodiments.

Next, FIG. 20 shows a user interface 800 that the computing system 102 can display on the user interface 406. The user interface 800 includes a vehicle data parameter (VDP) graph window 802 with a VDP line graph 804, VDP graph text 806, and VDP threshold indicators 808, 809 placed on the VDP line graph 804. The user interface 800 also displays vehicle operating condition indicators 810, 811, 812, 813, 814, and 815 along with a time-based indicator 816, and further includes a view selector 832 for selecting different views for a set of VDP, at least one of which can include a currently displayed VDP. Besides the graph view depicted in FIG. 20, other views can include, but are not limited to, a digital view and a list view. As an example, the VDP graph window 802 can be displayed within a container, such as the container 1658, 1660, 1662 shown in FIG. 17.

The VDP line graph 804 is an example of a line graph in which the area below the line graph is not shaded. The VDP line graph 804 can represent parameter values related to a particular PID, such as a first PID that is part of a set of associated PIDs. The set of associated PIDs can correspond to the PID data discussed with respect to FIG. 17 and/or the USC 1474 shown in FIG. 14. The VDP line graph 804 can include or be displayed with other information related to operation of the vehicle 108. That other information can comprise VDP graph text 806, for example. In general, the VDP graph text 806 can include graph text pertaining to any VDP associated with or requested from the vehicle 108. As an example, the VDP graph text 806 can comprise text indicative of a threshold that pertains to a particular vehicle component (e.g., a throttle position sensor (TPS) position) or a PID associated with that vehicle component. The threshold can specify its units, such as a percentage, volts or amperes.

The VDP threshold indicator 808 shown positioned above the VDP line graph 804 in the VDP graph window 802 can represent an upper VDP threshold associated with a TPS position percentage shown in the VDP graph text 806. Similarly, the VDP threshold indicator 809 can represent a lower VDP threshold associated with a TPS position percentage. In some example implementations, the VDP threshold indicators 808 and 809 can include visual indicators (e.g., horizontal lines) indicative of the thresholds. A VDP indicator, such as VDP threshold indicator 808 or 809, can also include a vehicle operating condition (VOC) indicator. A VOC indicator can have unique characteristics to distinguish it from a different type of VOC indicator. In addition, the VDP graph window 802 includes an upper threshold indicator 828 that indicates a numeric value of the upper threshold of the VDP displayed in the VDP graph window 802. The VDP graph window 802 includes a lower threshold indicator 830 that indicates a numeric value of the lower threshold of the VDP displayed in the VDP graph window 802.

As further shown in FIG. 20, the VOC indicator of the VDP threshold indicator 808 includes a dark-colored flag icon 824, whereas the VOC indicator of the VDP threshold indicator 809 includes a light-colored flag icon 826. The dark-colored flag icon 824 and the light-colored flag icon 826 are further discussed with respect to FIG. 22.

The time-based indicator 816 depicted in the user interface 800 can represent various time segments on the user interface 406 of the computing system 102. In other examples, the time-based indicator 816 can have other positions or configurations. As shown, the time-based indicator 816 can include a cursor positioner 820 and time segments 817, 818, and 819 to convey time information to a user of the computing system 102. The cursor positioner 820 can correspond to a cursor positioned in the VDP graph window 802 and can also correspond to a digital VDP value 831 that indicates a current value of the VDP at the cursor. The user interface 800 shows the time-based indicator near a bottom of the user interface 800. The time-based indicator 816 could be displayed at other locations within a user interface.

The time segment 817 provides an indication of an amount time or percentage that frames or data values for the displayed VDP were captured prior to the frames or data values of the VDP currently displayed within the VDP graph window 802, relative to the time segments 818 and 819. The time segment 818 provides an indication of an amount of time or percentage represented by the VDP values displayed within the VDP graph window 802, relative to the time segments 817 and 819. The time segment 819 provides an indication of an amount of time or percentage that the VST can receive additional frames or data values of the VDP before prior instances of the received VDP are overwritten or otherwise deleted for storage of additional frame or data values of the VDP, relative to the time segments 817 and 818.

The VDP line graph 804 can be zoomed in or out within the VDP graph window 802 via a user interface of the computing system 102. As an example, the cursor positioner 820 can be moved in a first direction (e.g., to the right) in order to zoom in on the VDP line graph 804 and moved in a second direction (e.g., to the left) in order to zoom out on the VDP line graph 804. As another example, the cursor or a cursor bar 822 could be moved in the first and second directions to zoom in and zoom out, respectively, of the VDP line graph 804. As another example, zooming in on a VDP line graph can include decreasing the time represented horizontally within the VDP graph window 802 and zooming out on a VDP line graph can include increasing the time representing horizontally with the VDP graph window 802. Alternatively, repositioning the cursor or the cursor bar 822 can include representing a current value of a VDP at another position within the VDP graph window 802.

Figure 21:
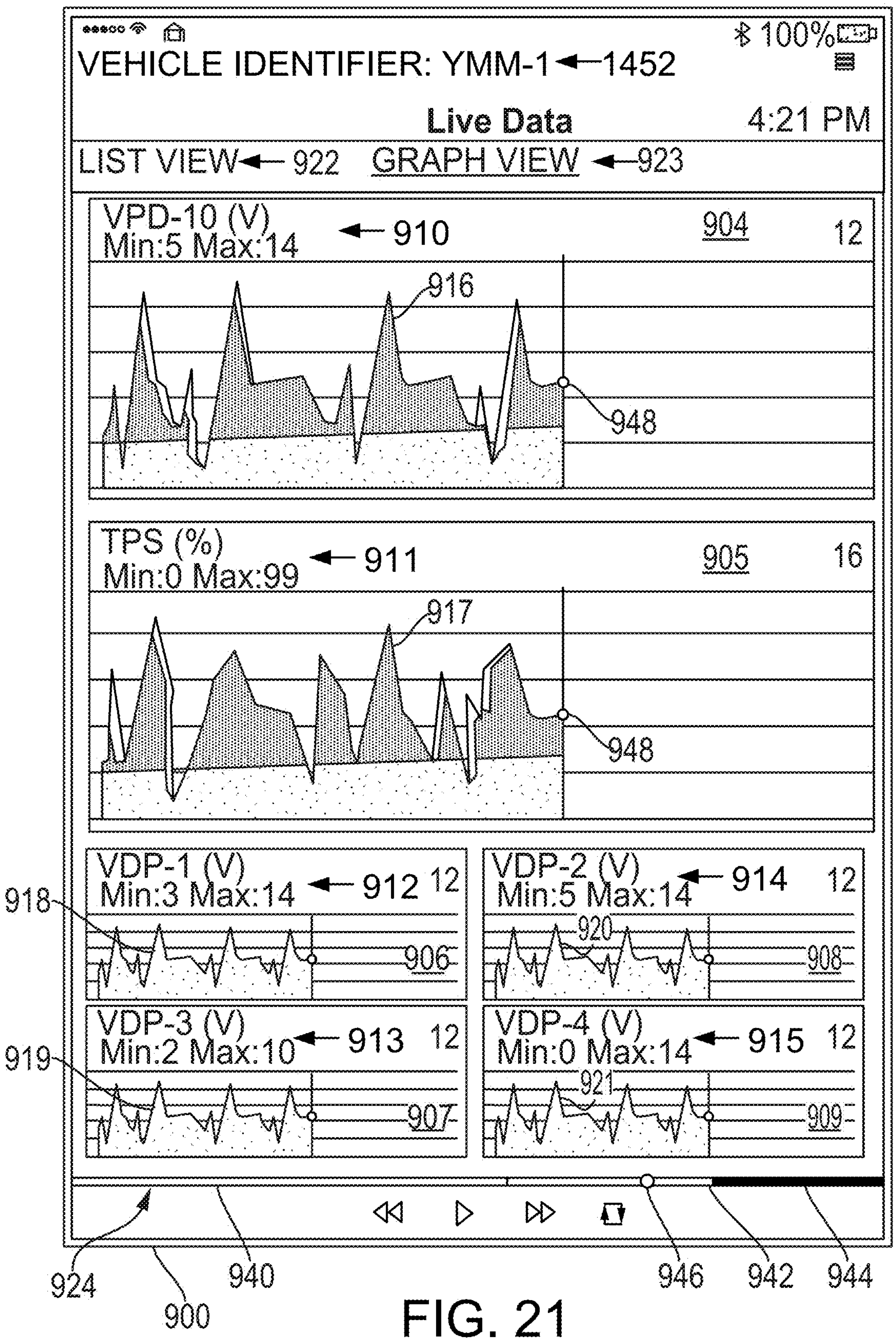
FIG. 21 is a diagram depicting another display presentation, according to one or more example embodiments.
Figure 22:
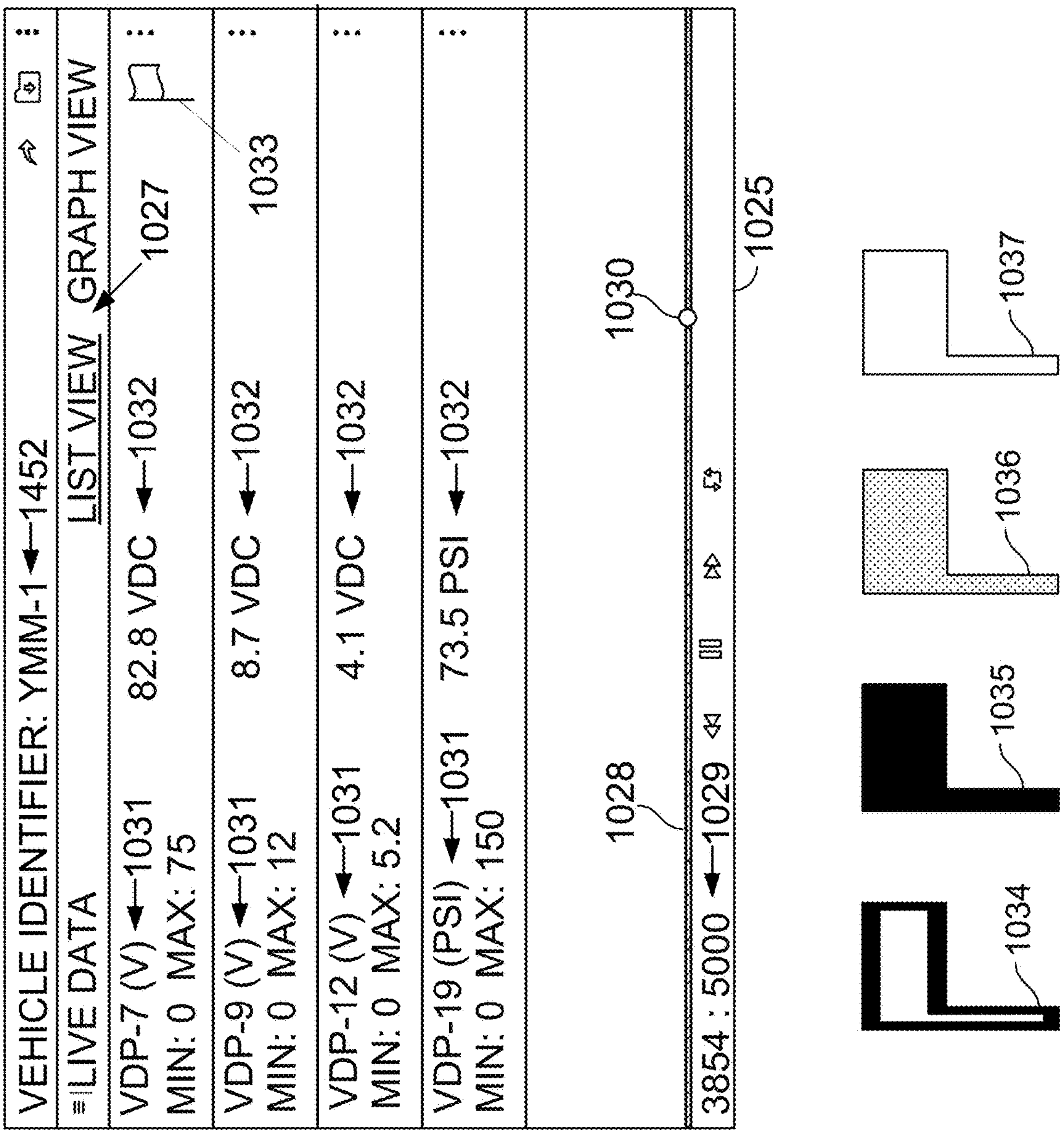
FIG. 22 is a diagram depicting multiple display presentations, according to one or more example embodiments.

Next, FIG. 21 shows a user interface 900 that the computing system 102 can display on the user interface 406. The user interface 900 includes a VDP graph window 904, 905, 906, 907, 908, 909 that includes a VDP graph line 916, 917, 918, 919, 920, 921, respectively, and VDP graph text 910, 911, 912, 913, 914, 915, respectively.

The VDP graph text 910-915 can include text that identifies a different PID for each VDP graph window shown in the user interface 900. For instance, the VDP graph text 910 can be associated with a particular PID and can specify units for the data values of the VDP graph line 916 and at least one of a minimum data value and a maximum data value. The minimum and maximum data values can indicate a low VDP threshold and a high VDP threshold. For example the minimum and maximum data values can indicate a minimum data value and a maximum data value of the VDP currently displayed within the VDP graph window including or associated with the VDP graph text.

The user interface 900 further includes a list view selector 922 and a graph view selector 923. The list view selector 922 can be selected by a display pointer (e.g., a mouse), or otherwise (e.g., via a touchscreen interface or a voice command), to cause the user interface 406 to begin displaying the VDP shown in the VDP graph window 904, 905, 906, 907, 908, 909, or the data represented therein, in a textual format. While the display is displaying VDP in a textual format, the graph view selector 923 can be selected by the display pointer or otherwise (e.g., via a touch screen, voice input) to cause the display to begin displaying the VDP graph window 904, 905, 906, 907, 908, 909.

The user interface 900 includes a time-based indicator 924 with time segment 940, 942, 944, a cursor positioner 946, and a cursor 948 within each of VDP graph window 904, 905, 906, 907, 908, 909. The cursor positioner can be moved in either direction along the time-based indicator 924 to cause uniform movement of the cursor 948 within the VDP graph window 904, 905, 906, 907, 908, 909.

Next, FIG. 22 shows a user interface 1025 that can be output on the user interface 406 of the computing system 102. The user interface 1025 includes the vehicle identifier 1452 and a USC 1027 selectable to cause the computing system 102 to present a different VDP display presentation (e.g., a list of PIDs by selecting "LIST VIEW" or a graph of PIDs by selecting the "GRAPH VIEW." As an example, the user interface 1025 can be displayed in response to selecting a "List View" selector, or another USC within another user interface or from selecting List View from the USC 1027 while the user interface 1025 is displaying data within the graph view.

The user interface 1025 includes a time-based indicator 1028 and a frame or data value indicator 1029. As an example, the frame or data value indicator 1029 indicates 3,834 of 5,000 frames or data values. In some cases, the computing system 102 has received an identical number of data values for each VDP identified in the list view of VDP. In accordance with those cases, the cursor positioner 1030 can be moved to select a different frame or data value of the 5,000 frames or data values. In other instances, the computing system 102 has received a different number of data values for two or more VDP identified in a list view of VDP. In accordance with these other cases, the cursor positioner 1030 can be moved to select a different frame or different value of the received frames or data values for a designated VDP. The data values for the other VDP can change to other data values in relation to the time at which the selected different frame or data value was received.

As shown in FIG. 22, a list view of VDP can include multiple VDP text identifiers (e.g., VDP text identifier 1031) and multiple VDP values (e.g., VDP value 1032). A VOC indicator 1033 is displayed for a VDP for which data values of that VDP breeched a VDP threshold (e.g., greater than an upper threshold or lower than a lower threshold).

FIG. 22 further shows VOC indicators 1034, 1035, 1036, and 1037 as examples of VOC indicators displayable on the user interface 406 of the computing system 102. As shown in FIG. 22 and in other figures, each VOC indicator can include a flag and flagpole icon, but the VOC indicators are not so limited. Furthermore, the user interface 406 can display the VOC indicators with different colors or shading to indicate various characteristics with respect to a VDP threshold or a VOC. In one respect, the VOC indicator 1034 includes an outlined flag (e.g., a white flag outlined in red) and the VOC indicator 1035 includes a solid flag (e.g. a red flag). An outlined flag can be displayed to indicate that a VDP threshold is armed, but that the VDP values received for the VDP have not yet breached the VDP threshold. A solid flag can be displayed to indicate that a VDP value received for the VDP has breached an associated VDP threshold that was armed. Arming a VDP threshold can occur by selecting the VDP for display, by selecting a VDP threshold for a VDP, or by another manner. Upon arming a VDP threshold, the processor 402 can compare the VDP the VST receives to determine if the VDP is associated with the VDP threshold and whether it breaches the VDP threshold.

In another respect, the VOC indicator 1037 (e.g., a white flag) can indicate that a VDP high threshold has been breached, whereas the VOC indicator 1036 (e.g., a gray shaded flag) can indicate that a VDP low threshold has been breached. In yet another respect, if VDP thresholds have been set up and armed for multiple VDP, then a VOC indicator for each VDP can be associated with a respective color or respective shading to distinguish the VOC indicators for each of the multiple VDP. Other colors, visual representations, and configurations are possible.

Figure 23:
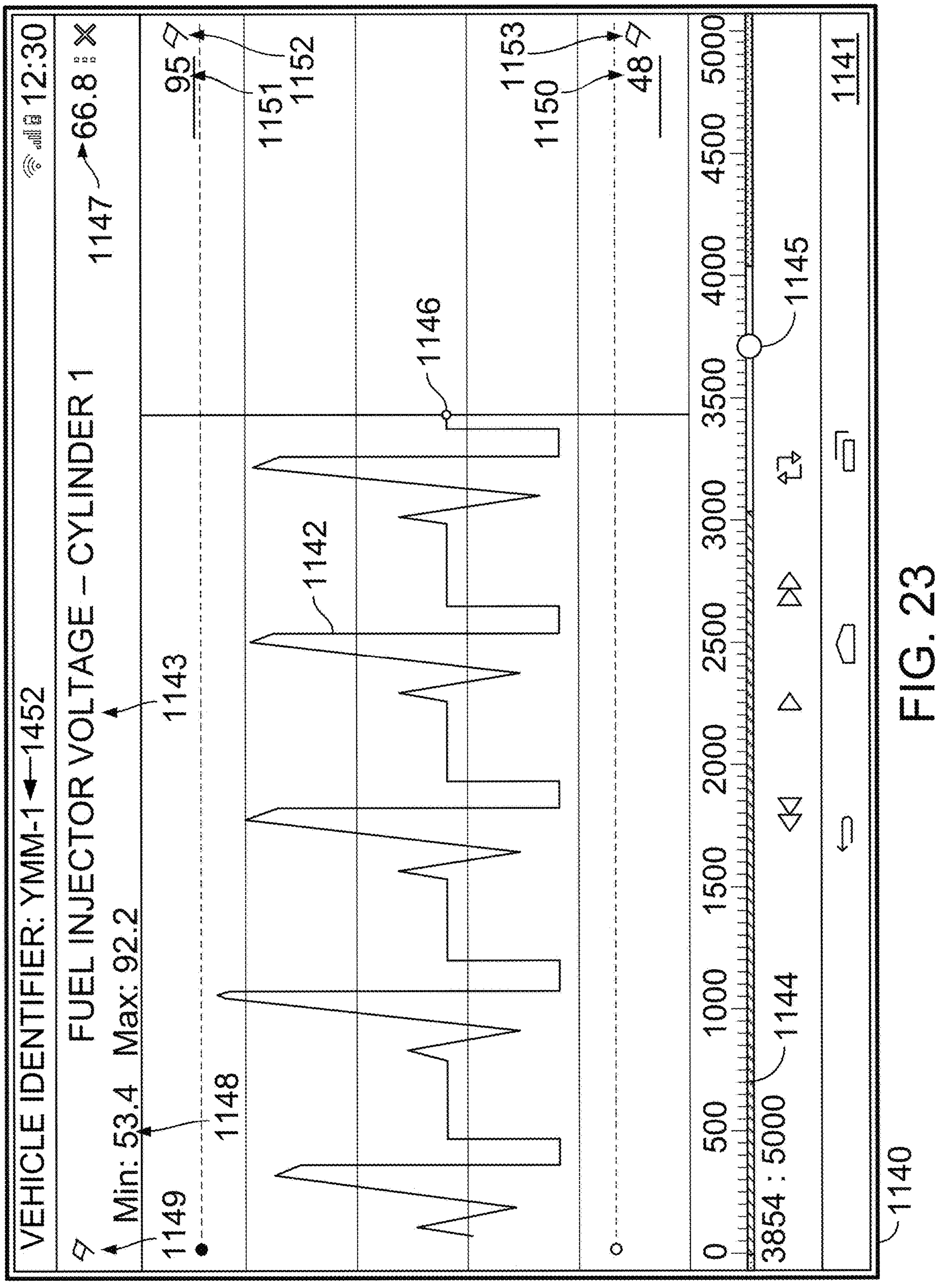
FIG. 23 is another diagram depicting a display presentation, according to one or more example embodiments.

Next, FIG. 23 shows a user interface 1140 that can be provided on the user interface 406 of the computing system 102. The user interface 1140 includes a VDP graph window 1141 with a VDP line graph 1142 for a VDP corresponding to the parameter identifier 1143. As such, the VDP graph window 1141 includes the time-based indicator 1144, the cursor positioner 1145, and the cursor 1146, and further includes a digital VDP value 1147 that indicates a value of the VDP at the cursor 1146. The VDP graph window 1141 includes thresholds that represent minimum and maximum values 1148 of the VDP displayed in the VDP line graph 1142 or of the VDP stored in the VDP for the VDP identified by the parameter identifier 1143.

The VDP graph window 1141 includes a threshold arm status icon 1149. The threshold arm status icon 1149 can include an empty flag icon (e.g., VOC indicator 1034 shown in FIG. 22) when a threshold for the VDP indicated by the parameter identifier 1143 is not armed. In accordance with at least some embodiments, the processor 402 cannot or does not compare data values of the received VDP to a VDP threshold when the threshold is not armed. The VDP graph window 1141 includes a lower threshold indicator 1150 that indicates a numeric value of the lower threshold of the VDP displayed in the VDP graph window 1141.

The VDP graph window 1141 includes an upper threshold indicator 1151 that indicates a numeric value of the upper threshold of the VDP displayed in the VDP graph window 1141. The VDP graph window 1141 includes a VOC indicator 1152 associated with the upper threshold of the VDP and a VOC indicator 1153 associated with the lower threshold of the VDP. Any one or more other VDP graph windows described herein can include one or more of the elements included within the user interface 1140.

VI. Example Vehicle

A vehicle is a mobile machine that can be used to transport a person, people, and/or cargo. A vehicle can be driven and/or otherwise guided along a path (e.g., a paved road or otherwise) on land, in water, in the air, and/or outer space. A vehicle can be wheeled, tracked, railed, and/or skied. A vehicle can include an automobile, a motorcycle (e.g., a two or three wheel motorcycle), an all-terrain vehicle (ATV) defined by ANSI/SVIA-1-2007, a snowmobile, a watercraft (e.g., a JET SKI® watercraft), a light-duty truck, a medium-duty truck, a heavy-duty truck, a semi-tractor, a drone, and/or a farm machine. A vehicle can include and/or use any appropriate voltage and/or current source, such as a battery, an alternator, a fuel cell, and the like, providing any appropriate current and/or voltage, such as about 12 volts, about 42 volts, 400 volts, 800 volts, or some other voltage level. A vehicle can include and/or use any system and/or engine to provide its mobility. Those systems and/or engines can include vehicle components that use fossil fuels, such as gasoline, diesel fuel, natural gas, propane, and the like, electricity, such as that generated by a battery, magneto, fuel cell, solar cell and the like, wind and hybrids and/or combinations thereof. A vehicle can include an electronic control unit (ECU), an OBDC, and a vehicle network that connects the OBDC to the ECU. A vehicle can be operable to operate as an autonomous vehicle.

A vehicle manufacturer can build various quantities of vehicles each calendar year (i.e., January $1^{st}$ to December $31^{st}$). In some instances, a vehicle manufacturer defines a model year for a particular vehicle model to be built. The model year can start on a date other than January $1^{st}$ and/or can end on a date other than December $31^{st}$. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a particular vehicle model with different vehicle options. For example, the particular vehicle model can include vehicles with six-cylinder engines and vehicles with eight-cylinder engines. The vehicle manufacturer or another entity can define vehicle identifying information for each vehicle built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can comprise indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name, or more simply "model"), and features of the vehicle (e.g., an engine type). In accordance with that example, the particular vehicle identifying information can be referred to by an abbreviation YMMEF, where each letter in the order shown represents a model year identifier, vehicle make identifier, vehicle model name identifier, engine type identifier, and fuel type identifier, respectively, or YMMF, where each letter in the order shown represents a model year identifier, vehicle make identifier, vehicle model name identifier, and fuel type identifier, respectively, or YMME, where each letter in the order shown represents a model year identifier, vehicle make identifier, vehicle model name identifier, and engine type identifier, respectively, or an abbreviation YMM, where each letter in the order shown represents a model year identifier, vehicle make identifier, and vehicle model name identifier, respectively. As yet another example, any of the aforementioned forms of vehicle identifiers can include information regarding a market such that the vehicle identifiers take the form of YMMM, YMMFM, YMMEM, or YMMEFM, where the last "M" represents a market. The marked for example, could be the United States market, the United Kingdom market, the German market, the Canadian market or the market of some other country or region. Other aspects of a vehicle, such as an engine displacement of internal combustion engines, or sub-models designators, can also be represented with the vehicle identifying information.

An example YMME is 2024/Toyota/Camry/4Cyl, in which "2024" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine) within the vehicle. Another example YMME is 2016/Freightliner/Cascadia/Cummins ISX15 EPA, in which "2016" represents the model year the vehicle was built, "Freightliner" represents the name of the vehicle manufacturer Daimler Trucks North America, Cleveland, North Carolina, "Cascadia" represents a vehicle model built by that manufacturer, and "Cummins ISX15 EPA" represents an engine manufacturer and model within the vehicle. An example YMM is 2016/Freightliner/Cascadia. An example YM is 2016/Freightliner. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Michigan.

In some cases, different types of vehicles (e.g., vehicles with different YMM, YMMM, YMME, YMMEM, YMMF, YMMFM, YMMEF, or YMMEFM combinations) are part of a vehicle leveraging group. As an example, a vehicle leveraging group can be defined for three different YMM combinations based on different years (e.g., 2023 MM, 2022 MM, and 2021 MM), wherein the make and model name does not change. The leveraging group can be useful because any vehicle within the leveraging group can have a common set of vehicle data messages available to communicate with an off-board computing system. Accordingly, any vehicle within the leveraging group can perform the same functional tests and reset procedures, and be configured to respond to a common set of vehicle data messages.

Some vehicles, such as automobiles, are associated with a unique VIN. Some VINs include seventeen alpha-numeric characters. For at least some seventeen character VINs, the last six characters represent a unique serial number associated with a particular type of vehicle represented by the first eleven alpha-numeric characters of those VINs. The first eleven alpha-numeric characters typically represent at least a YMME or a YMM. In some instances, a vehicle includes a one dimensional or multi-dimensional bar code indicative of a VIN associated with that vehicle.

A vehicle network (e.g., the vehicle network link 128 shown in FIG. 1 or any other vehicle network discussed in this description) can include one or more conductors (e.g., copper wire conductors) and/or can be wireless. As an example, a vehicle network can include one or two conductors for carrying vehicle data messages in accordance with a vehicle data message (VDM) protocol, such as a bi-directional VDM protocol. A bi-directional VDM protocol can include a SAE® J1850 (PWM or VPW) VDM protocol, an SAER J1939 VDM protocol based on the SAE® J1939_201808 serial control and communications heavy duty vehicle network-top level document, and/or any other core J1939 standard, an ISO® 15764-4 controller area network (CAN) VDM protocol, an ISO® 9141-2 K-Line VDM protocol, an ISO® 14230-4 KWP2000 K-Line VDM protocol, an ISO® 17458 (e.g., parts 1-5) FlexRay VDM protocol, an ISO® 17987 local interconnect network (LIN) VDM protocol, a CAN 2.0 VDM protocol, standardized in part using an ISO® 11898-1:2015 road vehicle-CAN-Part I: data link layer and physical signaling protocol, a CAN FD VDM protocol (e.g., CAN with flexible data rate VDM protocol), a MOST® Cooperation VDM protocol (such as the MOST Specification Rev. 3.0 E2, or the MOST® Dynamic Specification, Rev. 3.0.2), an Ethernet VDM protocol (e.g., an Ethernet 802.3 protocol using a BROADR-REACH® physical layer transceiver specification for Automotive Applications by Broadcom Inc., San Jose, California), or some other VDM protocol defined for performing communications with or within the vehicle 108. The aforementioned protocols can include definition for at least physical and data link layers of the seven layer Open Systems Interconnection (OSI) model. Each and every VDM discussed in this description is arranged according to a VDM protocol.

In at least some embodiments, a VDM protocol works in conjunction a Unified Diagnostic Services (UDS) protocol, such as the ISO® 14229-1:2020 standard for Road vehicles—UDS—Part 1: application layer, the ISO® 14229-2 standard for Road vehicles—unified diagnostic services, session layer services, or ISO® 14229-3:2022 standard for Road Vehicles—UDS on CAN embodiment (UDSonCAN). A VDM sent on a CAN vehicle bus according the UDS protocol can include a CAN message identifier, a protocol control information filed, a service identifier (SID), and data parameter value requests. Table H shows example SIDs sent to a ECU from a VST and example SIDs sent in response to the VST from the ECU.

TABLE H

| Request SID | Service | Response SID |
|---|---|---|
| $10 | Diagnostic session control | $50 |
| $11 | ECU reset | $51 |
| $14 | Clear DTC | $54 |
| $19 | Read DTC | $59 |
| $22 | Read data by identifier | $62 |
| $23 | Read memory by address | $63 |
| $24 | Read scaling data by identifier | $64 |
| $27 | Security access | $67 |
| $28 | Communication control | $68 |
| $29 | Authentication | $69 |
| $2A | Read data by identifier periodically | $6A |
| $2C | Dynamically define data identifier | $6C |
| $2E | Write data by identifier | $6E |
| $2F | Input Output Control by identifier | $6F |
| $31 | Routine control | $71 |
| $34 | Request download | $74 |
| $35 | Request upload | $75 |
| $36 | Transfer data | $76 |
| $37 | Request transfer exit | $77 |
| $38 | Request file transfer | $78 |
| $3D | Write memory by address | $7D |
| $3E | Tester present | $7E |
| $83 | Access timing parameters | $C3 |
| $84 | Secured data transmission | $C4 |
| $85 | Control DTC settings | $C5 |
| $86 | Response on event | $C6 |
| $87 | Link control | $C7 |

As an example, the processor 402 can transmit a VDM with a SID $2A to request an ECU to transmit VDMs with PID parameter data periodically. Moreover, the processor 402 can include a data rate, such as slow, medium, or fast to set a transmission rate for the ECU, or a data rate of stop to end the periodic transmission of PID parameter data from the ECU for the requested PID.

As another example, the processor 402 can transmit a VDM with a SID $2F to request the ECU to perform a functional test or a reset procedure. In other words, the computing system 102 and/or the processor 402 can gain control over an analog or digital input or output of the ECU by sending a VDM with the SID $2F.

As yet another example, the processor 402 can transmit a VDM with a SID $22 to request a PID parameter value from an ECU, a SID $14 to clear DTCs, or a SID $19 to read DTCs.

Table I shows an example VDM stream from a vehicle including, in row 5, a VDM with a functional request to clear DTCs in the vehicle. The time stamps and VDMs shown in Table I are shown as hexadecimal numbers. The hexadecimal data E4 00 in row 5 is a target address for the functional request 14 FF FF FF within row 5. That functional request is an example of a request to clear DTCs in the vehicle according to the UDS protocol.

TABLE I

| Time stamps | Vehicle data messages | Row |
|---|---|---|
| 0000 | A2 CC DF 1F 74 84 16 55 72 04 50 B23 08 00 45 00 | 1 |
| 0010 | 00 38 36 A3 40 00 80 06 EC 6C C0 A8 AB 1E C0 A8 | 2 |
| 0020 | AB 40 F1 34 34 58 3D 97 D6 FF 0D 6A 87 7F 50 18 | 3 |
| 0030 | FA BE 83 B9 00 00 02 FD 80 01 00 00 0 08 0E 80 | 4 |
| 0040 | E4 00 14 FF FF FF | 5 |

Table J shows an example VDM stream from a vehicle including, in row 5, a VDM with a physical request to clear DTCs in the vehicle. The time stamps and VDMs shown in Table J are shown as hexadecimal numbers. The hexadecimal data 17 C3 in row 5 is a target address for the functional request 14 FF FF FF within row 5. The target address corresponds to a particular ECU within the vehicle. The functional request is an example of a request to clear DTCs in the vehicle according to the UDS protocol. The vehicle discussed with respect to Table I and Table J can be the same vehicle.

TABLE J

| Time stamps | Vehicle data messages | Row |
|---|---|---|
| 0000 | A2 CC DF 1F 74 84 16 55 72 04 50 B2 08 00 45 00 | 1 |
| 0010 | 00 38 36 B0 40 00 80 06 EC 5F C0 A8 AB 1E C0 A8 | 2 |
| 0020 | AB 40 F1 34 34 58 3D 97 D7 0F 0D 6A 89 F3 50 18 | 3 |
| 0030 | F8 4A 4F E7 00 00 02 FD 80 01 00 00 00 08 0E 80 | 4 |
| 0040 | 17 C3 14 FF FF FF | 5 |

Table K shows an example VDM stream from a vehicle including, in row 1, a VDM with a functional addressing target IF FF and a request 19 20 02 to read DTCs in the vehicle. The time stamps and VDMs shown in Table K are shown as hexadecimal numbers. Responses to the request within the VDM in row 1 are shown in rows 2 to 37. Positive responses are indicated by the data 59 02 FF with no DTCs present. Negative responses, indicating the request within the VDM in row 1 cannot be performed, are indicated by the data 7F in rows 25, 32, 33, 34.

TABLE K

| Time stamps | Vehicle data messages | Row |
|---|---|---|
| 00000B0A | 02 FD 80 01 00 00 00 07 0E 80 1F FF 19 02 20 | 1 |
| 00005637 | 02 FD 80 02 00 00 00 05 1F FF 0E 80 00 | 2 |
| 00005464 | 02 FD 80 01 00 00 00 07 12 12 0E 80 59 02 FF | 3 |
| 00005653 | 02 FD 80 01 00 00 00 07 10 01 0E 80 59 02 FF | 4 |
| 00005662 | 02 FD 80 01 00 00 00 07 12 01 0E 80 59 02 FF | 5 |
| 00005671 | 02 FD 80 01 00 00 00 07 1A 01 0E 80 59 02 FF | 6 |
| 00005680 | 02 FD 80 01 00 00 00 07 16 02 0E 80 59 02 FF | 7 |
| 0000568F | 02 FD 80 01 00 00 00 07 14 33 0E 80 59 02 FF | 8 |
| 0000569E | 02 FD 80 01 00 00 00 07 1A 13 0E 80 59 02 FF | 9 |
| 000056AD | 02 FD 80 01 00 00 00 07 16 3A 0E 80 59 02 7F | 10 |
| 000056BC | 02 FD 80 01 00 00 00 07 1A 12 0E 80 59 02 FF | 11 |
| 000056CB | 02 FD 80 01 00 00 00 07 16 32 0E 80 59 02 FF | 12 |
| 000056DA | 02 FD 80 01 00 00 00 07 14 17 0E 80 59 02 FF | 13 |
| 000056E9 | 02 FD 80 01 00 00 00 07 1A 1A 0E 80 59 02 FF | 14 |
| 000056F8 | 02 FD 80 01 00 00 00 07 14 01 0E 80 59 02 FF | 15 |
| 00005707 | 02 FD 80 01 00 00 00 07 14 31 0E 80 59 02 FF | 16 |
| 00005716 | 02 FD 80 01 00 00 00 07 16 37 0E 80 59 02 FF | 17 |
| 00005725 | 02 FD 80 01 00 00 00 07 16 33 0E 80 59 02 7F | 18 |
| 00005734 | 02 FD 80 01 00 00 00 07 16 16 0E 80 59 02 FF | 19 |
| 00005743 | 02 FD 80 01 00 00 00 07 14 32 0E 80 59 02 FF | 20 |
| 00005752 | 02 FD 80 01 00 00 00 07 16 30 0E 80 59 02 FF | 21 |
| 00005761 | 02 FD 80 01 00 00 00 07 14 16 0E 80 59 02 FF | 22 |
| 00005770 | 02 FD 80 01 00 00 00 07 1B B3 0E 80 59 02 FF | 23 |
| 0000577F | 02 FD 80 01 00 00 00 07 16 12 0E 80 59 02 FF | 24 |
| 0000578E | 02 FD 80 01 00 00 00 07 12 41 0E 80 7F 19 11 | 25 |
| 0000579D | 02 FD 80 01 00 00 00 07 16 36 0E 80 59 02 FF | 26 |
| 000057AC | 02 FD 80 01 00 00 00 07 1A 14 0E 80 59 02 FF | 27 |
| 000057BB | 02 FD 80 01 00 00 00 07 16 34 0E 80 59 02 FF | 28 |
| 000057CA | 02 FD 80 01 00 00 00 07 1B B4 0E 80 59 02 FF | 29 |
| 000057D9 | 02 FD 80 01 00 00 00 07 16 35 0E 80 59 02 FF | 30 |
| 000057E8 | 02 FD 80 01 00 00 00 07 1A 11 0E 80 59 02 FF | 31 |
| 000057F7 | 02 FD 80 01 00 00 00 07 1C 01 0E 80 7F 19 78 | 32 |
| 00005806 | 02 FD 80 01 00 00 00 07 16 3C 0E 80 7F 19 78 | 33 |
| 00005815 | 02 FD 80 01 00 00 00 07 16 A1 0E 80 7F 19 78 | 34 |
| 00005824 | 02 FD 80 01 00 00 00 07 1C 01 0E 80 59 02 FF | 35 |
| 00005833 | 02 FD 80 01 00 00 00 07 16 3C 0E 80 59 02 FF | 36 |
| 00005842 | 02 FD 80 01 00 00 00 07 16 A1 0E 80 59 02 FF | 37 |

In at least some embodiments, a VDM protocol can be unidirectional instead of bidirectional. For example, a SENT VDM protocol (e.g., a single-edge nibble transmission VDM protocol) is a unidirectional VDM protocol. The SENT VDM protocol has been standardized as the SAE J2716 VDM protocol. A sensor in a vehicle can include a transmitter operable to communicate using the SENT VDM protocol (e.g., a SENT VDM transmitter). A vehicle communication bus can operatively connect the SENT VDM transmitter and an ECU within the vehicle. The vehicle communication transceiver 405 can include a SENT VDM receiver connectable to the vehicle communication bus operatively connected to the SENT VDM transmitter. The SENT VDM receiver can receive SENT VDM protocol messages representing sensor values output by the sensor with the SENT VDM transmitter.

An OBDC, such as the OBDC 118 can include an on-board diagnostic (OBD) connector, such as an OBD II connector. An OBD II connector can include slots for retaining up to sixteen connector terminals, but can include a different number of slots or no slots at all. As an example, an OBDC can include an OBD II connector that meets the SAE J1962 specification such as a connector 16M, part number 12110252, available from Aptiv LLC of Dublin, Ireland. An OBDC can include conductor terminals that connect to a conductor in a vehicle. For instance, an OBDC can include connector terminals that connect to conductors that respectively connect to positive and negative terminals of a battery or battery pack. An OBDC can include one or more conductor terminals that connect to a conductor of a vehicle communication bus such that the OBDC is operatively connected to one or more ECUs. A computing system, such as the computing system 102 can operatively connect to an OBDC in order to receive a VDM from the vehicle including that OBDC. A VDM can carry VDM data. The VDM data can include a PID and parameter values associated with the PID. The VDM data can include a DTC. An operative connection between the OBDC and the computing system 102 can occur via the arrangement 122, 124, 126 shown in FIG. 2 or via some other arrangement. A PID can be associated with one or more thresholds. A threshold corresponding to a PID can be dependent upon an operating condition of the vehicle 108. A VDM can be transmitted over a physical communication link, such as a copper wire or an optical cable, or using radio signals over an air interface. In many embodiments, the PID and parameter value are transmitted as binary data. A processor can parse a received VDM to recover a binary representation of a PID and parameter value. The processor can translate the binary representation of a PID and parameter value into a textual a PID and parameter value displayable on a display device.

An ECU can control various aspects of vehicle operation and/or components within a vehicle system. For example, an ECU can include a powertrain (PT) system ECU, an engine control module (ECM) ECU, a supplemental inflatable restraint (SIR) system (e.g., an air bag system) ECU, an entertainment system ECU, or some other ECU. An ECU can receive an electrical or optical input from an ECU-connected input device (e.g., a sensor input), control an ECU-connected output device (e.g., a solenoid) via an electrical or optical signal output by the ECU, generate a vehicle data message (VDM) (such as a VDM based on a received input or a controlled output), and set a DTC to a state (such as active or history). An ECU can perform a functional test in response to receiving a VDM requesting performance of the functional test. The functional test can be used to test an ECU-connected output device. In at least some embodiments, the ECU is operable to perform the functional test and/or provide the DTC in accordance with an industry standard, such as the SAE J1979_201202 and/or ISO 15031-5 standards for E/E diagnostic test modes.

VII. Conclusion

Example embodiments have been described above. Those skilled in the art will understand that changes and modifications can be made to the described embodiments without departing from the true scope and spirit of the present invention, which is defined by the claims.

It should be understood that the arrangements described herein and/or shown in the drawings are for purposes of example only. As such, those skilled in the art will appreciate that other arrangements and elements (e.g., machines, interfaces, functions, orders, and/or groupings of functions) can be used instead, and some elements can be omitted altogether according to the desired results. Furthermore, various functions described and/or shown in the drawings as being performed by one or more elements can be carried out by a processor executing computer-readable program instructions or by a combination of hardware, firmware, and/or software. For purposes of this description, execution of CRPI contained in some computer-readable memory to perform some function can include executing all of the program instructions of those CRPI or only a portion of those CRPI.

The term "data" within this description can be used interchangeably with the term "information" or similar terms, such as "content." The data described herein can be transmitted and received. As an example, any transmission of the data described herein can occur directly from a transmitting device (e.g., a transmitter) to a receiving device (e.g., a receiver). As another example, any transmission of the data described herein can occur indirectly from the transmitter to a receiver via one of one or more intermediary network devices, such as an access point, an antenna, a base station, a hub, a modem, a relay, a router, a switch, or some other network device. The transmission of any of the data described herein can include transmitting the data over an air interface (e.g., using radio signals (i.e., wirelessly)). The transmission of any of the data described herein can include transmitting the data over a wire (e.g., a single wire, a twisted pair of wires, a fiber optic cable, a coaxial cable, a wiring harness, a power line, a printed circuit, a CAT5 cable, or CAT6 cable). The wire can be referred to as a "conductor" or by another term. As an example, transmission of the data over the conductor can occur electrically or optically.

The data can represent various things such as objects and conditions. The objects and conditions can be mapped to a data structure (e.g., a table). A processor can refer to the data structure to determine what object or condition is represented by the data. As an example, the data received by a processor can represent a calendar date. The processor can determine the calendar date by comparing the data to a data structure that defines calendar dates. As another example, data received by a processor can represent a vehicle component. The processor can determine what type of vehicle component is represented by the data by comparing the data to a structure that defines a variety of vehicle components.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing particular embodiments only, and is not intended to be limiting.

In this description, the articles "a," "an," and "the" are used to introduce elements and/or functions of the example embodiments. The intent of using those articles is that there is one or more of the introduced elements and/or functions. The intent of using the conjunction "or" within a described list of at least two terms is to indicate any one of the listed terms or any combination of two or more of the listed terms.

In this description, the intent of using the term "and/or" within a list of at least two elements or functions and the intent of using the terms "at least one of" and "one or more of" immediately preceding a list of at least two components or functions is to cover each embodiment including a listed component or function independently and each embodiment comprising a combination of the listed components or functions. For example, an embodiment described as comprising "A, B, and/or C," or "at least one of A, B, and C," or "one or more of A, B, and C" is intended to cover each of the following possible embodiments: (i) an embodiment comprising A, but not B and not C, (ii) an embodiment comprising B, but not A and not C, (iii) an embodiment comprising C, but not A and not B, (iv) an embodiment comprising A and B, but not C, (v) an embodiment comprising A and C, but not B, (v) an embodiment comprising B and C, but not A, and (vi) an embodiment comprising A, B, and C. For the embodiments comprising component or function A, the embodiments can comprise one A or multiple A. For the embodiments comprising component or function B, the embodiments can comprise one B or multiple B. For the embodiments comprising component or function C, the embodiments can comprise one C or multiple C.

The use of ordinal numbers such as "first," "second," "third" and so on is to distinguish respective elements rather than to denote a particular order of those elements unless the context of using those terms explicitly indicates otherwise. The use of the symbol "$" as prefix to a number indicates the number is a hexadecimal number.

Embodiments of the present disclosure can thus relate to one of the enumerated example embodiments (EEEs) listed below.

EEE 1 is a method comprising: providing, on a user interface via a computing system, a first USC that corresponds to a first predetermined group of ECUs, wherein the first predetermined group of ECUs includes a first subset of ECUs located in a vehicle and the first subset of ECUs includes multiple ECUs; receiving, at the computing system, a selection of the first USC; and transmitting, by the computing system and to the vehicle in response to the selection of the first USC, one or more first vehicle data messages with a DTC request to the first predetermined group of ECUs, wherein the DTC request includes a request to clear one or more DTCs in the first predetermined group of ECUs or a request to respond with a status of one or more DTCs being set in the first predetermined group of ECUs.

EEE 2 is the method of EEE 1, further comprising: providing, on the user interface via the computing system, a second USC that corresponds to a second predetermined group of ECUs, wherein the second predetermined group of ECUs includes a second subset of ECUs located in the vehicle.

EEE 3 is the method of EEE 2, wherein the first predetermined group of ECUs are connected to a first data bus within the vehicle and the second predetermined group of ECUs are connected to a second data bus within the vehicle, and wherein the first data bus is configured to carry vehicle data messages according to a first communication protocol, and the second data bus is configured to carry vehicle data messages according to a second communication protocol different than the first communication protocol.

EEE 4 is the method of EEE 2, wherein the first predetermined group of ECUs are connected to a first interface of a communication gateway in the vehicle and the second predetermined group of ECUs are connected to a second interface of a communication gateway different than the first interface.

EEE 5 is the method of EEE 4, wherein the first interface and the second interface includes interfaces selected from among: a local interconnect network (LIN) interface, a controller area network (CAN) interface, a 100BASE-T1 interface, a 1000BASE-T/2.5GBase-T interface, a 100BASE-TX interface, a 1000BASE-T interface, a FlexRay interface, a universal serial bus (USB) interface, a peripheral component interconnect express (PCIe) interface, a joint test action group (JTAG) interface, a universal asynchronous receiver-transmitter (UART) interface, an aurora interface, or an M.2 interface.

EEE 6 is the method of EEE 2, wherein the first predetermined group of ECUs are connected to a first zonal controller in the vehicle and the second predetermined group of ECUs are connected to a second zonal controller.

EEE 7 is the method of EEE 6, wherein the first zonal controller corresponds to a safety component zone comprising one or more safety components and the second zonal controller corresponds to a system zone.

EEE 8 is the method of EEE 2, wherein the first predetermined group of ECUs correspond to a first system of the vehicle and the second predetermined group of electronic units correspond to a second system of the vehicle different than the first system.

EEE 9 is the method of any one of EEEs 2 to 8, further comprising: receiving a selection of the second USC; and transmitting, to the vehicle in response to the selection of the second USC, one or more third vehicle data messages with a second DTC request to the second predetermined group of ECUs, wherein the second DTC request includes a second request to clear one or more DTCs in the second predetermined group of ECUs or a second request to respond with a status of one or more DTCs being set in the second predetermined group of ECUs.

EEE 10 is the method of any one of EEEs 2 to 9, further comprising: receiving selections of both the first USC and the second USC; and transmitting, to the vehicle in response to the selections of both the first USC and the second user-selection control, a plurality of vehicle data messages, wherein the plurality of vehicle data messages includes at least the first DTC request for the first predetermined group of ECUs and a second DTC request for the second predetermined group of ECUs.

EEE 11 is the method of EEE 10, wherein the plurality of vehicle data messages comprises: at least a first physical message to one or more ECUs in the first predetermined group of ECUs or the second predetermined group of ECUs; and at least a first broadcast message to one or more ECUs in the first predetermined group of ECUs or the second predetermined group of ECUs.

EEE 12 is the method of any one of EEEs 1 to 11, wherein transmitting the one or more first vehicle data messages comprises: transmitting a physical message to each address corresponding to an electronic control unit in the first predetermined group of ECUs.

EEE 13 is the method of any one of EEEs 1 to 12, wherein transmitting the one or more first vehicle data messages comprises: transmitting a broadcast message that is received by all ECUs in the first predetermined group of ECUs.

EEE 14 is the method of any one of EEEs 1 to 13, further comprising: displaying a configure option that enables selection of multiple ECUs to form the first predetermined group of ECUs; and receiving respective selections of ECUs in the first subset of ECUs to form the first predetermined group of ECUs.

EEE 15 is the method of any one of EEEs 1 to 14, wherein providing the first USC that corresponds to the first predetermined group of ECUs comprises: providing a plurality of USCs, each USC corresponding to a different group of ECUs in the vehicle, wherein the plurality of USCs includes the first USC.

EEE 16 is the method of any one of EEEs 1 to 15, further comprising: determining, at the computing system, vehicle identifying information associated with a group of vehicles including the vehicle; determining, at the computing system, the first predetermined group of ECUs based on the vehicle identifying information; and writing data into a non-transitory computer-readable memory that indicates the first USC corresponds to the first predetermined group of ECUs.

EEE 17 is the method of any one of EEEs 1 to 16, further comprising: determining, at the computing system, vehicle identifying information associated with a group of vehicles including the vehicle; and determining, at the computing system, a set of USCs based on the vehicle identifying information, wherein the set of USCs include the first USC, and wherein providing the first USC occurs by displaying the set of USCs on the graphical user interface.

EEE 18 is the method of any one of EEEs 1 to 17, wherein when the DTC request includes the request to respond with a status of one or more DTCs being set in the first predetermined group of ECUs, the method further comprises: receiving, at the computing system and from the vehicle in response to transmitting the one or more first vehicle data messages, one or more second vehicle data messages including data indicating whether the first predetermined group of ECUs have set any DTC.

EEE 19 is the method of any one of EEEs 1 to 18, further comprising: transmitting, to the vehicle in response to the selection of the first USC, a security key to the first predetermined group of electronic units; receiving, from the vehicle, a response to the security key; and wherein transmitting one or more first vehicle data messages with the DTC request to the first predetermined group of ECUs comprises: transmitting the one or more first vehicle data messages in response to the response to the security key.

EEE 20 is the method of any one of EEEs 1 to 19, further comprising: transmitting, to the vehicle, instructions to switch to a diagnostic mode to the first predetermined group of electronic units; and wherein transmitting one or more first vehicle data messages with the DTC request to the first predetermined group of ECUs comprises: transmitting the one or more first vehicle data messages subsequent to transmitting the instructions to switch to the diagnostic mode to the first predetermined group of electronic units.

EEE 21 is the method of any one of EEEs 1 to 20, further comprising: selecting a protocol for transmission of vehicle data messages to the vehicle.

EEE 22 is the method of any one of EEEs 1 to 21, further comprising: determining, at the computing system, vehicle identifying information associated with a group of vehicles including the vehicle; identifying a list of commonly replaced parts based on the vehicle identifying information;

determining, at the computing system, the first predetermined group of ECUs based on the list of common replaced parts; and writing data into a non-transitory computer-readable memory that indicates the first USC corresponds to the first predetermined group of ECUs.

EEE 23 is the method of any one of EEEs 1 to 22, wherein providing the first USC that corresponds to the first predetermined group of ECUs includes displaying the first USC on a graphical user interface.

EEE 24 is the method of any one of EEEs 1 to 22, wherein providing the first USC that corresponds to the first predetermined group of ECUs includes associating a first hardware key on the user interface with the first predetermined group of ECUs and with program instructions executable by a processor to transmit the one or more first vehicle data messages with the DTC request to the first predetermined group of ECUs.

EEE 25 is the method of EEE 24, further comprising: displaying, on a graphical user interface, an icon adjacent the first hardware key, wherein the icon is indicative of the first predetermined group of ECUs.

EEE 26 is the method of any one of EEEs 2 to 22, wherein providing the second USC that corresponds to the second predetermined group of ECUs includes displaying the second USC on a graphical user interface.

EEE 27 is the method of any one of EEEs 2 to 22, wherein providing the second USC that corresponds to the second predetermined group of ECUs includes associating a second hardware key on the user interface with the second predetermined group of ECUs.

EEE 28 is the method of EEE 27, wherein providing the second USC that corresponds to the second predetermined group of ECUs further includes associating the second hardware key with program instructions executable by a processor to transmit the one or more second vehicle data messages with the DTC request to the second predetermined group of ECUs.

EEE 29 is the method of EEE 27, further comprising: displaying, on a graphical user interface, an icon adjacent the second hardware key, wherein the icon is indicative of the second predetermined group of ECUs.

EEE 30 is the method of any one of EEEs 1-29, further comprising: receiving at the computing system, a selection of one or more USCs selectable to prevent the computing system from transmitting a particular VDM to the vehicle.

EEE 31 is the method of EEE 30, wherein the particular VDM includes a VDM requesting an ECU within the vehicle to clear a DTC.

EEE 32 is the method of any one of EEE 30-31, wherein selection of one or more USCs selectable to prevent the computing system from transmitting a particular VDM to the vehicle is effective for a predetermined amount of time.

EEE 33 is the method of EEE 32, further comprising: outputting an alert that the predefined amount of time has expired or is about to expire; and outputting a second USC that selectable to extend an amount of time to prevent the computing system from transmitting the particular VDM to the vehicle.

EEE 34 is the method of any one of EEE 30-31, wherein selection of one or more USCs selectable to prevent the computing system from transmitting a particular VDM to the vehicle is effective until a vehicle identifier for a different vehicle is entered into the computing system.

EEE 35 is a vehicle scan tool comprising: a user interface; and a processor configured to: provide, on the user interface, a first USC that corresponds to a first predetermined group of ECUs, wherein the first predetermined group of ECUs includes a first subset of ECUs located in a vehicle and the first subset of ECUs includes multiple ECUs; receive a selection of the first USC; and transmit, to the vehicle in response to the selection of the first USC, one or more first vehicle data messages with a DTC request to the first predetermined group of ECUs, wherein the DTC request includes a request to clear one or more DTCs in the first predetermined group of ECUs or a request to respond with a status of one or more DTCs being set in the first predetermined group of ECUs.

EEE 36 is a computing system comprising: a processor; and a non-transitory computer-readable memory storing executable instructions to perform the method of any one of EEEs 1 to 34.

EEE 37 is a non-transitory computer-readable memory is configured to store instructions, that when executed by a computing system comprising one or more processors, causes the computing system to perform operations comprises: providing, on a user interface, a first USC that corresponds to a first predetermined group of ECUs, wherein the first predetermined group of ECUs includes a first subset of ECUs located in a vehicle and the first subset of ECUs includes multiple ECUs; receiving a selection of the first USC; and transmitting, to the vehicle in response to the selection of the first USC, one or more first vehicle data messages with a DTC request to the first predetermined group of ECUs, wherein the DTC request includes a request to clear one or more DTCs in the first predetermined group of ECUs or a request to respond with a status of one or more DTCs being set in the first predetermined group of ECUs.

EEE 38 is a non-transitory computer-readable memory having stored therein instructions executable by a processor to cause a computing system to perform the method of any one of EEEs 1 to 34.

What is claimed is:

1. A method comprising:

providing, on a user interface via a computing system configured as a vehicle scan tool, a first user-selectable control labeled to identify a vehicle system, wherein the first user-selectable control corresponds to a first predetermined group of electronic control units, wherein the first predetermined group of electronic control units includes a first subset of electronic control units located in a vehicle and the first subset of electronic control units includes multiple electronic control units associated with the vehicle system identified by the label;

receiving, at the computing system, a selection of the first user-selectable control; and transmitting, by the computing system and to the vehicle in response to the selection of the first user-selectable control, one or more first vehicle data messages with a diagnostic trouble code request to the first predetermined group of electronic control units, wherein the diagnostic trouble code request includes a request to clear one or more diagnostic trouble codes in the first predetermined group of electronic control units or a request to respond with a status of one or more diagnostic trouble codes being set in the first predetermined group of electronic control units.

2. The method of claim 1, further comprising:

providing, on the user interface via the computing system, a second user-selectable control that corresponds to a second predetermined group of electronic control units, wherein the second predetermined group of electronic control units includes a second subset of electronic control units located in the vehicle.

3. The method of claim 2, wherein the first predetermined group of electronic control units are connected to a first data bus within the vehicle and the second predetermined group of electronic control units are connected to a second data bus within the vehicle, and wherein the first data bus is configured to carry vehicle data messages according to a first communication protocol, and the second data bus is configured to carry vehicle data messages according to a second communication protocol different than the first communication protocol.

4. The method of claim 2, wherein the first predetermined group of electronic control units are connected to a first interface of a communication gateway in the vehicle and the second predetermined group of electronic control units are connected to a second interface of a communication gateway different than the first interface.

5. The method of claim 4, wherein the first interface and the second interface includes interfaces selected from among: a local interconnect network (LIN) interface, a controller area network (CAN) interface, a 100BASE-T1 interface, a 1000BASE-T/2.5GBase-T interface, a 100BASE-TX interface, a 1000BASE-T interface, a FlexRay interface, a universal serial bus (USB) interface, a peripheral component interconnect express (PCIe) interface, a joint test action group (JTAG) interface, a universal asynchronous receiver-transmitter (UART) interface, an aurora interface, or an M.2 interface.

6. The method of claim 2, wherein the first predetermined group of electronic control units are connected to a first zonal controller in the vehicle and the second predetermined group of electronic control units are connected to a second zonal controller.

7. The method of claim 6, wherein the first zonal controller corresponds to a safety component zone comprising one or more safety components and the second zonal controller corresponds to a system zone.

8. The method of claim 2, wherein the first predetermined group of electronic control units correspond to a first system of the vehicle and the second predetermined group of electronic units correspond to a second system of the vehicle different than the first system.

9. The method of claim 2, further comprising:

receiving a selection of the second user-selectable control; and transmitting, to the vehicle in response to the selection of the second user-selectable control, one or more third vehicle data messages with a second diagnostic trouble code request to the second predetermined group of electronic control units, wherein the second diagnostic trouble code request includes a second request to clear one or more diagnostic trouble codes in the second predetermined group of electronic control units or a second request to respond with a status of one or more diagnostic trouble codes being set in the second predetermined group of electronic control units.

10. The method of claim 2, further comprising:

receiving selections of both the first user-selectable control and the second user-selectable control; and transmitting, to the vehicle in response to the selections of both the first user-selectable control and the second user-selectable control, a plurality of vehicle data messages, wherein the plurality of vehicle data messages includes at least a first diagnostic trouble code request for the first predetermined group of electronic control units and a second diagnostic trouble code request for the second predetermined group of electronic control units.

11. The method of claim 10, wherein the plurality of vehicle data messages comprises:

at least a first physical message to one or more electronic control units in the first predetermined group of electronic control units or the second predetermined group of electronic control units; and at least a first broadcast message to one or more electronic control units in the first predetermined group of electronic control units or the second predetermined group of electronic control units.

12. The method of claim 1, wherein transmitting the one or more first vehicle data messages comprises:

transmitting a physical message to each address corresponding to an electronic control unit in the first predetermined group of electronic control units.

13. The method of claim 1, wherein transmitting the one or more first vehicle data messages comprises:

transmitting a broadcast message that is received by all electronic control units in the first predetermined group of electronic control units.

14. The method of claim 1, further comprising:

displaying a configure option that enables selection of multiple electronic control units to form the first predetermined group of electronic control units; and receiving respective selections of electronic control units in the first subset of electronic control units to form the first predetermined group of electronic control units.

15. The method of claim 1, wherein providing the first user-selectable control that corresponds to the first predetermined group of electronic control units comprises:

providing a plurality of user-selectable controls, each user-selectable control corresponding to a different group of electronic control units in the vehicle, wherein the plurality of user-selectable controls includes the first user-selectable control.

16. The method of claim 1, further comprising:

determining, at the computing system, vehicle identifying information associated with a group of vehicles including the vehicle;

determining, at the computing system, the first predetermined group of electronic control units based on the vehicle identifying information; and writing data into a non-transitory computer-readable memory that indicates the first user-selectable control corresponds to the first predetermined group of electronic control units.

17. The method of claim 1, further comprising:

determining, at the computing system, vehicle identifying information associated with a group of vehicles including the vehicle; and determining, at the computing system, a set of user-selectable controls based on the vehicle identifying information, wherein the set of user-selectable controls include the first user-selectable control, and wherein providing the first user-selectable control occurs by displaying the set of user-selectable controls on the user interface.

18. The method of claim 1, wherein when the diagnostic trouble code request includes the request to respond with a status of one or more diagnostic trouble codes being set in the first predetermined group of electronic control units, the method further comprises:

receiving, at the computing system and from the vehicle in response to transmitting the one or more first vehicle data messages, one or more second vehicle data messages including data indicating whether the first predetermined group of electronic control units have set any diagnostic trouble code.

19. The method of claim 1, further comprising:

transmitting, to the vehicle in response to the selection of the first user-selectable control, a security key to the first predetermined group of electronic units;

receiving, from the vehicle, a response to the security key; and wherein transmitting one or more first vehicle data messages with the diagnostic trouble code request to the first predetermined group of electronic control units comprises:

transmitting the one or more first vehicle data messages in response to the response to the security key.

20. The method of claim 1, further comprising:

transmitting, to the vehicle, instructions to switch to a diagnostic mode to the first predetermined group of electronic units; and wherein transmitting one or more first vehicle data messages with the diagnostic trouble code request to the first predetermined group of electronic control units comprises:

transmitting the one or more first vehicle data messages subsequent to transmitting the instructions to switch to the diagnostic mode to the first predetermined group of electronic units.

21. The method of claim 1, further comprising:

selecting a protocol for transmission of vehicle data messages to the vehicle.

22. The method of claim 1, further comprising:

determining, at the computing system, vehicle identifying information associated with a group of vehicles including the vehicle;

identifying a list of commonly replaced parts based on the vehicle identifying information;

determining, at the computing system, the first predetermined group of electronic control units based on the list of common replaced parts; and writing data into a non-transitory computer-readable memory that indicates the first user-selectable control corresponds to the first predetermined group of electronic control units.

23. A vehicle scan tool comprising:

a user interface; and a processor configured to:

provide, on the user interface, a first user-selectable control that labeled to identify a vehicle system, wherein the first user-selectable control corresponds to a first predetermined group of electronic control units, wherein the first predetermined group of electronic control units includes a first subset of electronic control units located in a vehicle and the first subset of electronic control units includes multiple electronic control units associated with the vehicle system identified by the label;

receive a selection of the first user-selectable control; and transmit, to the vehicle in response to the selection of the first user-selectable control, one or more first vehicle data messages with a diagnostic trouble code request to the first predetermined group of electronic control units, wherein the diagnostic trouble code request includes a request to clear one or more diagnostic trouble codes in the first predetermined group of electronic control units or a request to respond with a status of one or more diagnostic trouble codes being set in the first predetermined group of electronic control units.

24. A non-transitory computer-readable memory configured to store instructions, that when executed by a computing system comprising one or more processors, causes the computing system configured as a vehicle scan tool to perform operations comprising:

providing, on a user interface, a first user-selectable control labeled to identify a vehicle system, wherein the first user-selectable control corresponds to a first predetermined group of electronic control units, wherein the first predetermined group of electronic control units includes a first subset of electronic control units located in a vehicle and the first subset of electronic control units includes multiple electronic control units associated with the vehicle system identified by the label;

receiving a selection of the first user-selectable control; and transmitting, to the vehicle in response to the selection of the first user-selectable control, one or more first vehicle data messages with a diagnostic trouble code request to the first predetermined group of electronic control units, wherein the diagnostic trouble code request includes a request to clear one or more diagnostic trouble codes in the first predetermined group of electronic control units or a request to respond with a status of one or more diagnostic trouble codes being set in the first predetermined group of electronic control units.

* * * * *